(12) United States Patent (10) Patent No.: US 8,686,960 B2
Ludwig (45) Date of Patent: Apr. 1, 2014

(54) PIECEWISE-LINEAR AND PIECEWISE-AFFINE TRANSFORMATIONS FOR HIGH DIMENSIONAL TOUCHPAD (HDTP) OUTPUT DECOUPLING AND CORRECTIONS

(75) Inventor: Lester F. Ludwig, Belmont, CA (US)

(73) Assignee: Lester F. Ludwig, San Antonio, TX (US)

( * ) Notice: Subject to any disclaimer, the term of this patent is extended or adjusted under 35 U.S.C. 154(b) by 388 days.

(21) Appl. No.: 13/093,834

(22) Filed: Apr. 25, 2011

(65) Prior Publication Data

US 2011/0260998 A1 Oct. 27, 2011

Related U.S. Application Data

(60) Provisional application No. 61/327,458, filed on Apr. 23, 2010.

(51) Int. Cl.
*G06F 3/041* (2006.01)

(52) U.S. Cl.
USPC .................. 345/173; 178/18.02; 178/18.03

(58) Field of Classification Search
None
See application file for complete search history.

(56) References Cited

U.S. PATENT DOCUMENTS

| 8,049,730 B2 * | 11/2011 | Joguet et al. ............... 345/173 |
| 2010/0289754 A1 * | 11/2010 | Sleeman et al. ............ 345/173 |
| 2011/0066984 A1 * | 3/2011 | Li ............................... 715/863 |

* cited by examiner

*Primary Examiner* — Jason Olson
(74) *Attorney, Agent, or Firm* — Procopio, Cory, Hargreaves & Savitch LLP

(57) ABSTRACT

Methods for piecewise-linear and piecewise-affine transformations parameter decoupling in High Dimensional Touchpad (HDTP) user touch interfaces including those with multitouch capabilities are described. A calculation chain provides a first-order calculation of up to six touch parameters (left-right, front-back, downward pressure, roll angle, pitch angle, yaw angle) responsive in real-time to user touch on a touch-responsive sensor array. A piecewise-affine transformation is applied to these first-order calculations to produce parameter decoupling. The piecewise-affine transformation can be structured to depend only on current numerical values from the first-order calculation. Alternatively, the piecewise-affine transformation can be structured to additionally depend on the positive or negative direction of change over time of at least one numerical value from the first-order calculation, thereby providing a correction for hysteresis effects.

20 Claims, 28 Drawing Sheets

— US PAT 7,557,797 —

— PRIOR ART —

— PRIOR ART —

— PRIOR ART —

— PRIOR ART —

— PRIOR ART —

— PRIOR ART —

— PRIOR ART —

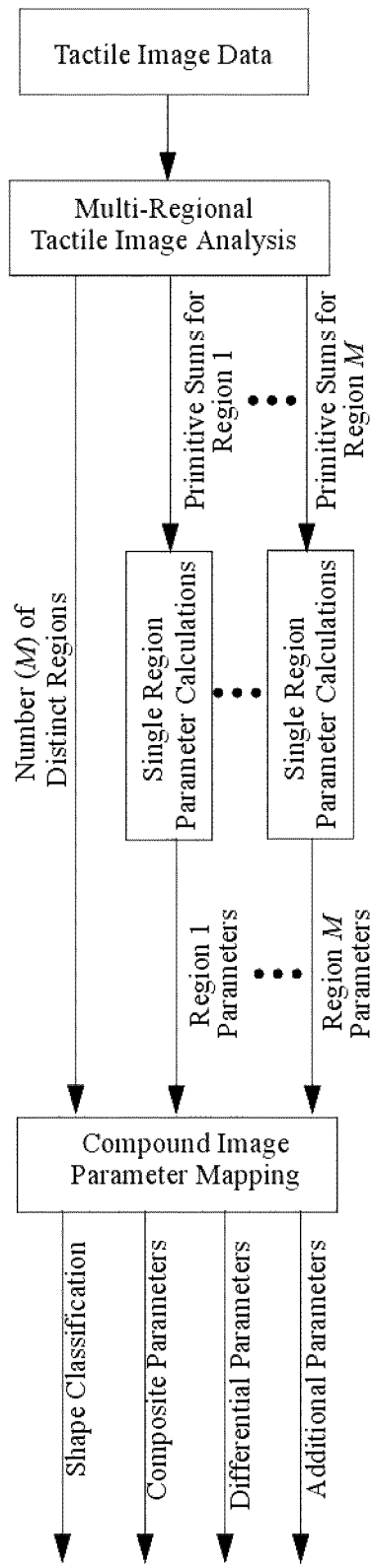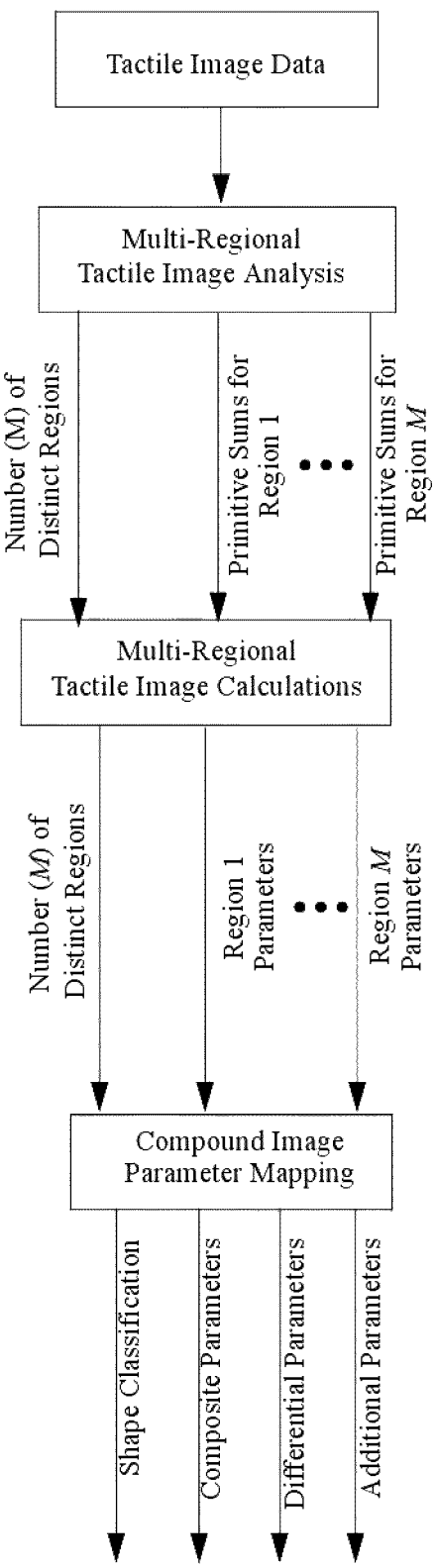
Figure 22a                    Figure 22b

Figure 27a  Figure 27b

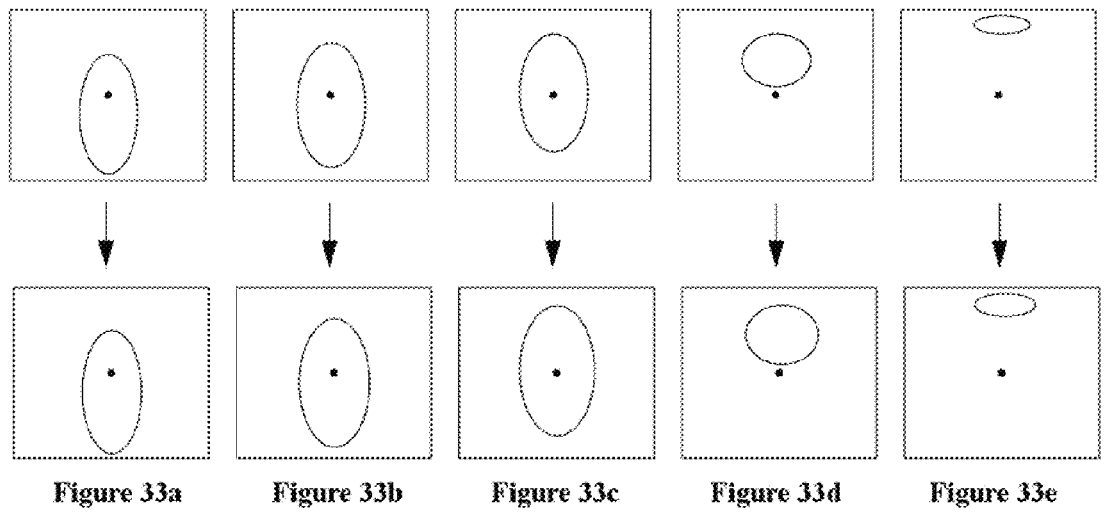
Figure 33a    Figure 33b    Figure 33c    Figure 33d    Figure 33e
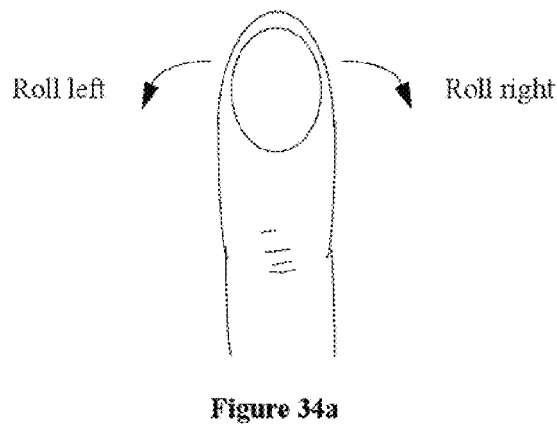
Figure 34a
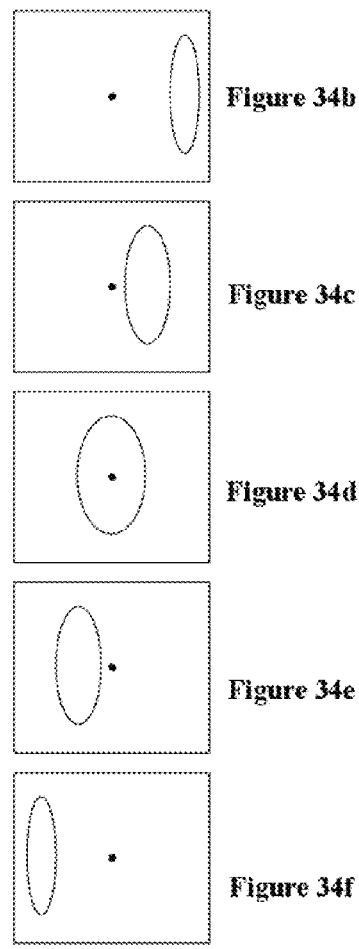
Figure 34b
Figure 34c
Figure 34d
Figure 34e
Figure 34f Surface Plot of Example Piecewise-Affine Transformation
(mapping two inputs $u$ and $w$ to single output $v$)
comprising nine connected planar regions

US 8,686,960 B2

PIECEWISE-LINEAR AND PIECEWISE-AFFINE TRANSFORMATIONS FOR HIGH DIMENSIONAL TOUCHPAD (HDTP) OUTPUT DECOUPLING AND CORRECTIONS

CROSS-REFERENCE TO RELATED APPLICATIONS

Pursuant to 35 U.S.C. §119(e), this application claims benefit of priority from Provisional U.S. Patent application Ser. No. 61/327,458, filed Apr. 23, 2010, the contents of which are incorporated by reference.

COPYRIGHT & TRADEMARK NOTICES

A portion of the disclosure of this patent document may contain material, which is subject to copyright protection. Certain marks referenced herein may be common law or registered trademarks of the applicant, the assignee or third parties affiliated or unaffiliated with the applicant or the assignee. Use of these marks is for providing an enabling disclosure by way of example and shall not be construed to exclusively limit the scope of the disclosed subject matter to material associated with such marks.

BACKGROUND OF THE INVENTION

The invention relates to user interfaces providing an additional number of simultaneously-adjustable interactively-controlled discrete (clicks, taps, discrete gestures) and pseudo-continuous (downward pressure, roll, pitch, yaw, multi-touch geometric measurements, continuous gestures, etc.) user-adjustable settings and parameters, and in particular to a curve-fitting approach to HDTP parameter extraction, and further how these can be used in applications.

By way of general introduction, touch screens implementing tactile sensor arrays have recently received tremendous attention with the addition multi-touch sensing, metaphors, and gestures. After an initial commercial appearance in the products of FingerWorks, such advanced touch screen technologies have received great commercial success from their defining role in the iPhone and subsequent adaptations in PDAs and other types of cell phones and hand-held devices. Despite this popular notoriety and the many associated patent filings, tactile array sensors implemented as transparent touchscreens were taught in the 1999 filings of issued U.S. Pat. No. 6,570,078 and pending U.S. patent application Ser. No. 11/761,978.

Despite the many popular touch interfaces and gestures, there remains a wide range of additional control capabilities that can yet be provided by further enhanced user interface technologies. A number of enhanced touch user interface features are described in U.S. Pat. No. 6,570,078, pending U.S. patent application Ser. Nos. 11/761,978, 12/418,605, 12/502,230, 12/541,948, and related pending U.S. patent applications. These patents and patent applications also address popular contemporary gesture and touch features. The enhanced user interface features taught in these patents and patent applications, together with popular contemporary gesture and touch features, can be rendered by the "High Definition Touch Pad" (HDTP) technology taught in those patents and patent applications. Implementations of the HTDP provide advanced multi-touch capabilities far more sophisticated that those popularized by FingerWorks, Apple, NYU, Microsoft, Gesturetek, and others.

SUMMARY OF THE INVENTION

For purposes of summarizing, certain aspects, advantages, and novel features are described herein. Not all such advantages may be achieved in accordance with any one particular embodiment. Thus, the disclosed subject matter may be embodied or carried out in a manner that achieves or optimizes one advantage or group of advantages without achieving all advantages as may be taught or suggested herein.

The invention provides for the use of piecewise-linear and piecewise-affine transformations for High Dimensional Touchpad (HDTP) output decoupling and corrections.

In one aspect of the invention, a method is provided for improving the decoupling and corrections among measured parameters in a touch-based user interface using at least one computational processor, the method comprising:

receiving tactile image data responsive to data generated from user touch to a touch user interface comprising a sensor array;

processing the tactile image data with a series of operations to produce first processed data vector, the series of operations comprising at least one rotation operation, the first processed data vector comprising a plurality of numerical values responsive to data generated from user touch;

further processing the first processed data vector using at least one computational processor, the further processing comprising a piecewise-linear computational operation on the first processed data vector, the piecewise-linear transformation comprising at least one provided linear transformation selected from a plurality of possible linear transformations;

wherein the selection of the linear transformation from the plurality of possible linear transformations is determined by conditional tests made on at least one of the numerical values comprised by the first processed data vector, and wherein the further processing produces a second processed data vector comprising a plurality of numerical values responsive to data generated from user touch.

In another aspect of the invention, a method is provided for improving the decoupling among measured parameters in a touch-based user interface using at least one computational processor, the method comprising:

receiving tactile image data responsive to data generated from user touch to a touch user interface comprising a sensor array;

processing the tactile image data with a series of operations to produce first processed data vector, the series of operations comprising at least one rotation operation, the first processed data vector comprising a plurality of numerical values responsive to data generated from user touch;

further processing the first processed data vector using at least one computational processor, the further processing comprising a piecewise-affine computational operation on the first processed data vector, the piecewise-affine operation using at least one provided linear transformation and at least one provided offset vector, the at least one provided linear transformation selected from a plurality of possible linear transformations and the at least one provided offset vector selected from a plurality of possible offset vectors;

wherein the selection of the linear transformation from the plurality of possible linear transformations and the selection of the offset vector from the plurality of possible offset vectors is determined by conditional tests made on at least one of the numerical values comprised by the first processed data vector, and wherein the further processing produces a second processed data vector comprising a plurality of numerical values responsive to data generated from user touch.

In another aspect of the invention, the first processed data vector comprises a yaw angle numerical value responsive to a calculated yaw angle associated with the user touch and the rotation operation is responsive to the yaw angle numerical value.

In another aspect of the invention, the first processed data vector comprises a pitch angle numerical value responsive to a calculated pitch angle associated with the user touch and the rotation operation is used to provide a correction for the yaw angle.

In another aspect of the invention, the first processed data vector comprises a roll angle numerical value responsive to a calculated roll angle associated with the user touch and the rotation operation is used to provide a correction for the yaw angle.

In another aspect of the invention, the selected linear transformation is comprised a plurality of separate component linear transformations, at least one of the component linear transformations is determined by conditional tests made on at least one of the numerical values comprised by the first processed data vector.

In another aspect of the invention, the separate component linear transformation is stored in a look-up table, the look-up table comprising a plurality of separate component linear transformations.

In another aspect of the invention, the method is used to provide corrections for pitch angle effects on measured front-back center.

In another aspect of the invention, the method is used to provide corrections for roll angle effects on measured left-right-center.

In another aspect of the invention, the conditional tests further comprise tests responsive to the positive or negative direction of change over time of at least one numerical value comprised by the first processed data vector.

In another aspect of the invention, the method is used to provide corrections for hysteresis effects within the physical contact process between the user touch and the sensor array.

In another aspect of the invention, the method is used to provide corrections for hysteresis effects in at least one measurement of the user touch.

In another aspect of the invention, the method is used to provide corrections for downward pressure effects on measured pitch angle.

In another aspect of the invention, the method is used to provide corrections for pressure effects on measured roll angle.

In another aspect of the invention, the method is used to provide corrections for range-of-rotation effects.

In another aspect of the invention, the method is used to provide corrections for at least a tilt effect on yaw angle. The tilt effect can be responsive to one or both of the roll or pitch angles of user touch with respect to the sensor array.

In another aspect of the invention, the linear transformation comprises a matrix.

In another aspect of the invention, the linear transformation is stored in a look-up table, the look-up table comprising a plurality of linear transformations.

In another aspect of the invention, the offset vector is stored in a look-up table, the look-up table comprising a plurality of offset vectors.

BRIEF DESCRIPTION OF THE DRAWINGS

The above and other aspects, features and advantages of the present invention will become more apparent upon consideration of the following description of preferred embodiments taken in conjunction with the accompanying drawing figures.

FIGS. 22a-22c depict various approaches to the handling of compound posture data images.

FIGS. 27a-27d depict operations acting on various parameters, rates, and symbols to produce other parameters, rates, and symbols, including operations such as sample/hold, interpretation, context, etc.

FIGS. 33a-33e depict the effect of increased downward pressure on the respective contact shapes of FIGS. 32b-32f.

FIG. 34a depicts a top view of an exemplary finger and illustrating the variations in the roll angle. FIGS. 34b-34f depict exemplary tactile image measurements (proximity sensing, pressure sensing, contact sensing, etc.) as a finger in contact with the touch sensor array is positioned at various roll angles with respect to the surface of the sensor.

DETAILED DESCRIPTION OF THE PREFERRED EMBODIMENTS

In the following, numerous specific details are set forth to provide a thorough description of various embodiments. Certain embodiments may be practiced without these specific details or with some variations in detail. In some instances, certain features are described in less detail so as not to obscure other aspects. The level of detail associated with each of the elements or features should not be construed to qualify the novelty or importance of one feature over the others.

In the following description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention.

Despite the many popular touch interfaces and gestures in contemporary information appliances and computers, there remains a wide range of additional control capabilities that can yet be provided by further enhanced user interface technologies. A number of enhanced touch user interface features are described in U.S. Pat. No. 6,570,078, pending U.S. patent application Ser. Nos. 11/761,978, 12/418,605, 12/502,230, 12/541,948, and related pending U.S. patent applications. These patents and patent applications also address popular contemporary gesture and touch features. The enhanced user interface features taught in these patents and patent applications, together with popular contemporary gesture and touch features, can be rendered by the "High Definition Touch Pad" (HDTP) technology taught in those patents and patent applications.

The present patent application addresses additional technologies for feature and performance improvements of HDTP technologies. Specifically, this patent application addresses a curve-fitting approach to HDTP parameter extraction.

Overview of HDTP User Interface Technology

Before providing details specific to the present invention, some embodiments of HDTP technology is provided. This will be followed by a summarizing overview of HDTP technology. With the exception of a few minor variations and examples, the material presented in this overview section is draw from U.S. Pat. No. 6,570,078, pending U.S. patent application Ser. Nos. 11/761,978, 12/418,605, 12/502,230, 12/541,948, 12/724,413, 13/026,248, and related pending U.S. patent applications and is accordingly attributed to the associated inventors.

Embodiments Employing a Touchpad and Touchscreen Form of a HDTP

Figure 1A:
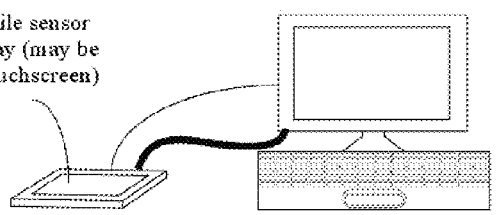
FIGS. 1a-1g depict a number of arrangements and embodiments employing the HDTP technology.
Figure 1B:
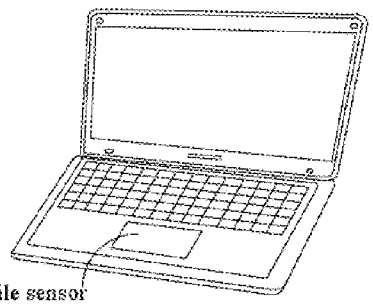
Figure 1C:
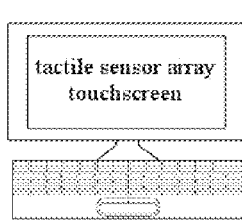
Figure 1D:
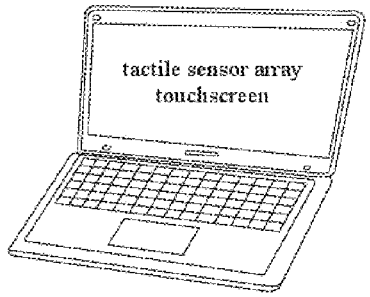

FIGS. 1a-1g (adapted from U.S. patent application Ser. No. 12/418,605) and 2a-2e (adapted from U.S. Pat. No. 7,557,797) depict a number of arrangements and embodiments employing the HDTP technology. FIG. 1a illustrates an HDTP as a peripheral that can be used with a desktop computer (shown) or laptop) not shown). FIG. 1b depicts an HDTP integrated into a laptop in place of the traditional touchpad pointing device. In FIGS. 1a-1b the HDTP tactile sensor can be a stand-alone component or can be integrated over a display so as to form a touchscreen. FIG. 1c depicts an HDTP integrated into a desktop computer display so as to form a touchscreen. FIG. 1d shows the HDTP integrated into a laptop computer display so as to form a touchscreen.

Figure 1E:
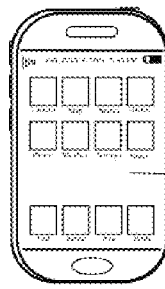
Figure 1F:
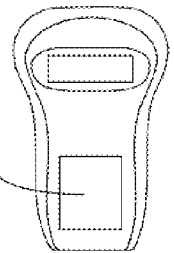

FIG. 1e depicts an HDTP integrated into a cell phone, smartphone, PDA, or other hand-held consumer device. FIG. 1f shows an HDTP integrated into a test instrument, portable service-tracking device, portable service-entry device, field instrument, or other hand-held industrial device. In FIGS. 1e-1f the HDTP tactile sensor can be a stand-alone component or can be integrated over a display so as to form a touchscreen.

Figure 1G:
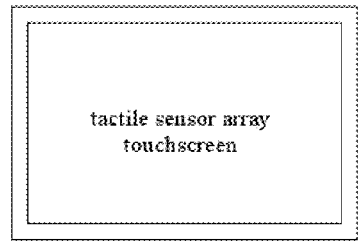
Figure 2A:
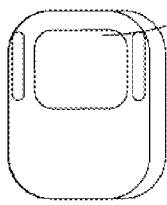
FIGS. 2a-2e and FIGS. 3a-3b depict various integrations of an HDTP into the back of a conventional computer mouse as taught in U.S. Patent U.S. Pat. No. 7,557,797 and in pending U.S. patent application Ser. No. 12/619,678.
Figure 2B:
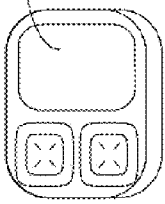
Figure 2C:
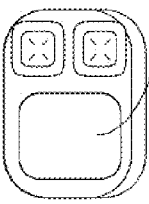
Figure 2D:
Figure 2E:
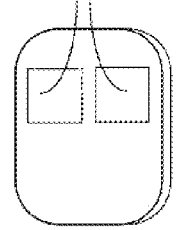
Figure 3A:
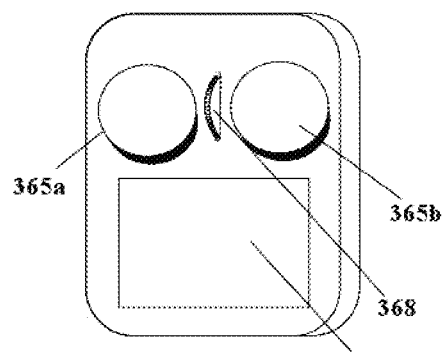
Figure 3B:
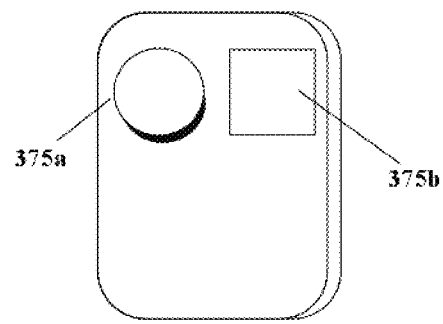

FIG. 1g depicts an HDTP touchscreen configuration that can be used in a tablet computer, wall-mount computer monitor, digital television, video conferencing screen, kiosk, etc.

In at least the arrangements of FIGS. 1a, 1c, 1d, and 1g, or other sufficiently large tactile sensor implementation of the HDTP, more than one hand can be used an individually recognized as such.

Embodiments Incorporating the HDTP into a Traditional or Contemporary Generation Mouse FIGS. 2a-2e and FIGS. 3a-3b (these adapted from U.S. Pat. No. 7,557,797) depict various integrations of an HDTP into the back of a conventional computer mouse. Any of these arrangements can employ a connecting cable, or the device can be wireless.

In the integrations depicted in FIGS. 2a-2d the HDTP tactile sensor can be a stand-alone component or can be integrated over a display so as to form a touchscreen. Such configurations have very recently become popularized by the product release of Apple "Magic Mouse™" although such combinations of a mouse with a tactile sensor array on its back responsive to multitouch and gestures were taught earlier in pending U.S. patent application Ser. No. 12/619,678 (priority date Feb. 12, 2004) entitled "User Interface Mouse with Touchpad Responsive to Gestures and Multi-Touch."

In another embodiment taught in the specification of issued U.S. Pat. No. 7,557,797 and associated pending continuation applications more than two touchpads can be included in the advance mouse embodiment, for example as suggested in the arrangement of FIG. 2e. As with the arrangements of FIGS. 2a-2d, one or more of the plurality of HDTP tactile sensors or exposed sensor areas of arrangements such as that of FIG. 2e can be integrated over a display so as to form a touchscreen. Other advance mouse arrangements include the integrated trackball/touchpad/mouse combinations of FIGS. 3a-3b taught in U.S. Pat. No. 7,557,797.

Overview of HDTP User Interface Technology

The information in this section provides an overview of HDTP user interface technology as described in U.S. Pat. No. 6,570,078, pending U.S. patent application Ser. Nos. 11/761, 978, 12/418,605, 12/502,230, 12/541,948, and related pending U.S. patent applications.

In an embodiment, a touchpad used as a pointing and data entry device can comprise an array of sensors. The array of sensors is used to create a tactile image of a type associated with the type of sensor and method of contact by the human hand.

In one embodiment, the individual sensors in the sensor array are pressure sensors and a direct pressure-sensing tactile image is generated by the sensor array.

In another embodiment, the individual sensors in the sensor array are proximity sensors and a direct proximity tactile image is generated by the sensor array. Since the contacting surfaces of the finger or hand tissue contacting a surface typically increasingly deforms as pressure is applied, the sensor array comprised of proximity sensors also provides an indirect pressure-sensing tactile image.

In another embodiment, the individual sensors in the sensor array can be optical sensors. In one variation of this, an optical image is generated and an indirect proximity tactile image is generated by the sensor array. In another variation, the optical image can be observed through a transparent or translucent rigid material and, as the contacting surfaces of the finger or hand tissue contacting a surface typically increasingly deforms as pressure is applied, the optical sensor array also provides an indirect pressure-sensing tactile image.

In some embodiments, the array of sensors can be transparent or translucent and can be provided with an underlying visual display element such as an alphanumeric, graphics, or image display. The underlying visual display can comprise, for example, an LED array display, a backlit LCD, etc. Such an underlying display can be used to render geometric boundaries or labels for soft-key functionality implemented with the tactile sensor array, to display status information, etc. Tactile array sensors implemented as transparent touchscreens are taught in the 1999 filings of issued U.S. Pat. No. 6,570,078 and pending U.S. patent application Ser. No. 11/761,978.

In an embodiment, the touchpad or touchscreen can comprise a tactile sensor array obtains or provides individual measurements in every enabled cell in the sensor array that provides these as numerical values. The numerical values can be communicated in a numerical data array, as a sequential data stream, or in other ways. When regarded as a numerical data array with row and column ordering that can be associated with the geometric layout of the individual cells of the sensor array, the numerical data array can be regarded as representing a tactile image. The only tactile sensor array requirement to obtain the full functionality of the HDTP is that the tactile sensor array produce a multi-level gradient measurement image as a finger, part of hand, or other pliable object varies is proximity in the immediate area of the sensor surface.

Such a tactile sensor array should not be confused with the "null/contact" touchpad which, in normal operation, acts as a pair of orthogonally responsive potentiometers. These "null/contact" touchpads do not produce pressure images, proximity images, or other image data but rather, in normal operation, two voltages linearly corresponding to the location of a left-right edge and forward-back edge of a single area of contact. Such "null/contact" touchpads, which are universally found in existing laptop computers, are discussed and differentiated from tactile sensor arrays in issued U.S. Pat. No. 6,570,078 and pending U.S. patent application Ser. No. 11/761,978. Before leaving this topic, it is pointed out that these the "null/contact" touchpads nonetheless can be inexpensively adapted with simple analog electronics to provide at least primitive multi-touch capabilities as taught in issued U.S. Pat. No. 6,570,078 and pending U.S. patent application Ser. No. 11/761,978 (pre-grant publication U.S. 2007/0229477 and therein, paragraphs [0022]-[0029], for example).

Figure 4:
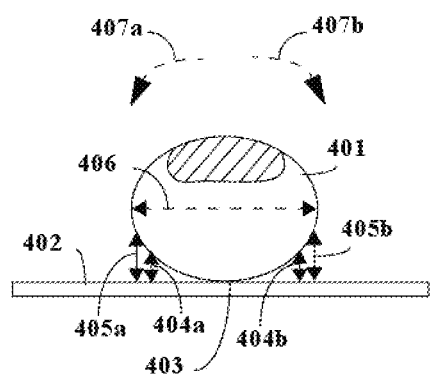
FIG. 4 illustrates the side view of a finger lightly touching the surface of a tactile sensor array.

More specifically, FIG. 4 (adapted from U.S. patent application Ser. No. 12/418,605) illustrates the side view of a finger 401 lightly touching the surface 402 of a tactile sensor array. In this example, the finger 401 contacts the tactile sensor surface in a relatively small area 403. In this situation, on either side the finger curves away from the region of contact 403, where the non-contacting yet proximate portions of the finger grow increasingly far 404a, 405a, 404b, 405b from the surface of the sensor 402. These variations in physical proximity of portions of the finger with respect to the sensor surface should cause each sensor element in the tactile proximity sensor array to provide a corresponding proximity measurement varying responsively to the proximity, separation distance, etc. The tactile proximity sensor array advantageously comprises enough spatial resolution to provide a plurality of sensors within the area occupied by the finger (for example, the area comprising width 406). In this case, as the finger is pressed down, the region of contact 403 grows as the more and more of the pliable surface of the finger conforms to the tactile sensor array surface 402, and the distances 404a, 405a, 404b, 405b contract. If the finger is tilted, for example by rolling in the user viewpoint counterclockwise (which in the depicted end-of-finger viewpoint clockwise 407a) the separation distances on one side of the finger 404a, 405a will contract while the separation distances on one side of the finger 404b, 405b will lengthen. Similarly if the finger is tilted, for example by rolling in the user viewpoint clockwise (which in the depicted end-of-finger viewpoint counterclockwise 407b) the separation distances on the side of the finger 404b, 405b will contract while the separation distances on the side of the finger 404a, 405a will lengthen.

In many various embodiments, the tactile sensor array can be connected to interface hardware that sends numerical data responsive to tactile information captured by the tactile sensor array to a processor. In various embodiments, this processor will process the data captured by the tactile sensor array and transform it various ways, for example into a collection of simplified data, or into a sequence of tactile image "frames" (this sequence akin to a video stream), or into highly refined information responsive to the position and movement of one or more fingers and other parts of the hand.

As to further detail of the latter example, a "frame" can refer to a 2-dimensional list, number of rows by number of columns, of tactile measurement value of every pixel in a tactile sensor array at a given instance. The time interval between one frame and the next one depends on the frame rate of the system and the number of frames in a unit time (usually frames per second). However, these features are and are not firmly required. For example, in some embodiments a tactile sensor array can not be structured as a 2-dimensional array but rather as row-aggregate and column-aggregate measurements (for example row sums and columns sums as in the tactile sensor of year 2003-2006 Apple Powerbooks, row and column interference measurement data as can be provided by a surface acoustic wave or optical transmission modulation sensor as discussed later in the context of FIG. 13, etc.). Additionally, the frame rate can be adaptively-variable rather than fixed, or the frame can be segregated into a plurality regions each of which are scanned in parallel or conditionally (as taught in U.S. Pat. No. 6,570,078 and pending U.S. patent application Ser. No. 12/418,605), etc.

Figure 5A:
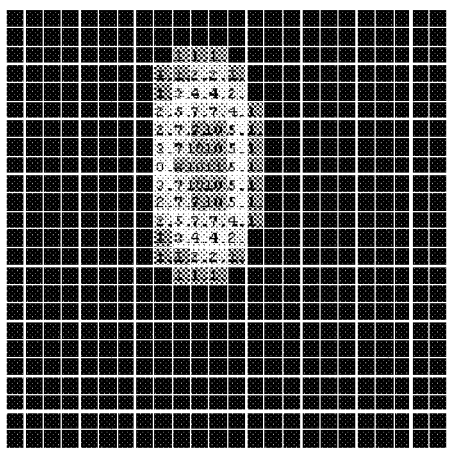
FIG. 5a is a graphical representation of a tactile image produced by contact of a human finger on a tactile sensor array.
Figure 5B:
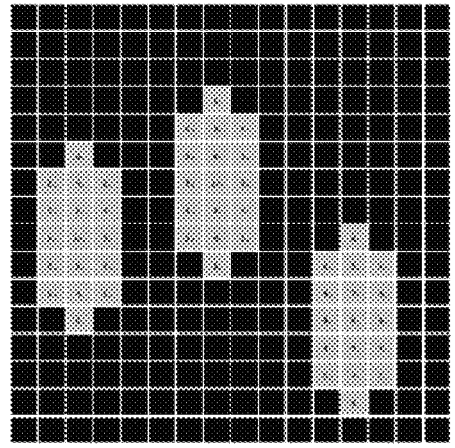
FIG. 5b provides a graphical representation of a tactile image produced by contact with multiple human fingers on a tactile sensor array.

FIG. 5a (adapted from U.S. patent application Ser. No. 12/418,605) depicts a graphical representation of a tactile image produced by contact with the bottom surface of the most outward section (between the end of the finger and the most nearby joint) of a human finger on a tactile sensor array. In this tactile array, there are 24 rows and 24 columns; other realizations can have significantly more (hundreds or thousands) of rows and columns. Tactile measurement values of each cell are indicated by the numbers and shading in each cell. Darker cells represent cells with higher tactile measurement values. Similarly, FIG. 5b (also adapted from U.S. patent application Ser. No. 12/418,605) provides a graphical representation of a tactile image produced by contact with multiple human fingers on a tactile sensor array. In other embodiments, there can be a larger or smaller number of pixels for a given images size, resulting in varying resolution. Additionally, there can be larger or smaller area with respect to the image size resulting in a greater or lesser potential measurement area for the region of contact to be located in or move about.

Figure 6:
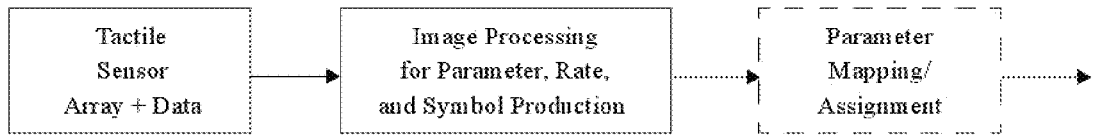
FIG. 6 depicts a signal flow in a HDTP implementation.

FIG. 6 (adapted from U.S. patent application Ser. No. 12/418,605) depicts a realization wherein a tactile sensor array is provided with real-time or near-real-time data acquisition capabilities. The captured data reflects spatially distributed tactile measurements (such as pressure, proximity, etc.). The tactile sensory array and data acquisition stage provides this real-time or near-real-time tactile measurement data to a specialized image processing arrangement for the production of parameters, rates of change of those parameters, and symbols responsive to aspects of the hand's relationship with the tactile or other type of sensor array. In some applications, these measurements can be used directly. In other situations, the real-time or near-real-time derived parameters can be directed to mathematical mappings (such as scaling, offset, and nonlinear warpings) in real-time or near-real-time into real-time or near-real-time application-specific parameters or other representations useful for applications. In some embodiments, general purpose outputs can be assigned to variables defined or expected by the application.

Types of Tactile Sensor Arrays

The tactile sensor array employed by HDTP technology can be implemented by a wide variety of means, for example:

Pressure sensor arrays (implemented by for example—although not limited to—one or more of resistive, capacitive, piezo, optical, acoustic, or other sensing elements);

Pressure sensor arrays (implemented by for example—although not limited to—one or more of resistive, capacitive, piezo, optical, acoustic, or other sensing elements);

Proximity sensor arrays (implemented by for example—although not limited to—one or more of capacitive, optical, acoustic, or other sensing elements);

Surface-contact sensor arrays (implemented by for example—although not limited to—one or more of resistive, capacitive, piezo, optical, acoustic, or other sensing elements).

Figure 7:
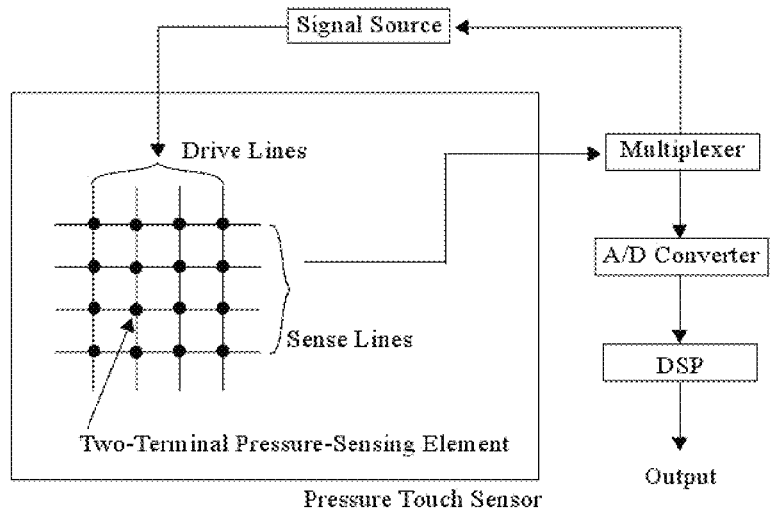
FIG. 7 depicts a pressure sensor array arrangement.
Figure 8:
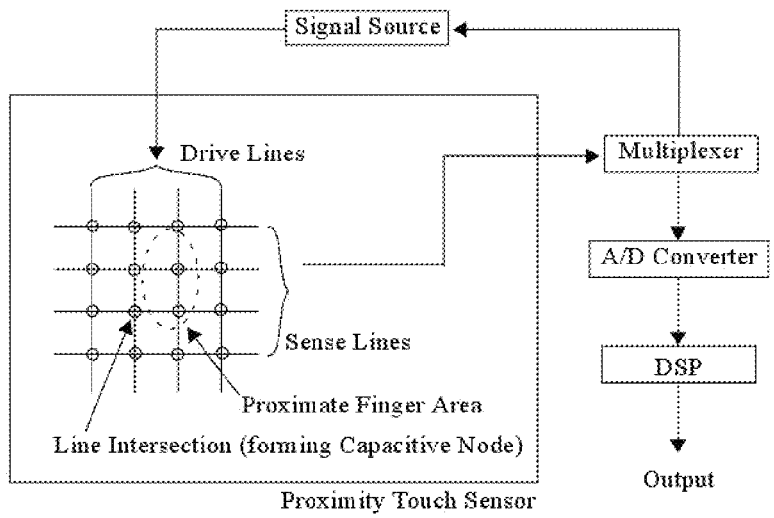
FIG. 8 depicts a popularly accepted view of a typical cell phone or PDA capacitive proximity sensor implementation.
Figure 9:
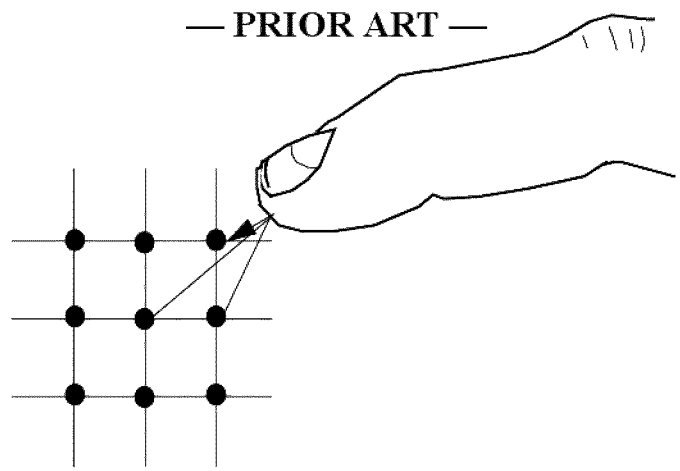
FIG. 9 depicts an implementation of a multiplexed LED array acting as a reflective optical proximity sensing array.
Figure 10A:
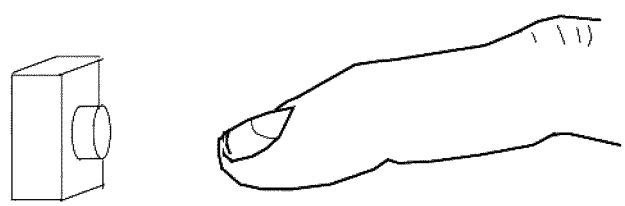
FIGS. 10a-10c depict camera implementations for direct viewing of at least portions of the human hand, wherein the camera image array is employed as an HDTP tactile sensor array.
Figure 10B:
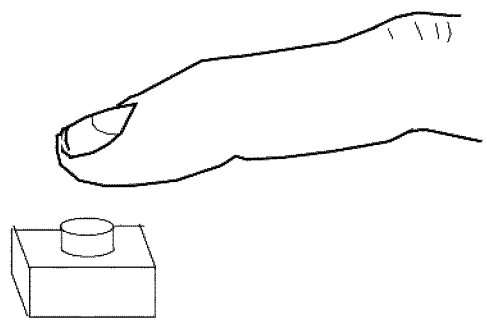
Figure 10C:
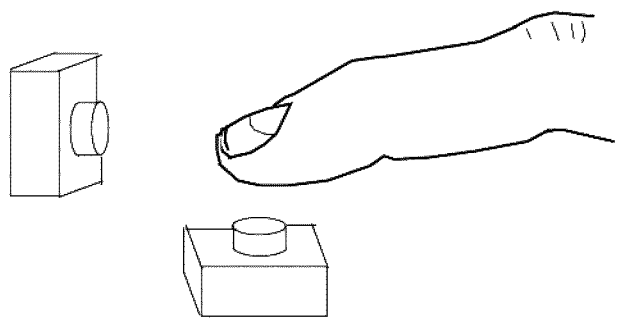
Figure 11:
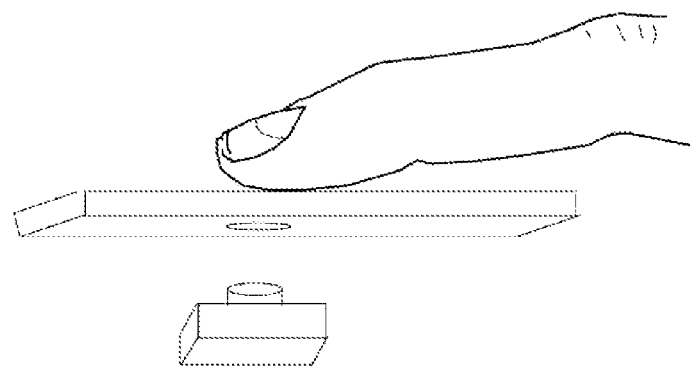
FIG. 11 depicts an embodiment of an arrangement comprising a video camera capturing the image of the contact of parts of the hand with a transparent or translucent surface.

Below a few specific examples of the above are provided by way of illustration; however these are by no means limiting. The examples include:

Pressure sensor arrays comprising arrays of isolated sensors (FIG. 7);

Capacitive proximity sensors (FIG. 8);

Multiplexed LED optical reflective proximity sensors (FIG. 9);

Video camera optical reflective sensing (as taught in U.S. Pat. No. 6,570,078 and U.S. patent application Ser. Nos. 10/683,915 and 11/761,978):

direct image of hand (FIGS. 10*a*-10*c*);

image of deformation of material (FIG. 11);

Surface contract refraction/absorption (FIG. 12)

An example implementation of a tactile sensor array is a pressure sensor array. Pressure sensor arrays discussed in U.S. Pat. No. 6,570,078 and pending U.S. patent application Ser. No. 11/761,978. FIG. 7 depicts a pressure sensor array arrangement comprising a rectangular array of isolated individual two-terminal pressure sensor elements. Such two-terminal pressure sensor elements typically operate by measuring changes in electrical (resistive, capacitive) or optical properties of an elastic material as the material is compressed. In typical embodiment, each sensor element in the sensor array can be individually accessed via multiplexing arrangement, for example as shown in FIG. 7, although other arrangements are possible and provided for by the invention. Examples of prominent manufacturers and suppliers of pressure sensor arrays include Tekscan, Inc. (307 West First Street., South Boston, Mass., 02127, www.tekscan.com), Pressure Profile Systems (5757 Century Boulevard, Suite 600, Los Angeles, Calif. 90045, www.pressureprofile.com), Sensor Products, Inc. (300 Madison Avenue, Madison, N.J. 07940 USA, www.sensorprod.com), and Xsensor Technology Corporation (Suite 111, 319-2nd Ave SW, Calgary, Alberta T2P 005, Canada, www.xsensor.com).

Capacitive proximity sensors can be used in various handheld devices with touch interfaces (see for example, among many, http://electronics.howstuffworks.com/iphone2.htm, http://www.veritasetvisus.com/VVTP-12,%20Walker.pdf). Prominent manufacturers and suppliers of such sensors, both in the form of opaque touchpads and transparent touch screens, include Balda AG (Bergkirchener Str. 228, 32549 Bad Oeynhausen, DE, www.balda.de), Cypress (198 Champion Ct., San Jose, Calif. 95134, www.cypress.com), and Synaptics (2381 Bering Dr., San Jose, Calif. 95131, www.synaptics.com). In such sensors, the region of finger contact is detected by variations in localized capacitance resulting from capacitive proximity effects induced by an overlapping or otherwise nearly-adjacent finger. More specifically, the electrical field at the intersection of orthogonally-aligned conductive buses is influenced by the vertical distance or gap between the surface of the sensor array and the skin surface of the finger. Such capacitive proximity sensor technology is low-cost, reliable, long-life, stable, and can readily be made transparent. FIG. 8 (adapted from http://www.veritasetvisus.com/VVTP-12,%20Walker.pdf with slightly more functional detail added) shows a popularly accepted view of a typical cell phone or PDA capacitive proximity sensor implementation. Capacitive sensor arrays of this type can be highly susceptible to noise and various shielding and noise-suppression electronics and systems techniques can need to be employed for adequate stability, reliability, and performance in various electric field and electromagnetically-noisy environments. In some embodiments of an HDTP, the present invention can use the same spatial resolution as current capacitive proximity touchscreen sensor arrays. In other embodiments of the present invention, a higher spatial resolution is advantageous.

Forrest M. Mims is credited as showing that an LED can be used as a light detector as well as a light emitter. Recently, light-emitting diodes have been used as a tactile proximity sensor array (for example, as depicted in the video available at http://cs.nyu.edu/~jhan/ledtouch/index.html). Such tactile proximity array implementations typically need to be operated in a darkened environment (as seen in the video in the above web link). In one embodiment provided for by the invention, each LED in an array of LEDs can be used as a photodetector as well as a light emitter, although a single LED can either transmit or receive information at one time. Each LED in the array can sequentially be selected to be set to be in receiving mode while others adjacent to it are placed in light emitting mode. A particular LED in receiving mode can pick up reflected light from the finger, provided by said neighboring illuminating-mode LEDs. FIG. 9 depicts an implementation. The invention provides for additional systems and methods for not requiring darkness in the user environment in order to operate the LED array as a tactile proximity sensor. In one embodiment, potential interference from ambient light in the surrounding user environment can be limited by using an opaque pliable or elastically deformable surface covering the LED array that is appropriately reflective (directionally, amorphously, etc. as can be advantageous in a particular design) on the side facing the LED array. Such a system and method can be readily implemented in a wide variety of ways as is clear to one skilled in the art. In another embodiment, potential interference from ambient light in the surrounding user environment can be limited by employing amplitude, phase, or pulse width modulated circuitry or software to control the underlying light emission and receiving process. For example, in an implementation the LED array can be configured to emit modulated light modulated at a particular carrier frequency or variational waveform and respond to only modulated light signal components extracted from the received light signals comprising that same carrier frequency or variational waveform. Such a system and method can be readily implemented in a wide variety of ways as is clear to one skilled in the art.

Use of video cameras for gathering control information from the human hand in various ways is discussed in U.S. Pat. No. 6,570,078 and Pending U.S. patent application Ser. No. 10/683,915. Here the camera image array is employed as an HDTP tactile sensor array. Images of the human hand as captured by video cameras can be used as an enhanced multiple-parameter interface responsive to hand positions and gestures, for example as taught in U.S. patent application Ser. No. 10/683,915 Pre-Grant-Publication 2004/0118268 (paragraphs [314], [321]-[332], [411], [653], both stand-alone and in view of [325], as well as [241]-[263]). FIGS. 10a and 10b depict single camera implementations, while FIG. 10c depicts a two camera implementation. As taught in the aforementioned references, a wide range of relative camera sizes and positions with respect to the hand are provided for, considerably generalizing the arrangements shown in FIGS. 10a-10c.

In another video camera tactile controller embodiment, a flat or curved transparent or translucent surface or panel can be used as sensor surface. When a finger is placed on the transparent or translucent surface or panel, light applied to the opposite side of the surface or panel reflects light in a distinctly different manner than in other regions where there is no finger or other tactile contact. The image captured by an associated video camera will provide gradient information responsive to the contact and proximity of the finger with respect to the surface of the translucent panel. For example, the parts of the finger that are in contact with the surface will provide the greatest degree of reflection while parts of the finger that curve away from the surface of the sensor provide less reflection of the light. Gradients of the reflected light captured by the video camera can be arranged to produce a gradient image that appears similar to the multilevel quantized image captured by a pressure sensor. By comparing changes in gradient, changes in the position of the finger and pressure applied by the finger can be detected. FIG. 11 depicts an implementation.

Figure 12A:
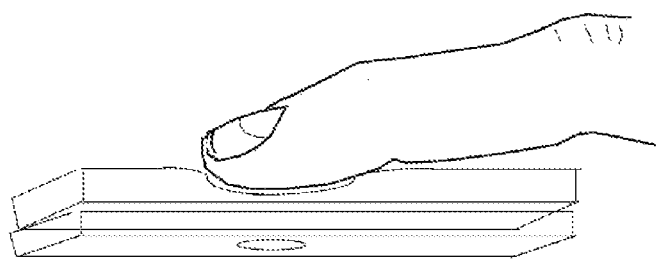
FIGS. 12a-12b depict an implementation of an arrangement comprising a video camera capturing the image of a deformable material whose image varies according to applied pressure.
Figure 12B:
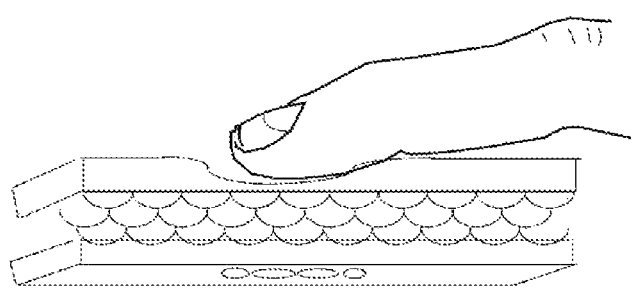

FIGS. 12a-12b depict an implementation of an arrangement comprising a video camera capturing the image of a deformable material whose image varies according to applied pressure. In the example of FIG. 12a, the deformable material serving as a touch interface surface can be such that its intrinsic optical properties change in response to deformations, for example by changing color, index of refraction, degree of reflectivity, etc. In another approach, the deformable material can be such that exogenous optic phenomena are modulated n response to the deformation. As an example, the arrangement of FIG. 12b is such that the opposite side of the deformable material serving as a touch interface surface comprises deformable bumps which flatten out against the rigid surface of a transparent or translucent surface or panel. The diameter of the image as seen from the opposite side of the transparent or translucent surface or panel increases as the localized pressure from the region of hand contact increases. Such an approach was created by Professor Richard M. White at U.C. Berkeley in the 1980's.

Figure 13:
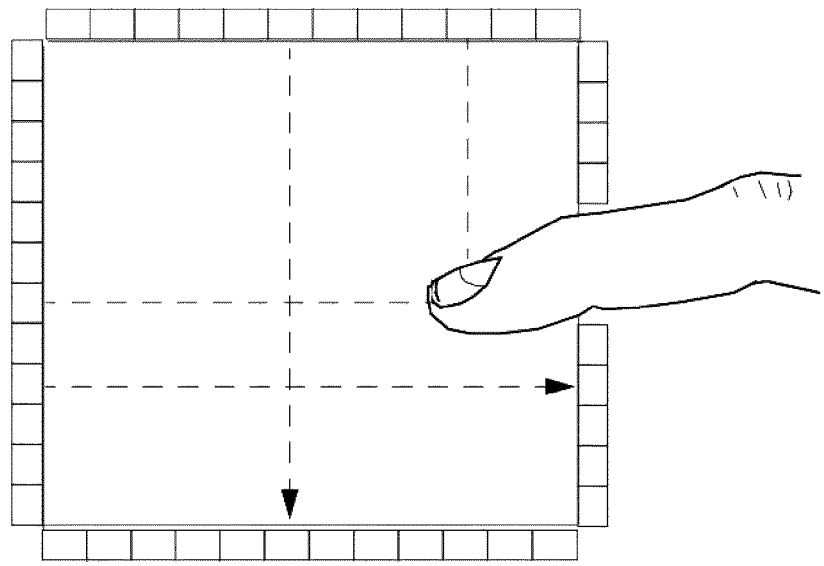
FIG. 13 depicts an implementation of an optical or acoustic diffraction or absorption arrangement that can be used for contact or pressure sensing of tactile contact.

FIG. 13 depicts an optical or acoustic diffraction or absorption arrangement that can be used for contact or pressure sensing of tactile contact. Such a system can employ, for example light or acoustic waves. In this class of methods and systems, contact with or pressure applied onto the touch surface causes disturbances (diffraction, absorption, reflection, etc.) that can be sensed in various ways. The light or acoustic waves can travel within a medium comprised by or in mechanical communication with the touch surface. A slight variation of this is where surface acoustic waves travel along the surface of, or interface with, a medium comprised by or in mechanical communication with the touch surface.

Compensation for Non-Ideal Behavior of Tactile Sensor Arrays

Individual sensor elements in a tactile sensor array produce measurements that vary sensor-by-sensor when presented with the same stimulus. Inherent statistical averaging of the algorithmic mathematics can damp out much of this, but for small image sizes (for example, as rendered by a small finger or light contact), as well as in cases where there are extremely large variances in sensor element behavior from sensor to sensor, the invention provides for each sensor to be individually calibrated in implementations where that can be advantageous. Sensor-by-sensor measurement value scaling, offset, and nonlinear warpings can be invoked for all or selected sensor elements during data acquisition scans. Similarly, the invention provides for individual noisy or defective sensors can be tagged for omission during data acquisition scans.

Figure 14:
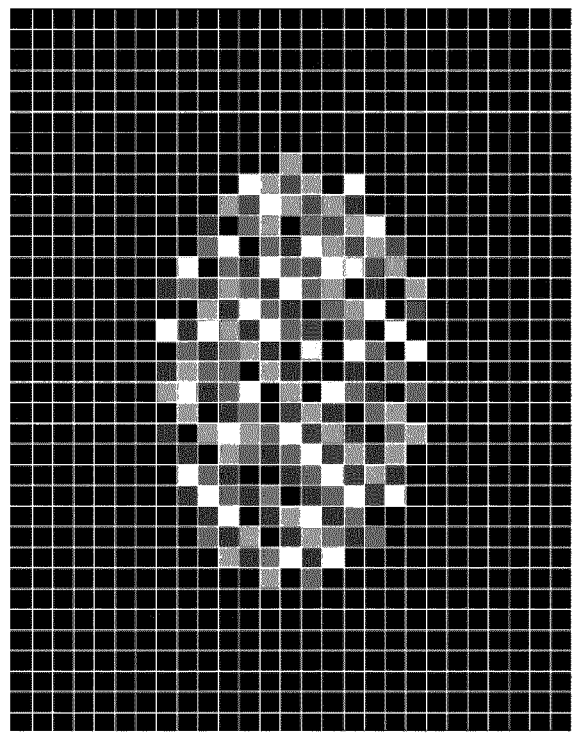
FIG. 14 shows a finger image wherein rather than a smooth gradient in pressure or proximity values there is radical variation due to non-uniformities in offset and scaling terms among the sensors.

FIG. 14 shows a finger image wherein rather than a smooth gradient in pressure or proximity values there is radical variation due to non-uniformities in offset and scaling terms among the sensors.

Figure 15:
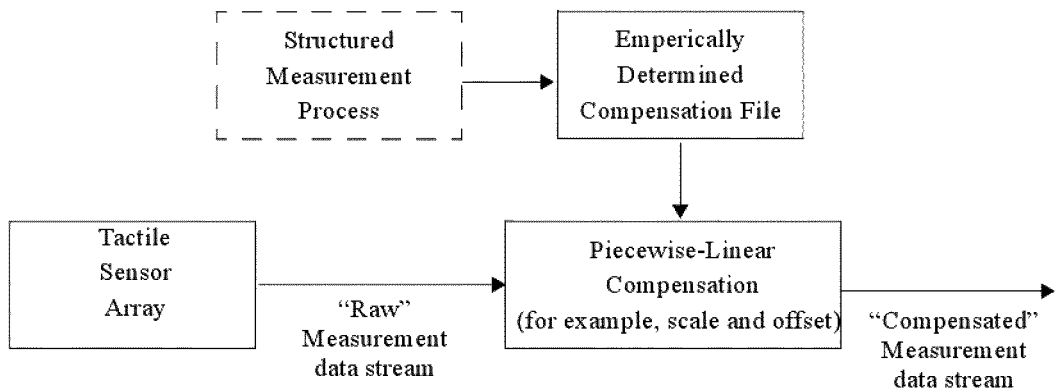
FIG. 15 shows a sensor-by-sensor compensation arrangement.

FIG. 15 shows a sensor-by-sensor compensation arrangement for such a situation. A structured measurement process applies a series of known mechanical stimulus values (for example uniform applied pressure, uniform simulated proximity, etc.) to the tactile sensor array and measurements are made for each sensor. Each measurement data point for each sensor is compared to what the sensor should read and a piecewise-linear correction is computed. In an embodiment, the coefficients of a piecewise-linear correction operation for each sensor element are stored in a file. As the raw data stream is acquired from the tactile sensor array, sensor-by-sensor the corresponding piecewise-linear correction coefficients are obtained from the file and used to invoke a piecewise-linear correction operation for each sensor measurement. The value resulting from this time-multiplexed series of piecewise-linear correction operations forms an outgoing "compensated" measurement data stream. Such an arrangement is employed, for example, as part of the aforementioned Tekscan resistive pressure sensor array products.

Figure 16:
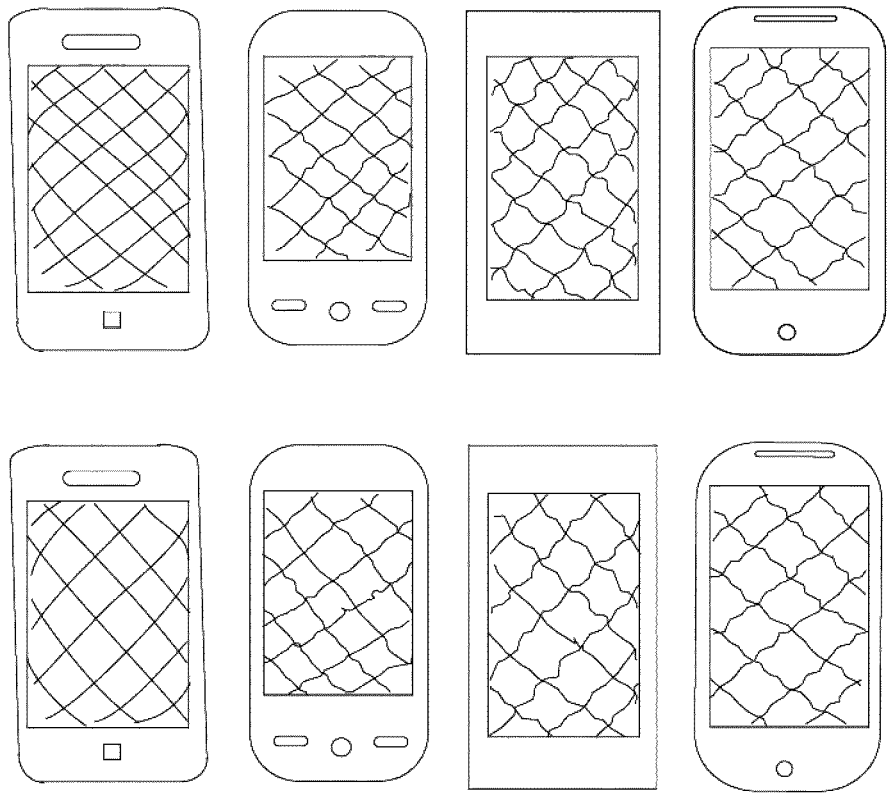
FIG. 16 (adapted from http://labs.moto.com/diy-touch-screen-analysis/) depicts the comparative performance of a group of contemporary handheld devices wherein straight lines were entered using the surface of the respective touch-screens.

Additionally, the macroscopic arrangement of sensor elements can introduce nonlinear spatial warping effects. As an example, various manufacturer implementations of capacitive proximity sensor arrays and associated interface electronics are known to comprise often dramatic nonlinear spatial warping effects. FIG. 16 (adapted from http://labs.moto.com/diy-touchscreen-analysis/) depicts the comparative performance of a group of contemporary handheld devices wherein straight lines were entered using the surface of the respective touchscreens. A common drawing program was used on each device, with widely-varying type and degrees of nonlinear spatial warping effects clearly resulting. For simple gestures such as selections, finger-flicks, drags, spreads, etc., such nonlinear spatial warping effects introduce little consequence. For more precision applications, such nonlinear spatial warping effects introduce unacceptable performance. Close study of FIG. 16 shows different types of responses to tactile stimulus in the direct neighborhood of the relatively widely-spaced capacitive sensing nodes versus tactile stimulus in the boundary regions between capacitive sensing nodes. Increasing the number of capacitive sensing nodes per unit area can reduce this, as can adjustments to the geometry of the capacitive sensing node conductors. In many cases improved performance can be obtained by introducing or more carefully implementing interpolation mathematics.

Types of Hand Contact Measurements and Features Provided by HDTP Technology

Figure 17A:
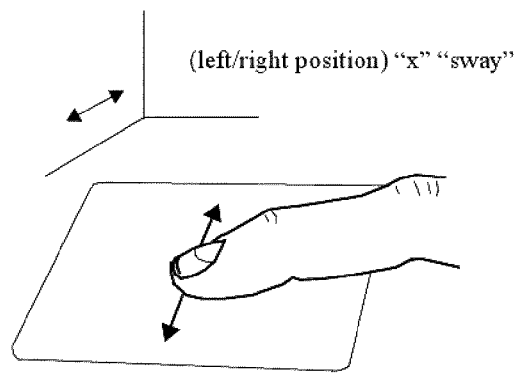
FIGS. 17a-17f illustrate the six independently adjustable degrees of freedom of touch from a single finger that can be simultaneously measured by the HDTP technology.
Figure 17D:
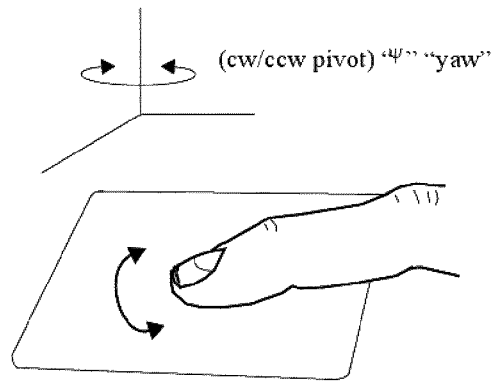
Figure 17B:
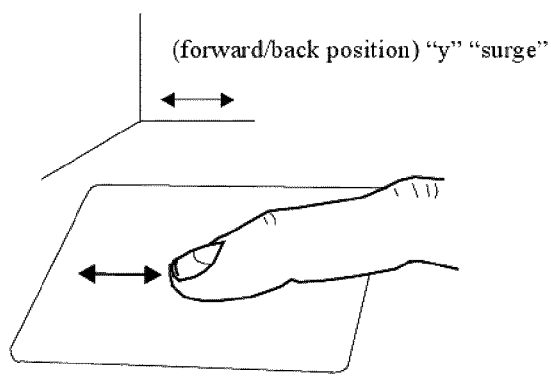
Figure 17E:
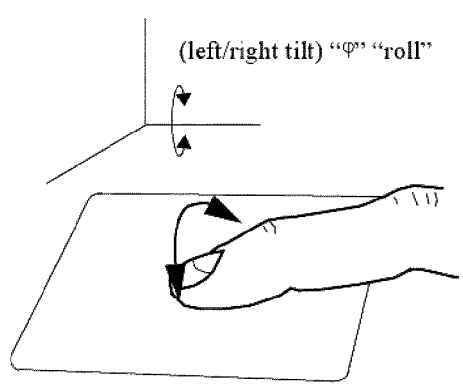
Figure 17C:
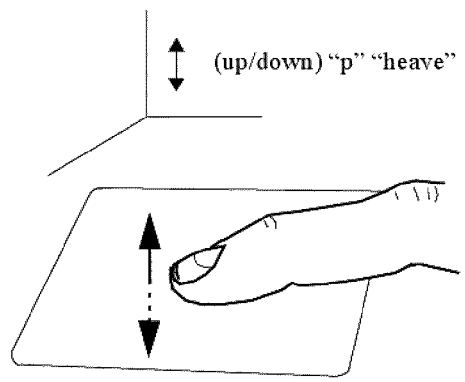
Figure 17F:
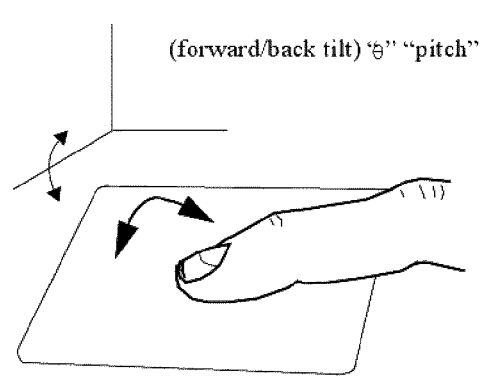

FIGS. 17a-17f (adapted from U.S. patent application Ser. No. 12/418,605 and described in U.S. Pat. No. 6,570,078) illustrate six independently adjustable degrees of freedom of touch from a single finger that can be simultaneously measured by the HDTP technology. The depiction in these figures is from the side of the touchpad. FIGS. 17*a*-17*c* show actions of positional change (amounting to applied pressure in the case of FIG. 17*c*) while FIGS. 17*d*-17*f* show actions of angular change. Each of these can be used to control a user interface parameter, allowing the touch of a single fingertip to control up to six simultaneously-adjustable quantities in an interactive user interface.

Each of the six parameters listed above can be obtained from operations on a collection of sums involving the geometric location and tactile measurement value of each tactile measurement sensor. Of the six parameters, the left-right geometric center, forward-back geometric center, and clockwise-counterclockwise yaw rotation can be obtained from binary threshold image data. The average downward pressure, roll, and pitch parameters are in some embodiments beneficially calculated from gradient (multi-level) image data. One remark is that because binary threshold image data is sufficient for the left-right geometric center, forward-back geometric center, and clockwise-counterclockwise yaw rotation parameters, these also can be discerned for flat regions of rigid non-pliable objects, and thus the HDTP technology thus can be adapted to discern these three parameters from flat regions with striations or indentations of rigid non-pliable objects.

These 'Position Displacement' parameters FIGS. 17*a*-17*c* can be realized by various types of unweighted averages computed across the blob of one or more of each the geometric location and tactile measurement value of each above-threshold measurement in the tactile sensor image. The pivoting rotation can be calculated from a least-squares slope which in turn involves sums taken across the blob of one or more of each the geometric location and the tactile measurement value of each active cell in the image; alternatively a high-performance adapted eigenvector method taught in co-pending provisional patent application U.S. Ser. No. 12/724,413 "High-Performance Closed-Form Single-Scan Calculation of Oblong-Shape Rotation Angles from Binary Images of Arbitrary Size Using Running Sums," filed Mar. 14, 2009, can be used. The last two angle ("tilt") parameters, pitch and roll, can be realized by performing calculations on various types of weighted averages as well as a number of other methods.

Figure 18:
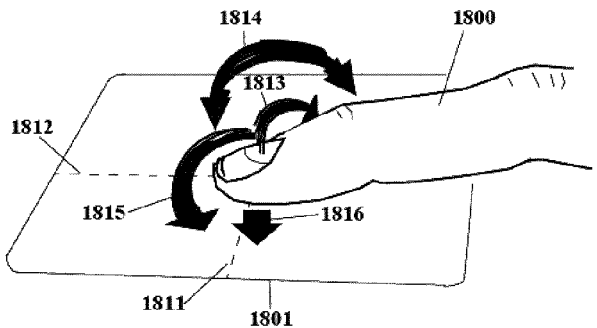
FIG. 18 suggests general ways in which two or more of these independently adjustable degrees of freedom adjusted at once.

Each of the six parameters portrayed in FIGS. 17*a*-17*f* can be measured separately and simultaneously in parallel. FIG. 18 (adapted from U.S. Pat. No. 6,570,078) suggests general ways in which two or more of these independently adjustable degrees of freedom adjusted at once.

Figure 19:
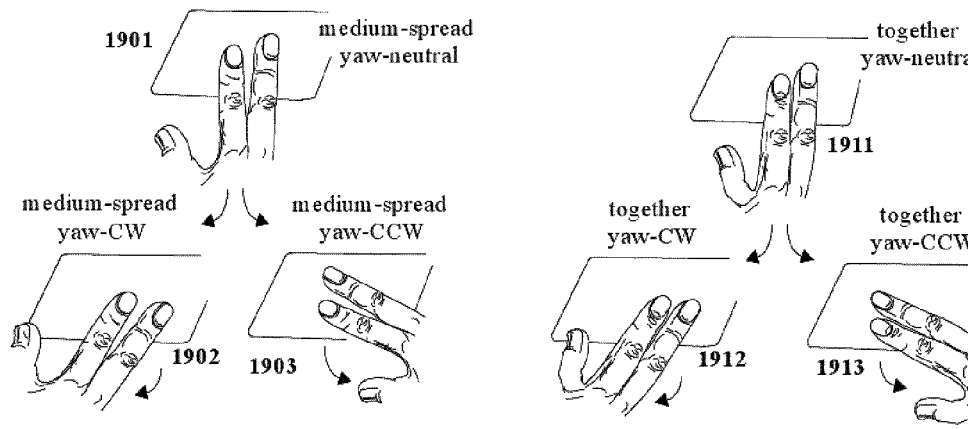
FIG. 19 demonstrates a few two-finger multi-touch postures or gestures from the many that can be readily recognized by HTDP technology.
Figure 19:
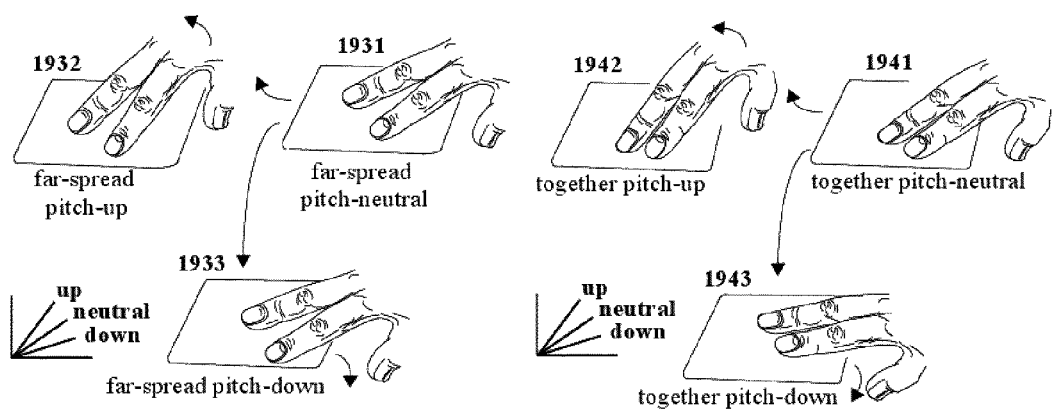

The HDTP technology provides for multiple points of contact, these days referred to as "multi-touch." FIG. 19 (adapted from U.S. patent application Ser. No. 12/418,605 and described in U.S. Pat. No. 6,570,078) demonstrates a few two-finger multi-touch postures or gestures from the hundreds that can be readily recognized by HTDP technology. HTDP technology can also be configured to recognize and measure postures and gestures involving three or more fingers, various parts of the hand, the entire hand, multiple hands, etc. Accordingly, the HDTP technology can be configured to measure areas of contact separately, recognize shapes, fuse measures or pre-measurement data so as to create aggregated measurements, and other operations.

Figure 20:
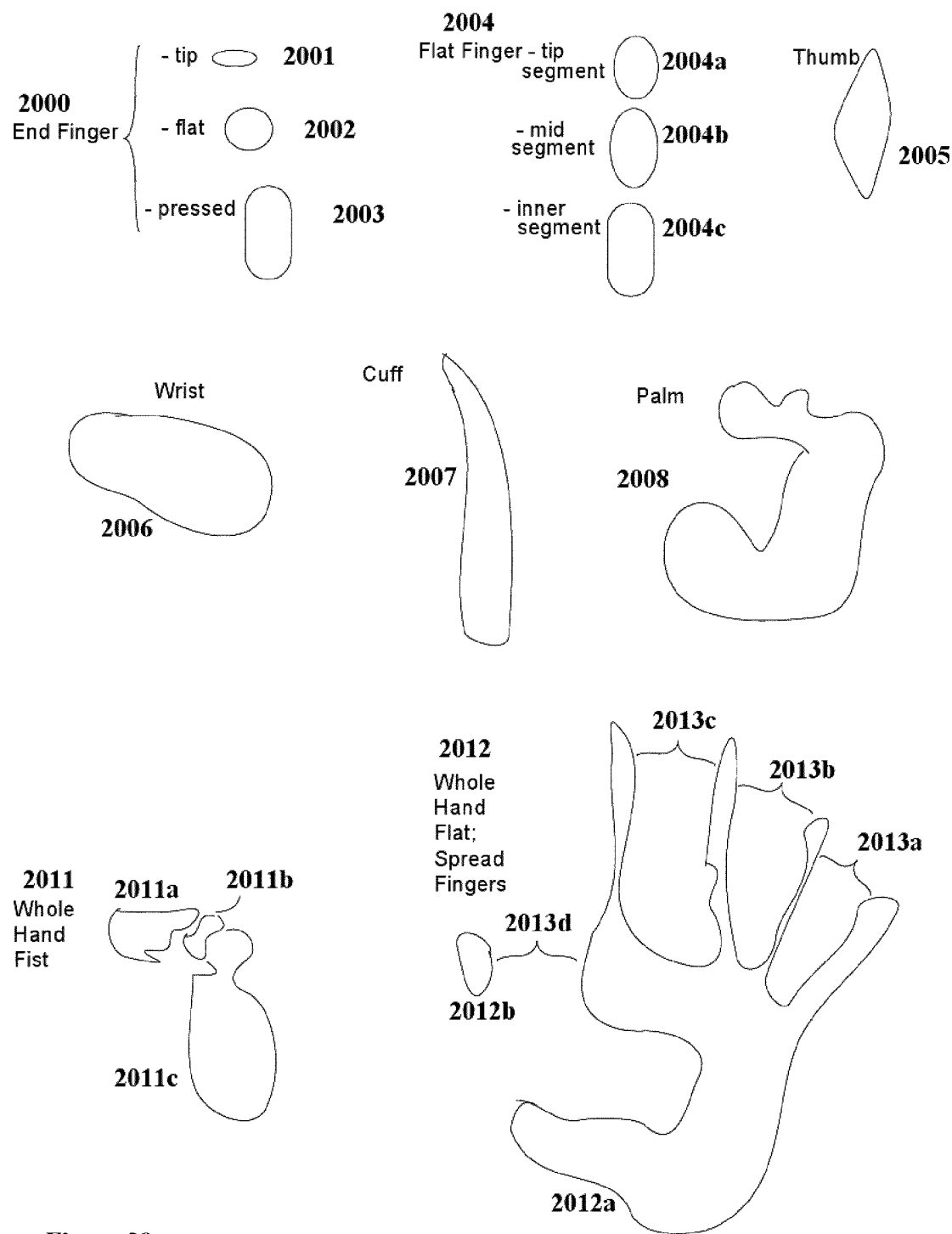
FIG. 20 illustrates the pressure profiles for a number of example hand contacts with a pressure-sensor array.

By way of example, FIG. 20 (adapted from U.S. Pat. No. 6,570,078) illustrates the pressure profiles for a number of example hand contacts with a pressure-sensor array. In the case 2000 of a finger's end, pressure on the touch pad pressure-sensor array can be limited to the finger tip, resulting in a spatial pressure distribution profile 2001; this shape does not change much as a function of pressure. Alternatively, the finger can contact the pad with its flat region, resulting in light pressure profiles 2002 which are smaller in size than heavier pressure profiles 2003. In the case 2004 where the entire finger touches the pad, a three-segment pattern (2004*a*, 2004*b*, 2004*c*) will result under many conditions; under light pressure a two segment pattern (2004*b* or 2004*c* missing) could result. In all but the lightest pressures the thumb makes a somewhat discernible shape 2005 as do the wrist 2006, edge-of-hand "cuff" 2007, and palm 2008; at light pressures these patterns thin and can also break into disconnected regions. Whole hand patterns such the fist 2011 and flat hand 2012 have more complex shapes. In the case of the fist 2011, a degree of curl can be discerned from the relative geometry and separation of sub-regions (here depicted, as an example, as 2011*a*, 2011*b*, and 2011*c*). In the case of the whole flat hand 2000, there can be two or more sub-regions which can be in fact joined (as within 2012*a*) or disconnected (as an example, as 2012*a* and 2012*b* are); the whole hand also affords individual measurement of separation "angles" among the digits and thumb (2013*a*, 2013*b*, 2013*c*, 2013*d*) which can easily be varied by the user.

Figure 21:
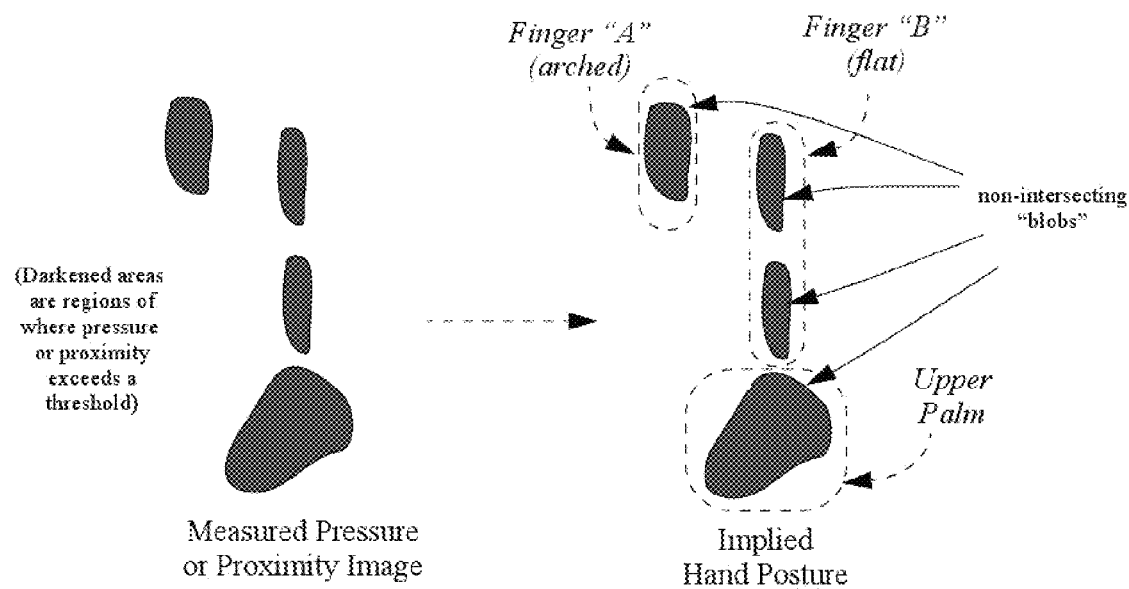
FIG. 21 depicts one of a wide range of tactile sensor images that can be measured by using more of the human hand

HDTP technology robustly provides feature-rich capability for tactile sensor array contact with two or more fingers, with other parts of the hand, or with other pliable (and for some parameters, non-pliable) objects. In one embodiment, one finger on each of two different hands can be used together to at least double number of parameters that can be provided. Additionally, new parameters particular to specific hand contact configurations and postures can also be obtained. By way of example, FIG. 21 (adapted from U.S. patent application Ser. No. 12/418,605 and described in U.S. Pat. No. 6,570,078) depicts one of a wide range of tactile sensor images that can be measured by using more of the human hand. U.S. Pat. No. 6,570,078 and pending U.S. patent application Ser. No. 11/761,978 provide additional detail on use of other parts of hand. Within the context of the example of FIG. 21:

multiple fingers can be used with the tactile sensor array, with or without contact by other parts of the hand;

The whole hand can be tilted & rotated;

The thumb can be independently rotated in yaw angle with respect to the yaw angle held by other fingers of the hand;

Selected fingers can be independently spread, flatten, arched, or lifted;

The palms and wrist cuff can be used;

Shapes of individual parts of the hand and combinations of them can be recognized.

Selected combinations of such capabilities can be used to provide an extremely rich pallet of primitive control signals that can be used for a wide variety of purposes and applications.

Other HDTP Processing, Signal Flows, and Operations

In order to accomplish this range of capabilities, HDTP technologies must be able to parse tactile images and perform operations based on the parsing. In general, contact between the tactile-sensor array and multiple parts of the same hand forfeits some degrees of freedom but introduces others. For example, if the end joints of two fingers are pressed against the sensor array as in FIG. 21, it will be difficult or impossible to induce variations in the image of one of the end joints in six different dimensions while keeping the image of the other end joints fixed. However, there are other parameters that can be varied, such as the angle between two fingers, the difference in coordinates of the finger tips, and the differences in pressure applied by each finger.

In general, compound images can be adapted to provide control over many more parameters than a single contiguous image can. For example, the two-finger postures considered above can readily pro-vide a nine-parameter set relating to the pair of fingers as a separate composite object adjustable within an ergonomically comfortable range. One example nine-parameter set the two-finger postures consider above is:

composite average x position;
inter-finger differential x position;
composite average y position;
inter-finger differential y position;
composite average pressure;
inter-finger differential pressure;
composite roll;
composite pitch;
composite yaw.

As another example, by using the whole hand pressed flat against the sensor array including the palm and wrist, it is readily possible to vary as many as sixteen or more parameters independently of one another. A single hand held in any of a variety of arched or partially-arched postures provides a very wide range of postures that can be recognized and parameters that can be calculated.

When interpreted as a compound image, extracted parameters such as geometric center, average downward pressure, tilt (pitch and roll), and pivot (yaw) can be calculated for the entirety of the asterism or constellation of smaller blobs. Additionally, other parameters associated with the asterism or constellation can be calculated as well, such as the aforementioned angle of separation between the fingers. Other examples include the difference in downward pressure applied by the two fingers, the difference between the left-right ("x") centers of the two fingertips, and the difference between the two forward-back ("y") centers of the two fingertips. Other compound image parameters are possible and are provided by H DTP technology.

There are number of ways for implementing the handling of compound posture data images. Two contrasting examples are depicted in FIGS. 22a-22b (adapted from U.S. patent application Ser. No. 12/418,605) although many other possibilities exist and are provided for by the invention. In the embodiment of FIG. 22a, tactile image data is examined for the number "M" of isolated blobs ("regions") and the primitive running sums are calculated for each blob. This can be done, for example, with the algorithms described earlier. Post-scan calculations can then be performed for each blob, each of these producing an extracted parameter set (for example, x position, y position, average pressure, roll, pitch, yaw) uniquely associated with each of the M blobs ("regions"). The total number of blobs and the extracted parameter sets are directed to a compound image parameter mapping function to produce various types of outputs, including:

Shape classification (for example finger tip, first-joint flat finger, two-joint flat finger, three joint-flat finger, thumb, palm, wrist, compound two-finger, compound three-finger, composite 4-finger, whole hand, etc.);
Composite parameters (for example composite x position, composite y position, composite average pressure, composite roll, composite pitch, composite yaw, etc.);
Differential parameters (for example pair-wise inter-finger differential x position, pair-wise inter-finger differential y position, pair-wise inter-finger differential pressure, etc.);
Additional parameters (for example, rates of change with respect to time, detection that multiple finger images involve multiple hands, etc.).

FIG. 22b depicts an alternative embodiment, tactile image data is examined for the number M of isolated blobs ("regions") and the primitive running sums are calculated for each blob, but this information is directed to a multi-regional tactile image parameter extraction stage. Such a stage can include, for example, compensation for minor or major ergonomic interactions among the various degrees of postures of the hand. The resulting compensation or otherwise produced extracted parameter sets (for example, x position, y position, average pressure, roll, pitch, yaw) uniquely associated with each of the M blobs and total number of blobs are directed to a compound image parameter mapping function to produce various types of outputs as described for the arrangement of FIG. 22a.

Additionally, embodiments of the invention can be set up to recognize one or more of the following possibilities:

Single contact regions (for example a finger tip);
Multiple independent contact regions (for example multiple fingertips of one or more hands);
Fixed-structure ("constellation") compound regions (for example, the palm, multiple-joint finger contact as with a flat finger, etc.);
Variable-structure ("asterism") compound regions (for example, the palm, multiple-joint finger contact as with a flat finger, etc.).

Embodiments that recognize two or more of these possibilities can further be able to discern and process combinations of two more of the possibilities.

Figure 22C:
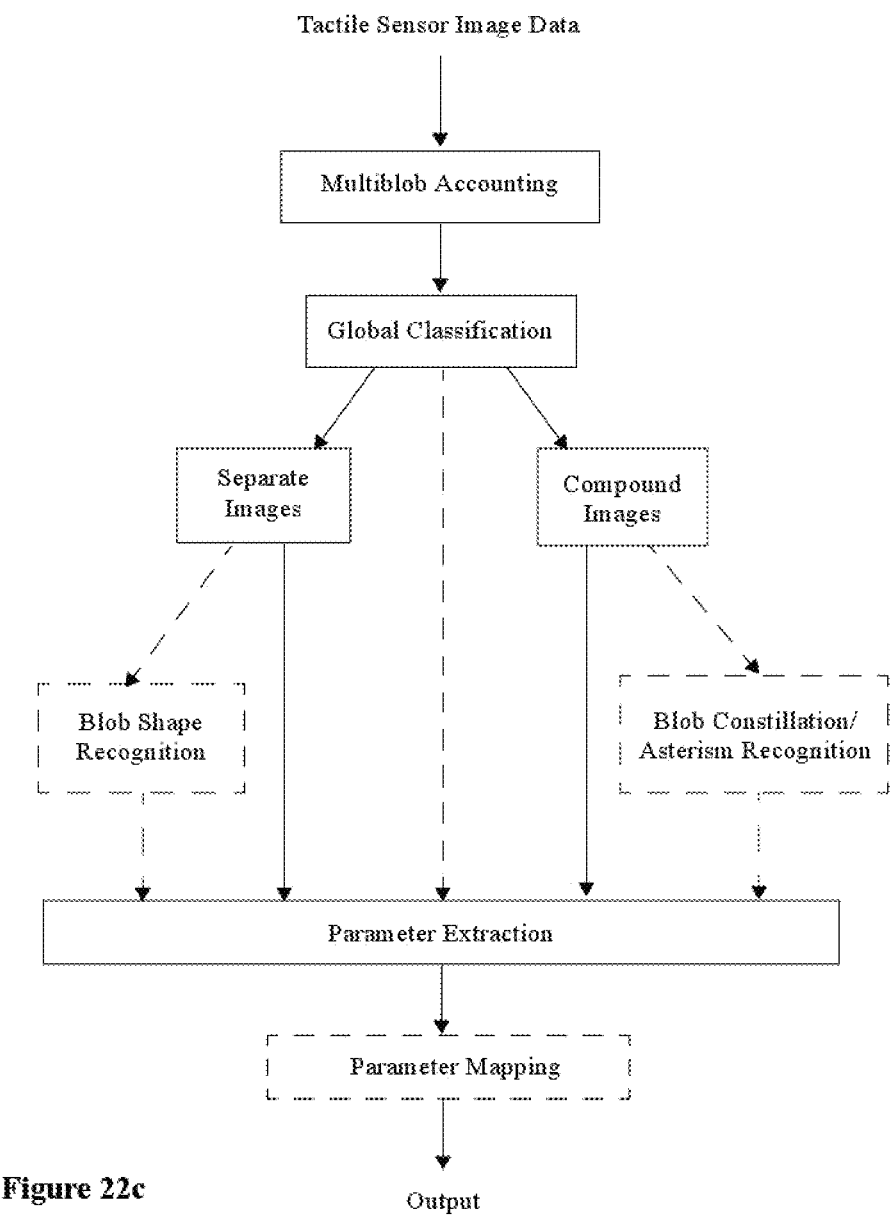

FIG. 22c (adapted from U.S. patent application Ser. No. 12/418,605) depicts a simple system for handling one, two, or more of the above listed possibilities, individually or in combination. In the general arrangement depicted, tactile sensor image data is analyzed (for example, in the ways described earlier) to identify and isolate image data associated with distinct blobs. The results of this multiple-blob accounting is directed to one or more global classification functions set up to effectively parse the tactile sensor image data into individual separate blob images or individual compound images. Data pertaining to these individual separate blob or compound images are passed on to one or more parallel or serial parameter extraction functions. The one or more parallel or serial parameter extraction functions can also be provided information directly from the global classification function(s). Additionally, data pertaining to these individual separate blob or compound images are passed on to additional image recognition function(s), the output of which can also be provided to one or more parallel or serial parameter extraction function(s). The output(s) of the parameter extraction function(s) can then be either used directly, or first processed further by parameter mapping functions. Clearly other implementations are also possible to one skilled in the art and these are provided for by the invention.

Refining of the HDTP User Experience

As an example of user-experience correction of calculated parameters, it is noted that placement of hand and wrist at a sufficiently large yaw angle can affect the range of motion of tilting. As the rotation angle increases in magnitude, the range of tilting motion decreases as mobile range of human wrists gets restricted. The invention provides for compensation for the expected tilt range variation as a function of measured yaw rotation angle. An embodiment is depicted in the middle portion of FIG. 23 (adapted from U.S. patent application Ser. No. 12/418,605). As another example of user-experience correction of calculated parameters, the user and application can interpret the tilt measurement in a variety of ways. In one variation for this example, tilting the finger can be interpreted as changing an angle of an object, control dial, etc. in an application. In another variation for this example, tilting the finger can be interpreted by an application as changing the position of an object within a plane, shifting the position of one or more control sliders, etc. Typically each of these interpretations would require the application of at least linear, and typically nonlinear, mathematical transformations so as to obtain a matched user experience for the selected metaphor interpretation of tilt. In one embodiment, these mathematical transformations can be performed as illustrated in the lower portion of FIG. 23. The invention provides for embodiments with no, one, or a plurality of such metaphor interpretation of tilt.

Figure 24A:
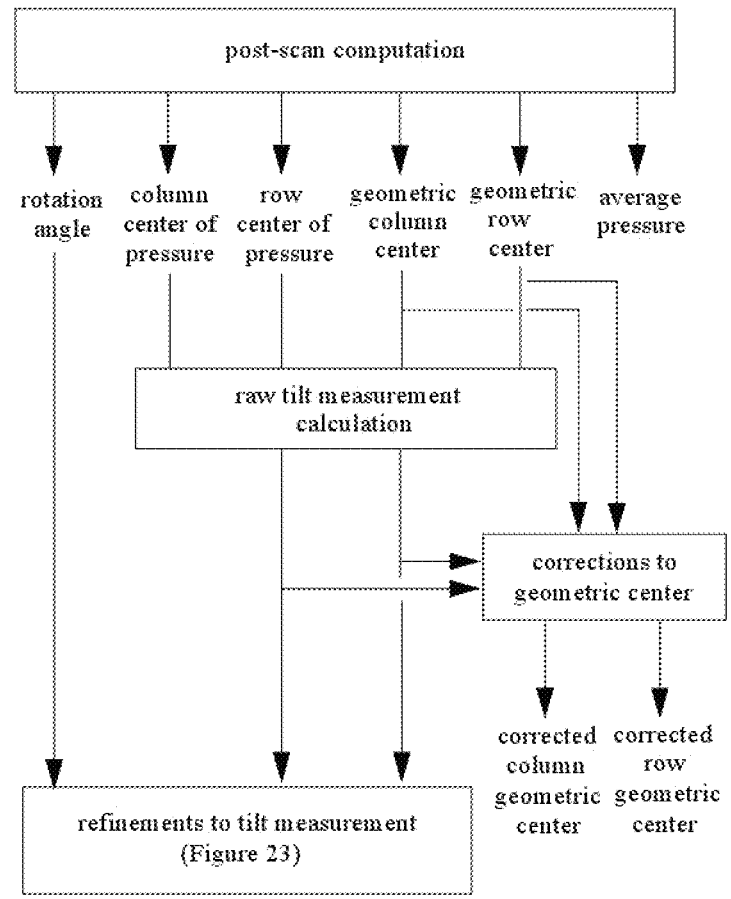
FIG. 24a depicts an embodiment wherein the raw tilt measurement is used to make corrections to the geometric center measurement under at least conditions of varying the tilt of the finger.
Figure 24B:
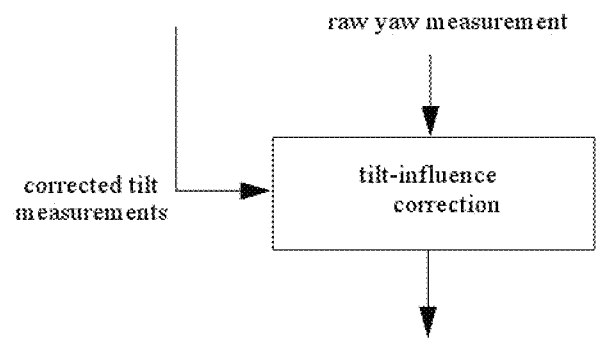
FIG. 24b depicts an embodiment for yaw angle compensation in systems and situations wherein the yaw measurement is sufficiently affected by tilting of the finger.

As the finger is tilted to the left or right, the shape of the area of contact becomes narrower and shifts away from the center to the left or right. Similarly as the finger is tilted forward or backward, the shape of the area of contact becomes shorter and shifts away from the center forward or backward. For a better user experience, the invention provides for embodiments to include systems and methods to compensate for these effects (i.e. for shifts in blob size, shape, and center) as part of the tilt measurement portions of the implementation. Additionally, the raw tilt measures can also typically be improved by additional processing. FIG. 24a (adapted from U.S. patent application Ser. No. 12/418,605) depicts an embodiment wherein the raw tilt measurement is used to make corrections to the geometric center measurement under at least conditions of varying the tilt of the finger. Additionally, the invention provides for yaw angle compensation for systems and situations wherein the yaw measurement is sufficiently affected by tilting of the finger. An embodiment of this correction in the data flow is shown in FIG. 24b (adapted from U.S. patent application Ser. No. 12/418,605).

Additional HDTP Processing, Signal Flows, and Operations

Figure 25:
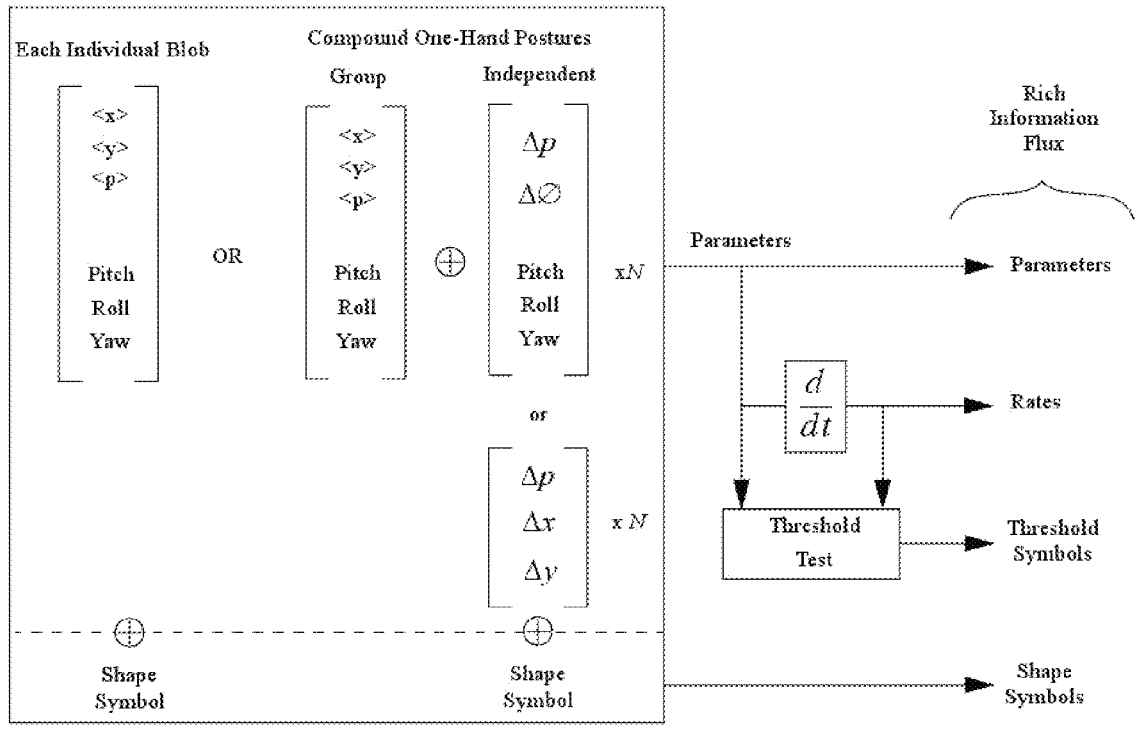
FIG. 25 shows an arrangement wherein raw measurements of the six quantities of FIGS. 17a-17f, together with multitouch parsing capabilities and shape recognition for distinguishing contact with various parts of the hand and the touchpad can be used to create a rich information flux of parameters, rates, and symbols.

FIG. 25 (adapted from U.S. patent application Ser. No. 12/418,605 and described in U.S. Pat. No. 6,570,078) shows an example of how raw measurements of the six quantities of FIGS. 17a-17f, together with shape recognition for distinguishing contact with various parts of hand and touchpad, can be used to create a rich information flux of parameters, rates, and symbols.

Figure 26:
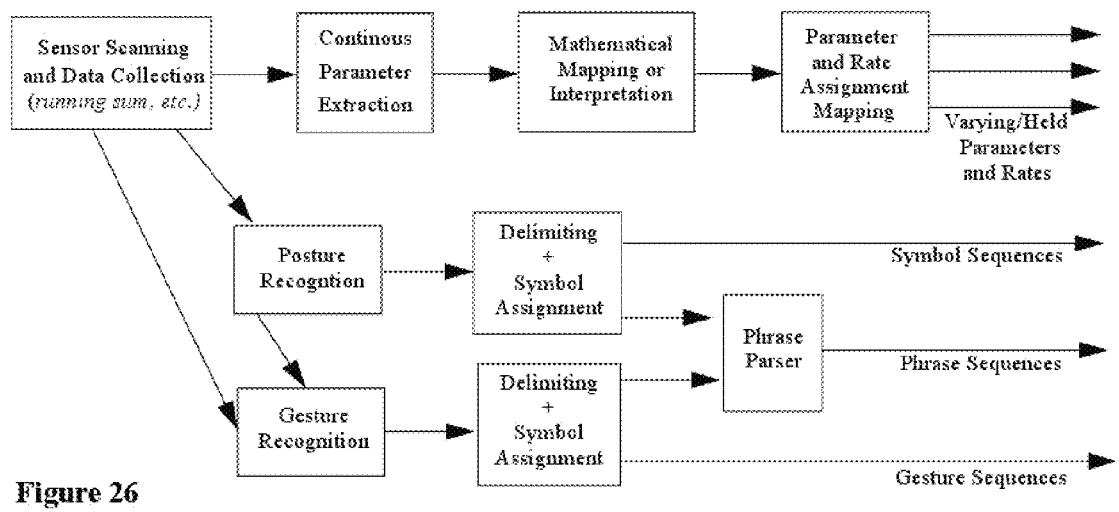
FIG. 26 shows an approach for incorporating posture recognition, gesture recognition, state machines, and parsers to create an even richer human/machine tactile interface system capable of incorporating syntax and grammars.

FIG. 26 (adapted from U.S. patent application Ser. No. 12/418,605 and described in U.S. Pat. No. 6,570,078) shows an approach for incorporating posture recognition, gesture recognition, state machines, and parsers to create an even richer human/machine tactile interface system capable of incorporating syntax and grammars.

Figure 27C:
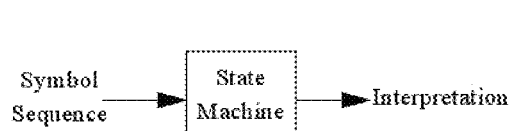
Figure 27C:
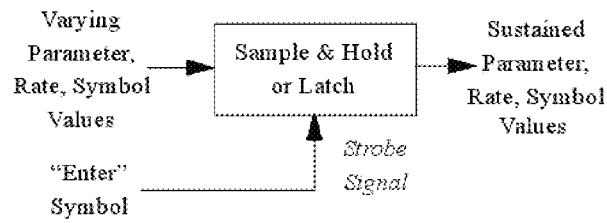
Figure 27C:
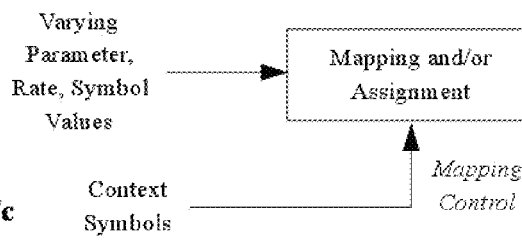
Figure 27D:
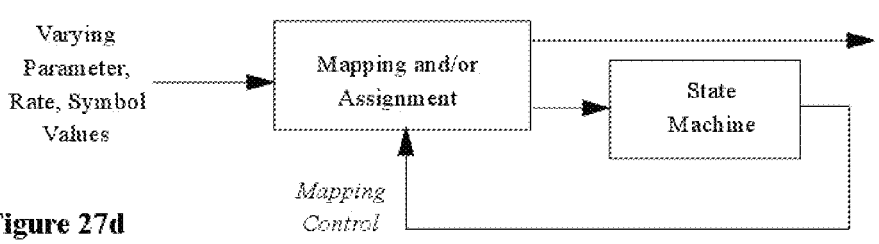

The HDTP affords and provides for yet further capabilities. For example, sequence of symbols can be directed to a state machine, as shown in FIG. 27a (adapted from U.S. patent application Ser. No. 12/418,605 and described in U.S. Pat. No. 6,570,078), to produce other symbols that serve as interpretations of one or more possible symbol sequences. In an embodiment, one or more symbols can be designated the meaning of an "Enter" key, permitting for sampling one or more varying parameter, rate, and symbol values and holding the value(s) until, for example, another "Enter" event, thus producing sustained values as illustrated in FIG. 27b (adapted from U.S. patent application Ser. No. 12/418,605 and described in U.S. Pat. No. 6,570,078). In an embodiment, one or more symbols can be designated as setting a context for interpretation or operation and thus control mapping or assignment operations on parameter, rate, and symbol values as shown in FIG. 27c (adapted from U.S. patent application Ser. No. 12/418,605 and described in U.S. Pat. No. 6,570,078). The operations associated with FIGS. 27a-27c can be combined to provide yet other capabilities. For example, the arrangement of FIG. 26d shows mapping or assignment operations that feed an interpretation state machine which in turn controls mapping or assignment operations. In implementations where context is involved, such as in arrangements such as those depicted in FIGS. 27b-27d, the invention provides for both context-oriented and context-free production of parameter, rate, and symbol values. The parallel production of context-oriented and context-free values can be useful to drive multiple applications simultaneously, for data recording, diagnostics, user feedback, and a wide range of other uses.

Figure 28:
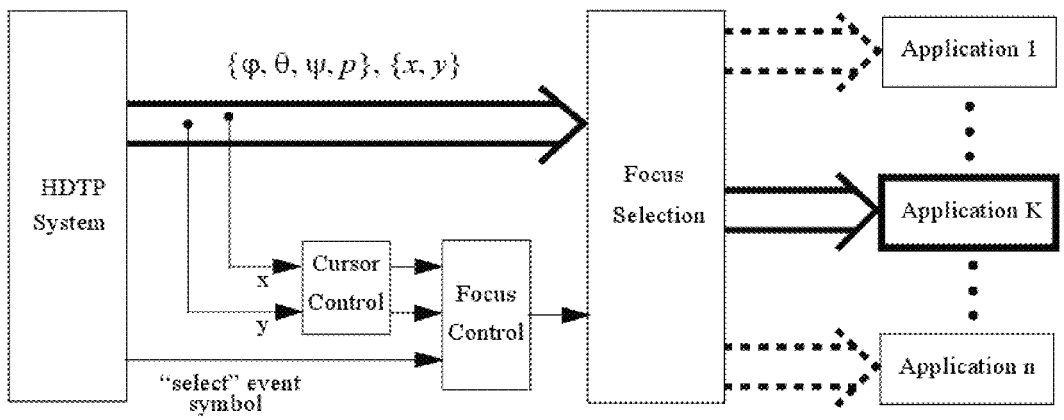
FIG. 28 depicts a user interface input arrangement incorporating one or more HDTPs that provides user interface input event and quantity routing.

FIG. 28 (adapted from U.S. patent application Ser. Nos. 12/502,230 and 13/026,097) depicts a user arrangement incorporating one or more HDTP system(s) or subsystem(s) that provide(s) user interface input event and routing of HDTP produced parameter values, rate values, symbols, etc. to a variety of applications. In an embodiment, these parameter values, rate values, symbols, etc. can be produced for example by utilizing one or more of the individual systems, individual methods, and individual signals described above in conjunction with the discussion of FIGS. 25, 26, and 27a-27b. As discussed later, such an approach can be used with other rich multiparameter user interface devices in place of the HDTP. The arrangement of FIG. 27 is taught in pending U.S. patent application Ser. No. 12/502,230 "Control of Computer Window Systems, Computer Applications, and Web Applications via High Dimensional Touchpad User Interface" and FIG. 28 is adapted from FIG. 6e of pending U.S. patent application Ser. No. 12/502,230 for use here. Some aspects of this (in the sense of general workstation control) is anticipated in U.S. Pat. No. 6,570,078 and further aspects of this material are taught in pending U.S. patent application Ser. No. 13/026,097 "Window Manger Input Focus Control for High Dimensional Touchpad (HDTP), Advanced Mice, and Other Multidimensional User Interfaces."

In an arrangement such as the one of FIG. 28, or in other implementations, at least two parameters are used for navigation of the cursor when the overall interactive user interface system is in a mode recognizing input from cursor control. These can be, for example, the left-right ("x") parameter and forward/back ("y") parameter provided by the touchpad. The arrangement of FIG. 28 includes an implementation of this.

Alternatively, these two cursor-control parameters can be provided by another user interface device, for example another touchpad or a separate or attached mouse.

In some situations, control of the cursor location can be implemented by more complex means. One example of this would be the control of location of a 3D cursor wherein a third parameter must be employed to specify the depth coordinate of the cursor location. For these situations, the arrangement of FIG. 28 would be modified to include a third parameter (for use in specifying this depth coordinate) in addition to the left-right ("x") parameter and forward/back ("y") parameter described earlier.

Focus control is used to interactively routing user interface signals among applications. In most current systems, there is at least some modality wherein the focus is determined by either the current cursor location or a previous cursor location when a selection event was made. In the user experience, this selection event typically involves the user interface providing an event symbol of some type (for example a mouse click, mouse double-click touchpad tap, touchpad double-tap, etc). The arrangement of FIG. 28 includes an implementation wherein a select event generated by the touchpad system is directed to the focus control element. The focus control element in this arrangement in turn controls a focus selection element that directs all or some of the broader information stream from the HDTP system to the currently selected application. (In FIG. 28, "Application K" has been selected as indicated by the thick-lined box and information-flow arrows.)

In some embodiments, each application that is a candidate for focus selection provides a window displayed at least in part on the screen, or provides a window that can be deiconified from an icon tray or retrieved from beneath other windows that can be obfuscating it. In some embodiments, if the background window is selected, focus selection element that directs all or some of the broader information stream from the HDTP system to the operating system, window system, and features of the background window. In some embodiments, the background window can be in fact regarded as merely one of the applications shown in the right portion of the arrangement of FIG. 28. In other embodiments, the background window can be in fact regarded as being separate from the applications shown in the right portion of the arrangement of FIG. 28. In this case the routing of the broader information stream from the HDTP system to the operating system, window system, and features of the background window is not explicitly shown in FIG. 28.

Use of the Additional HDTP Parameters by Applications

The types of human-machine geometric interaction between the hand and the HDTP facilitate many useful applications within a visualization environment. A few of these include control of visualization observation viewpoint location, orientation of the visualization, and controlling fixed or selectable ensembles of one or more of viewing parameters, visualization rendering parameters, pre-visualization operations parameters, data selection parameters, simulation control parameters, etc. As one example, the 6D orientation of a finger can be naturally associated with visualization observation viewpoint location and orientation, location and orientation of the visualization graphics, etc. As another example, the 6D orientation of a finger can be naturally associated with a vector field orientation for introducing synthetic measurements in a numerical simulation.

As another example, at least some aspects of the 6D orientation of a finger can be naturally associated with the orientation of a robotically positioned sensor providing actual measurement data. As another example, the 6D orientation of a finger can be naturally associated with an object location and orientation in a numerical simulation. As another example, the large number of interactive parameters can be abstractly associated with viewing parameters, visualization rendering parameters, pre-visualization operations parameters, data selection parameters, numeric simulation control parameters, etc.

In yet another example, the x and y parameters provided by the HDTP can be used for focus selection and the remaining parameters can be used to control parameters within a selected GUI.

In still another example, x and y parameters provided by the HDTP can be regarded as a specifying a position within an underlying base plane and the roll and pitch angles can be regarded as a specifying a position within a superimposed parallel plane. In a first extension of the previous two-plane example, the yaw angle can be regarded as the rotational angle between the base and superimposed planes. In a second extension of the previous two-plane example, the finger pressure can be employed to determine the distance between the base and superimposed planes. In a variation of the previous two-plane example, the base and superimposed plane are not fixed parallel but rather intersect in an angle responsive to the finger yaw angle. In each example, either or both of the two planes can represent an index or indexed data, a position, a pair of parameters, etc. of a viewing aspect, visualization rendering aspect, pre-visualization operations, data selection, numeric simulation control, etc.

A large number of additional approaches are possible as is appreciated by one skilled in the art. These are provided for by the invention.

Support for Additional Parameters Via Browser Plug-Ins

The additional interactively-controlled parameters provided by the HDTP provide more than the usual number supported by conventional browser systems and browser networking environments. This can be addressed in a number of ways. The following examples of HDTP arrangements for use with browsers and servers are taught in pending U.S. patent application Ser. No. 12/875,119 entitled "Data Visualization Environment with Dataflow Processing, Web, Collaboration, High-Dimensional User Interfaces, Spreadsheet Visualization, and Data Sonification Capabilities."

Figure 29A:
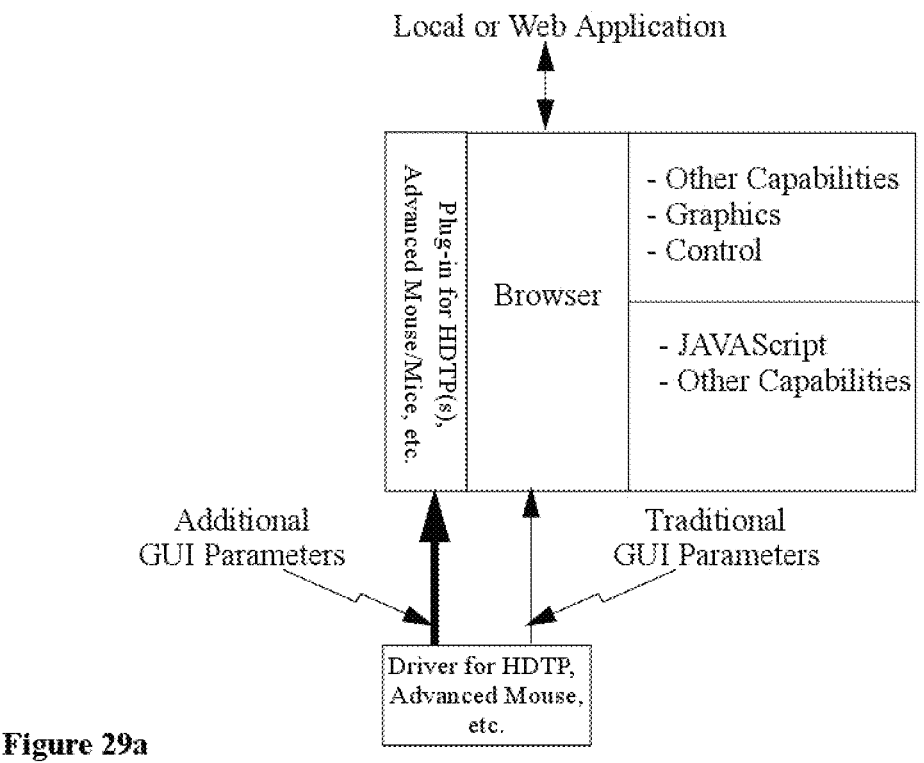
FIGS. 29a-29c depict methods for interfacing the HDTP with a browser.

In a first approach, an HDTP interfaces with a browser both in a traditional way and additionally via a browser plug-in. Such an arrangement can be used to capture the additional user interface input parameters and pass these on to an application interfacing to the browser. An example of such an arrangement is depicted in FIG. 29a.

Figure 29B:
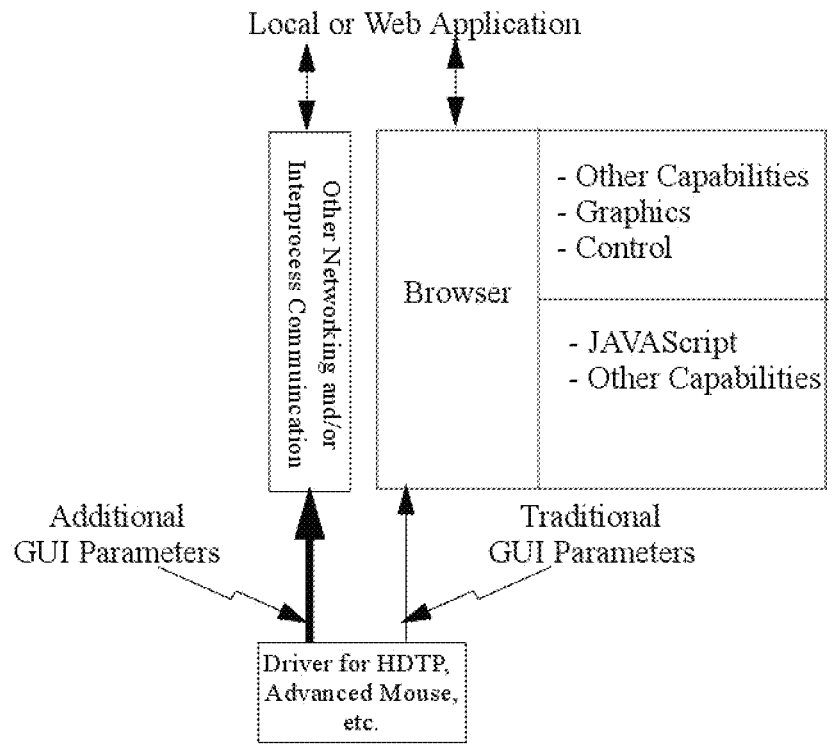

In a second approach, an HDTP interfaces with a browser in a traditional way and directs additional GUI parameters though other network channels. Such an arrangement can be used to capture the additional user interface input parameters and pass these on to an application interfacing to the browser. An example of such an arrangement is depicted in FIG. 29b.

Figure 29C:
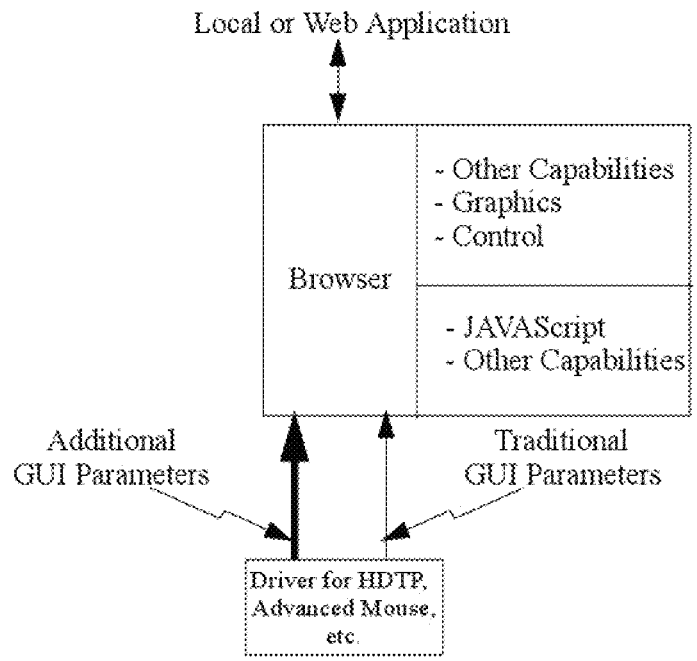

In a third approach, an HDTP interfaces all parameters to the browser directly. Such an arrangement can be used to capture the additional user interface input parameters and pass these on to an application interfacing to the browser. An example of such an arrangement is depicted in FIG. 29c.

The browser can interface with local or web-based applications that drive the visualization and control the data source(s), process the data, etc. The browser can be provided with client-side software such as JAVA Script or other alternatives. The browser can provide also be configured advanced graphics to be rendered within the browser display environment, allowing the browser to be used as a viewer for data visualizations, advanced animations, etc., leveraging the additional multiple parameter capabilities of the HDTP. The browser can interface with local or web-based applications that drive the advanced graphics. In an embodiment, the browser can be provided with Simple Vector Graphics ("SVG") utilities (natively or via an SVG plug-in) so as to render basic 2D vector and raster graphics. In another embodiment, the browser can be provided with a 3D graphics capability, for example via the Cortona 3D browser plug-in.

Multiple Parameter Extensions to Traditional Hypermedia Objects

As taught in pending U.S. patent application Ser. No. 13/026,248 entitled "Enhanced Roll-Over, Button, Menu, Slider, and Hyperlink Environments for High Dimensional Touchpad (HTPD), other Advanced Touch User Interfaces, and Advanced Mice", the HDTP can be used to provide extensions to the traditional and contemporary hyperlink, roll-over, button, menu, and slider functions found in web browsers and hypermedia documents leveraging additional user interface parameter signals provided by an HTPD. Such extensions can include, for example:

In the case of a hyperlink, button, slider and some menu features, directing additional user input into a hypermedia "hotspot" by clicking on it;

In the case of a roll-over and other menu features: directing additional user input into a hypermedia "hotspot" simply from cursor overlay or proximity (i.e., without clicking on it);

The resulting extensions will be called "Multiparameter Hypermedia Objects" ("MHOs").

Potential uses of the MHOS and more generally extensions provided for by the invention include:

Using the additional user input to facilitate a rapid and more detailed information gathering experience in a low-barrier sub-session;

Potentially capturing notes from the sub-session for future use;

Potentially allowing the sub-session to retain state (such as last image displayed);

Leaving the hypermedia "hotspot" without clicking out of it.

A number of user interface metaphors can be employed in the invention and its use, including one or more of:

Creating a pop-up visual or other visual change responsive to the rollover or hyperlink activation;

Rotating an object using rotation angle metaphors provided by the APD;

Rotating a user-experience observational viewpoint using rotation angle metaphors provided by the APD, for example, as described in pending U.S. patent application Ser. No. 12/502,230 "Control of Computer Window Systems, Computer Applications, and Web Applications via High Dimensional Touchpad User Interface" by Seung Lim;

Navigating at least one (1-dimensional) menu, (2-dimensional) pallet or hierarchical menu, or (3-dimensional) space.

These extensions, features, and other aspects of the present invention permit far faster browsing, shopping, information gleaning through the enhanced features of these extended functionality roll-over and hyperlink objects.

In addition to MHOS that are additional-parameter extensions of traditional hypermedia objects, new types of MHOS unlike traditional or contemporary hypermedia objects can be implemented leveraging the additional user interface parameter signals and user interface metaphors that can be associated with them. Illustrative examples include:

Visual joystick (can keep position after release, or return to central position after release);

Visual rocker-button (can keep position after release, or return to central position after release);

Visual rotating trackball, cube, or other object (can keep position after release, or return to central position after release);

A small miniature touchpad).

Yet other types of MHOS are possible and provided for by the invention. For example:

The background of the body page can be configured as an MHO;

The background of a frame or isolated section within a body page can be configured as an MHO;

An arbitrarily-shaped region, such as the boundary of an entity on a map, within a photograph, or within a graphic can be configured as an MHO.

In any of these, the invention provides for the MHO to be activated or selected by various means, for example by clicking or tapping when the cursor is displayed within the area, simply having the cursor displayed in the area (i.e., without clicking or tapping, as in rollover), etc. Further, it is anticipated that variations on any of these and as well as other new types of MHOS can similarly be crafted by those skilled in the art and these are provided for by the invention.

User Training

Since there is a great deal of variation from person to person, it is useful to include a way to train the invention to the particulars of an individual's hand and hand motions. For example, in a computer-based application, a measurement training procedure will prompt a user to move their finger around within a number of different positions while it records the shapes, patterns, or data derived from it for later use specifically for that user.

Figure 30A:
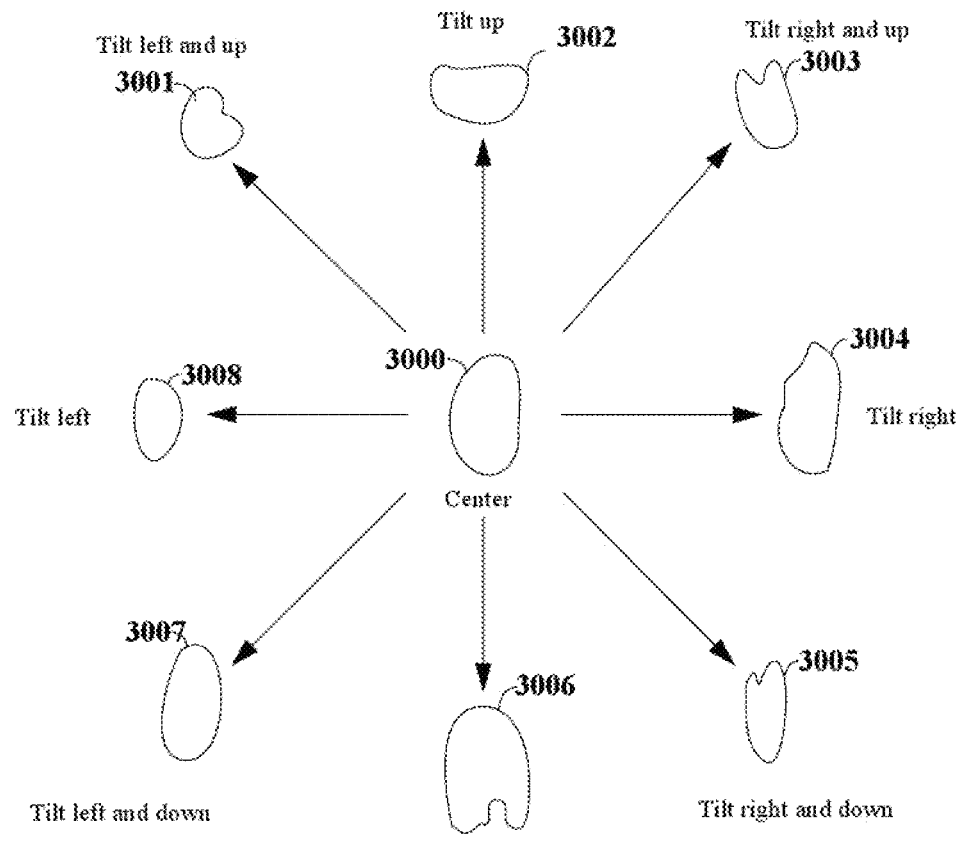
FIG. 30a depicts a user-measurement training procedure wherein a user is prompted to touch the tactile sensor array in a number of different positions.
Figure 30B:
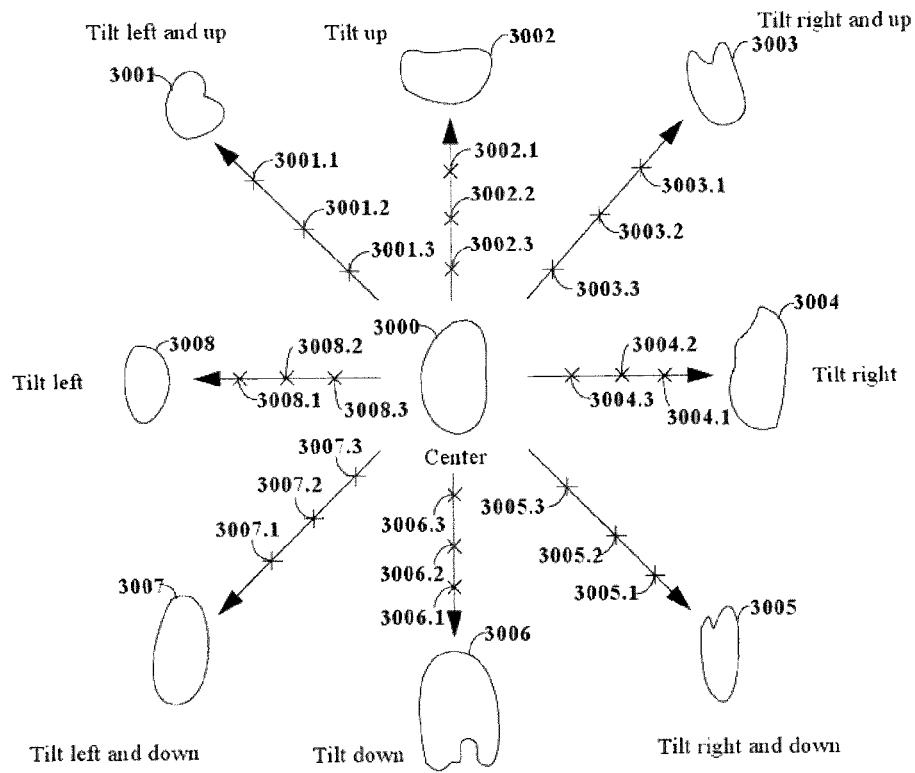
FIG. 30b depicts additional postures for use in a measurement training procedure for embodiments or cases wherein a particular user does not provide sufficient variation in image shape the training.
Figure 30C:
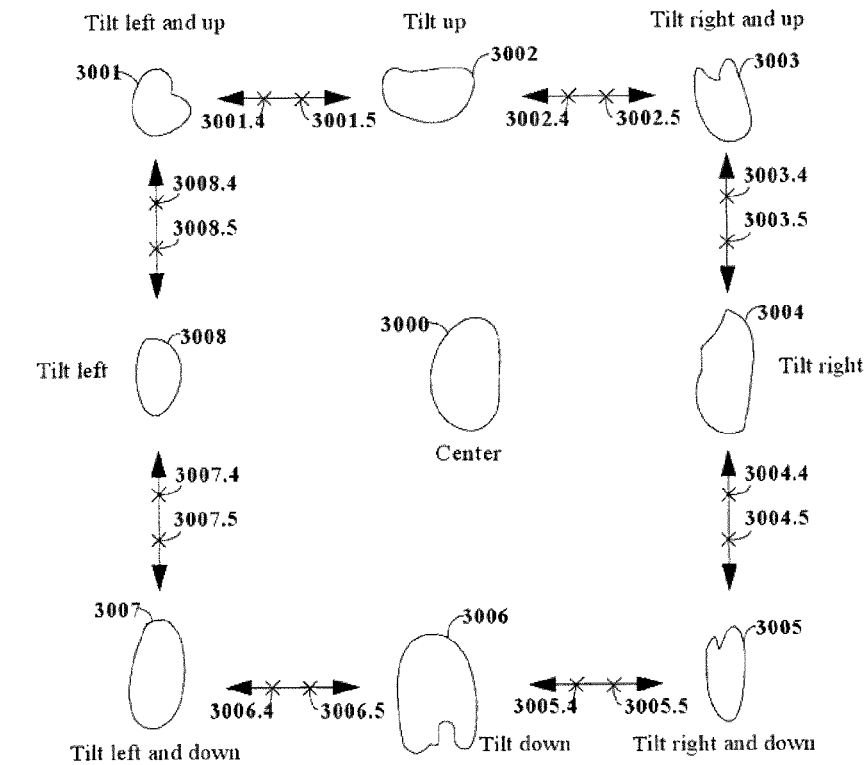
FIG. 30c depicts boundary-tracing trajectories for use in a measurement training procedure.

Typically most finger postures make a distinctive pattern. In one embodiment, a user-measurement training procedure could involve having the user prompted to touch the tactile sensor array in a number of different positions, for example as depicted in FIG. 30*a* (adapted from U.S. patent application Ser. No. 12/418,605). In some embodiments only representative extreme positions are recorded, such as the nine postures 3000-3008. In yet other embodiments, or cases wherein a particular user does not provide sufficient variation in image shape, additional postures can be included in the measurement training procedure, for example as depicted in FIG. 30*b* (adapted from U.S. patent application Ser. No. 12/418,605). In some embodiments, trajectories of hand motion as hand contact postures are changed can be recorded as part of the measurement training procedure, for example the eight radial trajectories as depicted in FIGS. 30*a*-30*b*, the boundary-tracing trajectories of FIG. 30*c* (adapted from U.S. patent application Ser. No. 12/418,605), as well as others that would be clear to one skilled in the art. All these are provided for by the invention.

The range in motion of the finger that can be measured by the sensor can subsequently be re-corded in at least two ways. It can either be done with a timer, where the computer will prompt user to move his finger from position 3000 to position 3001, and the tactile image imprinted by the finger will be recorded at points 3001.3, 3001.2 and 3001.1. Another way would be for the computer to query user to tilt their finger a portion of the way, for example "Tilt your finger ⅔ of the full range" and record that imprint. Other methods are clear to one skilled in the art and are provided for by the invention.

Additionally, this training procedure allows other types of shapes and hand postures to be trained into the system as well. This capability expands the range of contact possibilities and applications considerably. For example, people with physical handicaps can more readily adapt the system to their particular abilities and needs.

Data Flow and Parameter Refinement

Figure 31:
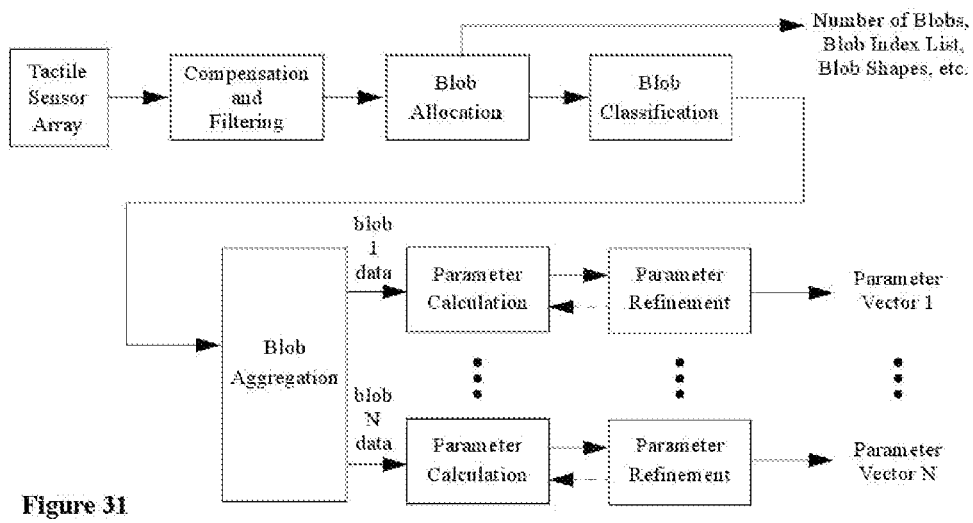
FIG. 31 depicts an example HDTP signal flow chain for an HDTP realization implementing multi-touch, shape and constellation (compound shape) recognition, and other features.

FIG. 31 depicts a HDTP signal flow chain for an HDTP realization that can be used, for example, to implement multi-touch, shape and constellation (compound shape) recognition, and other HDTP features. After processing steps that can for example, comprise one or more of blob allocation, blob classification, and blob aggregation (these not necessarily in the order and arrangement depicted in FIG. 31), the data record for each resulting blob is processed so as to calculate and refine various parameters (these not necessarily in the order and arrangement depicted in FIG. 31).

For example, a blob allocation step can assign a data record for each contiguous blob found in a scan or other processing of the pressure, proximity, or optical image data obtained in a scan, frame, or snapshot of pressure, proximity, or optical data measured by a pressure, proximity, or optical tactile sensor array or other form of sensor. This data can be previously preprocessed (for example, using one or more of compensation, filtering, thresholding, and other operations) as shown in the figure, or can be presented directly from the sensor array or other form of sensor. In some implementations, operations such as compensation, thresholding, and filtering can be implemented as part of such a blob allocation step. In some implementations, the blob allocation step provides one or more of a data record for each blob comprising a plurality of running sum quantities derived from blob measurements, the number of blobs, a list of blob indices, shape information about blobs, the list of sensor element addresses in the blob, actual measurement values for the relevant sensor elements, and other information. A blob classification step can include for example shape information and can also include information regarding individual noncontiguous blobs that can or should be merged (for example, blobs representing separate segments of a finger, blobs representing two or more fingers or parts of the hand that are in at least a particular instance are to be treated as a common blob or otherwise to be associated with one another, blobs representing separate portions of a hand, etc.). A blob aggregation step can include any resultant aggregation operations including, for example, the association or merging of blob records, associated calculations, etc. Ultimately a final collection of blob records are produced and applied to calculation and refinement steps used to produce user interface parameter vectors. The elements of such user interface parameter vectors can comprise values responsive to one or more of forward-back position, left-right position, downward pressure, roll angle, pitch angle, yaw angle, etc from the associated region of hand input and can also comprise other parameters including rates of change of there or other parameters, spread of fingers, pressure differences or proximity differences among fingers, etc. Additionally there can be interactions between refinement stages and calculation stages, reflecting, for example, the kinds of operations described earlier in conjunction with FIGS. 23, 24a, and 24b.

The resulting parameter vectors can be provided to applications, mappings to applications, window systems, operating systems, as well as to further HDTP processing. For example, the resulting parameter vectors can be further processed to obtain symbols, provide additional mappings, etc. In this arrangement, depending on the number of points of contact and how they are interpreted and grouped, one or more shapes and constellations can be identified, counted, and listed, and one or more associated parameter vectors can be produced. The parameter vectors can comprise, for example, one or more of forward-back, left-right, downward pressure, roll, pitch, and yaw associated with a point of contact. In the case of a constellation, for example, other types of data can be in the parameter vector, for example inter-fingertip separation differences, differential pressures, etc.

Example First-Level Measurement Calculation Chain

Figure 32A:
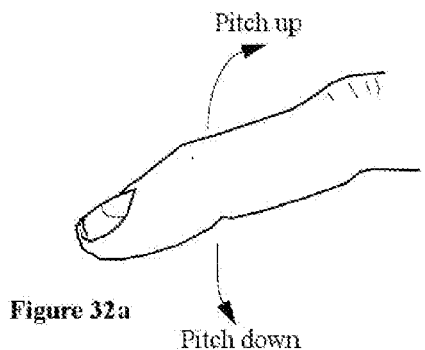
FIG. 32a depicts a side view of an exemplary finger and illustrating the variations in the pitch angle.
Figure 32B:
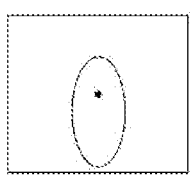
FIGS. 32b-32f depict exemplary tactile image measurements (proximity sensing, pressure sensing, contact sensing, etc.) as a finger in contact with the touch sensor array is positioned at various pitch angles with respect to the surface of the sensor.
Figure 32C:
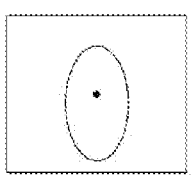
Figure 32D:
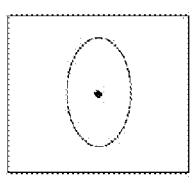
Figure 32E:
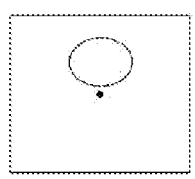
Figure 32F:
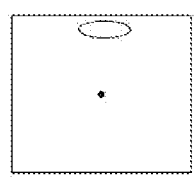

Attention is now directed to particulars of roll and pitch measurements of postures and gestures. FIG. 32a depicts a side view of an exemplary finger and illustrating the variations in the pitch angle. FIGS. 32b-32f depict exemplary tactile image measurements (proximity sensing, pressure sensing, contact sensing, etc.) as a finger in contact with the touch sensor array is positioned at various pitch angles with respect to the surface of the sensor. In these, the small black dot denotes the geometric center corresponding to the finger pitch angle associated with FIG. 32d. As the finger pitch angle is varied, it can be seen that:

the eccentricity of the oval shape changes and in the cases associated with FIGS. 32e-32f the eccentricity change is such that the orientation of major and minor axes of the oval exchange roles;
The position of the oval shape migrates and in the cases of FIGS. 32b-32c and FIGS. 32e-32f have a geometric center shifted from that of FIG. 32d, and in the cases of FIGS. 32e-32f the oval shape migrates enough to no longer even overlap the geometric center of FIG. 32d.

From the user experience viewpoint, however, the user would not feel that a change in the front-back component of the finger's contact with the touch sensor array has changed. This implies the front-back component ("y") of the geometric center of contact shape as measured by the touch sensor array should be corrected responsive to the measured pitch angle. This suggests a final or near-final measured pitch angle value should be calculated first and used to correct the final value of the measured front-back component ("y") of the geometric center of contact shape.

Additionally, FIGS. 33a-33e depict the effect of increased downward pressure on the respective contact shapes of FIGS. 32b-32f. More specifically, the top row of FIGS. 33a-33e are the respective contact shapes of FIGS. 32b-32f, and the bottom row show the effect of increased downward pressure. In each case the oval shape expands in area (via an observable expansion in at least one dimension of the oval) which could thus shift the final value of the measured front-back component ("y"). (It is noted that for the case of a pressure sensor array, the measured pressure values measured by most or all of the sensors in the contact area would also increase accordingly.)

These and previous considerations imply:
the pitch angle as measured by the touch sensor array could be corrected responsive to the measured downward pressure. This suggests a final or near-final measured downward pressure value should be calculated first and used to correct the final value of measured downward pressure ("p");
the front-back component ("y") of the geometric center of contact shape as measured by the touch sensor array could be corrected responsive to the measured downward pressure. This suggests a final or near-final measured pitch angle value could be calculated first and used to correct the final value of measured downward pressure ("p").

In one approach, correction to the pitch angle responsive to measured downward pressure value can be used to correct for the effect of downward pressure on the front-back component ("y") of the geometric center of the contact shape.

FIG. 34a depicts a top view of an exemplary finger and illustrating the variations in the roll angle. FIGS. 34b-34f depict exemplary tactile image measurements (proximity sensing, pressure sensing, contact sensing, etc.) as a finger in contact with the touch sensor array is positioned at various roll angles with respect to the surface of the sensor. In these, the small black dot denotes the geometric center corresponding to the finger roll angle associated with FIG. 34d. As the finger roll angle is varied, it can be seen that:

The eccentricity of the oval shape changes;
The position of the oval shape migrates and in the cases of FIGS. 34b-34c and FIGS. 34e-34f have a geometric center shifted from that of FIG. 34d, and in the cases of FIGS. 34e-34f the oval shape migrates enough to no longer even overlap the geometric center of FIG. 34d.

From the user experience, however, the user would not feel that the left-right component of the finger's contact with the touch sensor array has changed. This implies the left-right component ("x") of the geometric center of contact shape as measured by the touch sensor array should be corrected responsive to the measured roll angle. This suggests a final or near-final measured roll angle value should be calculated first and used to correct the final value of the measured left-right component ("x") of the geometric center of contact shape.

As with measurement of the finger pitch angle, increasing downward pressure applied by the finger can also invoke variations in contact shape involved in roll angle measurement, but typically these variations are minor and less significant for roll measurements than they are for pitch measurements. Accordingly, at least to a first level of approximation, effects of increasing the downward pressure can be neglected in calculation of roll angle.

Depending on the method used in calculating the pitch and roll angles, it is typically advantageous to first correct for yaw angle before calculating the pitch and roll angles. One source reason for this is that (dictated by hand and wrist physiology) from the user experience a finger at some non-zero yaw angle with respect to the natural rest-alignment of the finger would impart intended roll and pitch postures or gestures from the vantage point of the yawed finger position. Without a yaw-angle correction somewhere, the roll and pitch postures and movements of the finger would resolve into rotated components. As an extreme example of this, if the finger were yawed at a 90-degree angle with respect to a natural rest-alignment, roll postures and movements would measure as pitch postures and movements while pitch postures and movements would measure as roll postures and movements. As a second example of this, if the finger were yawed at a 45-degree angle, each roll and pitch posture and movement would case both roll and pitch measurement components. Additionally, some methods for calculating the pitch and roll angles (such as curve fitting and polynomial regression methods as taught in pending U.S. patent application Ser. No. 13/038,372) work better if the blob data on which they operate is not rotated by a yaw angle. This suggests that a final or near-final measured yaw angle value should be calculated first and used in a yaw-angle rotation correction to the blob data applied to calculation of roll and pitch angles.

Regarding other calculations, at least to a first level of approximation downward pressure measurement in principle should not be affected by yaw angle. Also at least to a first level of approximation, for geometric center calculations sufficiently corrected for roll and pitch effects in principle should not be affected by yaw angle. (In practice there can be at least minor effects, to be considered and addressed later).

Figure 35:
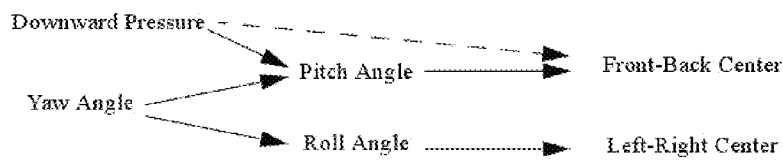
FIG. 35 depicts an example causal chain of calculation.
Figure 36:
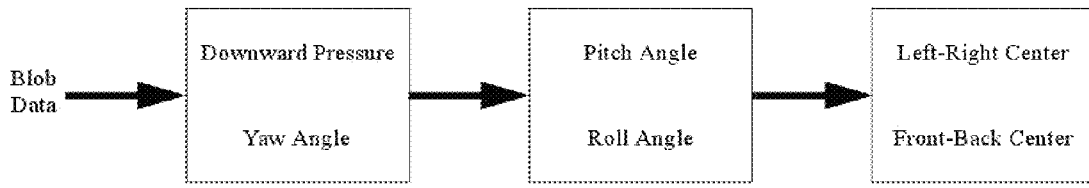
FIG. 36 depicts a utilization of this causal chain as a sequence flow of calculation blocks, albeit not a dataflow representation.
Figure 37:
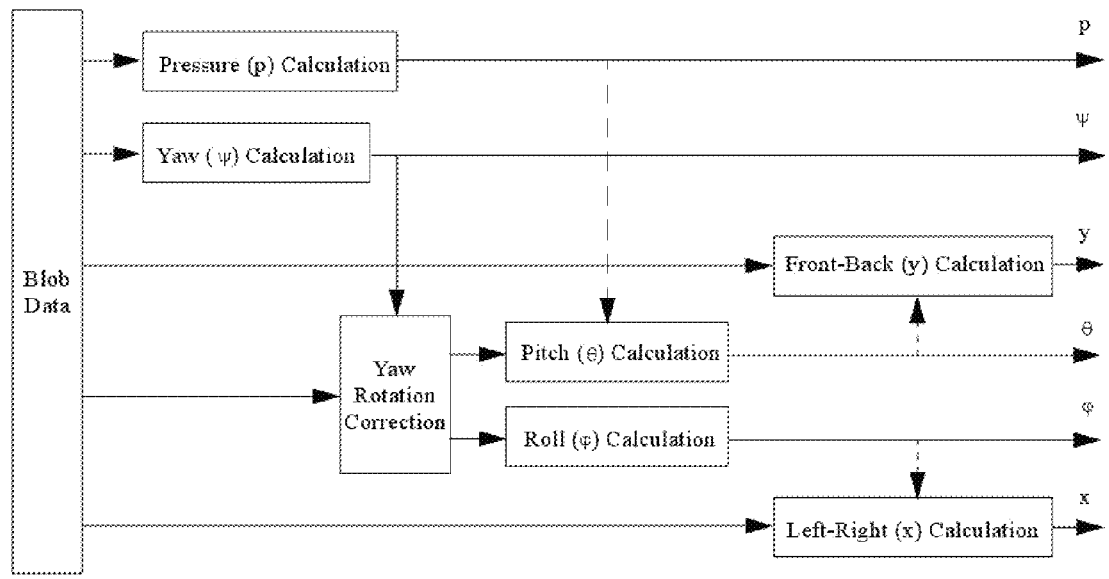
FIG. 37 depicts an example implementation of calculations for the left-right ("x"), front-back ("y"), downward pressure ("p"), roll ("φ"), pitch ("θ"), and yaw ("ψ") measurements from blob data.

The example working first level of approximation conclusions together suggest a causal chain of calculation such as that depicted in FIG. 35. FIG. 36 depicts a utilization of this causal chain as a sequence flow of calculation blocks. FIG. 36 does not, however, represent a data flow since calculations in subsequent blocks depend on blob data in ways other than as calculated in preceding blocks. More specifically as to this, FIG. 37 depicts an example implementation of a real-time calculation chain for the left-right ("x"), front-back ("y"), downward pressure ("p"), roll ("φ"), pitch ("θ"), and yaw ("ψ") measurements that can be calculated from blob data such as that produced in the exemplary arrangement of FIG. 31. Examples of methods, systems, and approaches to downward pressure calculations from tactile image data in a multi-touch context are provided in pending U.S. patent application Ser. No. 12/418,605 and U.S. Pat. No. 6,570,078. Examples methods, systems, and approaches to yaw angle calculations from tactile image data are provided in pending U.S. patent application Ser. No. 12/724,413; these can be applied to a multi-touch context via arrangements such as the depicted in FIG. 31. Examples methods, systems, and approaches to roll angle and pitch angle calculations from tactile image data in a multi-touch context are provided in pending U.S. patent application Ser. No. 12/418,605 and 13/038,372 as well as in U.S. Pat. No. 6,570,078 and include yaw correction considerations. Examples methods, systems, and approaches to front-back geometric center and left-right geometric center calculations from tactile image data in a multi-touch context are provided in pending U.S. patent application Ser. No. 12/418,605 and U.S. Pat. No. 6,570,078.

The yaw rotation correction operation depicted in FIG. 37 operates on blob data as a preprocessing step prior to calculations of roll angle and pitch angle calculations from blob data (and more generally from tactile image data). The yaw rotation correction operation can, for example, comprise a rotation matrix or related operation which internally comprises sine and cosine functions as is appreciated by one skilled in the art. Approximations of the full needed range of yaw angle values (for example from nearly −90 degrees through zero to nearly +90 degrees, or in a more restricted system from nearly −45 degrees through zero to nearly +45 degrees) can therefore not be realistically approximated by a linear function. The need range of yaw angles can be adequately approximated by piecewise-affine functions such as those to be described in the next section. In some implementations it will be advantageous to implement the rotation operation with sine and cosine functions in the instruction set or library of a computational processor. In other implementations it will be advantageous to implement the rotation operation with piecewise-affine functions (such as those to be described in the next section) on a computational processor.

FIG. 37 further depicts optional data flow support for correction of pitch angle measurement using downward pressure measurement (as discussed earlier). In one embodiment this correction is not done in the context of FIG. 37 and the dashed signal path is not implemented. In such circumstances either no such correction is provided, or the correction is provided in a later stage. If the correction is implemented, it can be implemented in various ways depending on approximations chosen and other considerations. The various ways include a linear function, a piecewise-linear function, an affine function, a piecewise-affine function, a nonlinear function, or combinations of two or more of these. Linear, piecewise-linear, affine, and piecewise-affine functions will be considered in the next section.

FIG. 37 further depicts optional data flow support for correction of front-back geometric center measurement using pitch angle measurement (as discussed earlier). In one embodiment this correction is not done in the context of FIG. 37 and the dashed signal path is not implemented. In such circumstances either no such correction is provided, or the correction is provided in a later stage. If the correction is implemented, it can be implemented in various ways depending on approximations chosen and other considerations. The various ways include a linear function, a piecewise-linear function, an affine function, a piecewise-affine function, a nonlinear function, or combinations of two or more of these.

FIG. 37 further depicts optional data flow support for correction of left-right geometric center measurement using roll angle measurement (as discussed earlier). In one embodiment this correction is not done in the context of FIG. 37 and the dashed signal path is not implemented. In such circumstances either no such correction is provided, or the correction is provided in a later stage. If the correction is implemented, it can be implemented in various ways depending on approximations chosen and other considerations. The various ways include a linear function, a piecewise-linear function, an affine function, a piecewise-affine function, a nonlinear function, or combinations of two or more of these.

FIG. 37 does not depict optional data flow support for correction of front-back geometric center measurement using downward pressure measurement (as discussed earlier). In one embodiment this correction is not done in the context of FIG. 37 and either no such correction is provided, or the correction is provided in a later stage. In another embodiment this correction is implemented in the example arrangement of FIG. 37, for example through the addition of downward pressure measurement data flow support to the front-back geometric center calculation and additional calculations performed therein. In either case, if the correction is implemented, it can be implemented in various ways depending on approximations chosen and other considerations. The various ways include a linear function, a piecewise-linear function, an affine function, a piecewise-affine function, a nonlinear function, or combinations of two or more of these.

Figure 23:
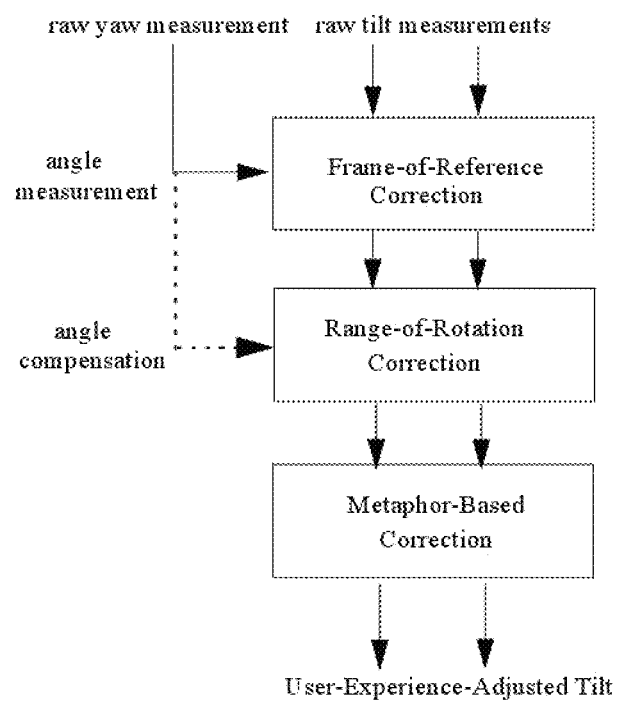
FIG. 23 illustrates correcting tilt coordinates with knowledge of the measured yaw angle, compensating for the expected tilt range variation as a function of measured yaw angle, and matching the user experience of tilt with a selected metaphor interpretation.

Additionally, FIG. 37 does not depict optional data flow support for the tilt refinements described in conjunction with FIG. 24a, the tilt-influent correction to measured yaw angle described in conjunction with FIG. 24b, the range-of-rotation correction described in conjunction with FIG. 23, the correction of left-right geometric center measurement using downward pressure measurement (as discussed just a bit earlier), the correction of roll angle using downward pressure measurement (as discussed just a bit earlier), or the direct correction of front-back geometric center measurement using downward pressure measurement. There are many further possible corrections and user experience improvements that can be added in similar fashion. In one embodiment any one or more such additional corrections are not performed in the context of FIG. 37 and either no such correction is provided, or such corrections are provided in a later stage after an arrangement such as that depicted in FIG. 37. In another embodiment one or more such corrections are implemented in the example arrangement of FIG. 37, for example through the addition of relevant data flow support to the relevant calculation step and additional calculations performed therein. In either case, any one or more such corrections can be implemented in various ways depending on approximations chosen and other considerations. The various ways include use of a linear function, a piecewise-linear function, an affine function, a piecewise-affine function, a nonlinear function, or combinations of two or more of these.

In one approach, one or more shared environments for linear function, a piecewise-linear function, an affine function, a piecewise-affine function, or combinations of two or more of these can be provided. In an embodiment of such an approach, one or more of these one or more shared environments can be incorporated into the calculation chain depicted in FIG. 37.

In another or related embodiment of such an approach, one or more of these one or more shared environments can be implemented in a processing stage subsequent to the calculation chain depicted in FIG. 37. In these circumstances, the output values from the calculation chain depicted in FIG. 37 can be regarded as "first-order" or "unrefined" output values which, upon further processing by these one or more shared environments produce "second-order" or refined" output values.

Figure 38:
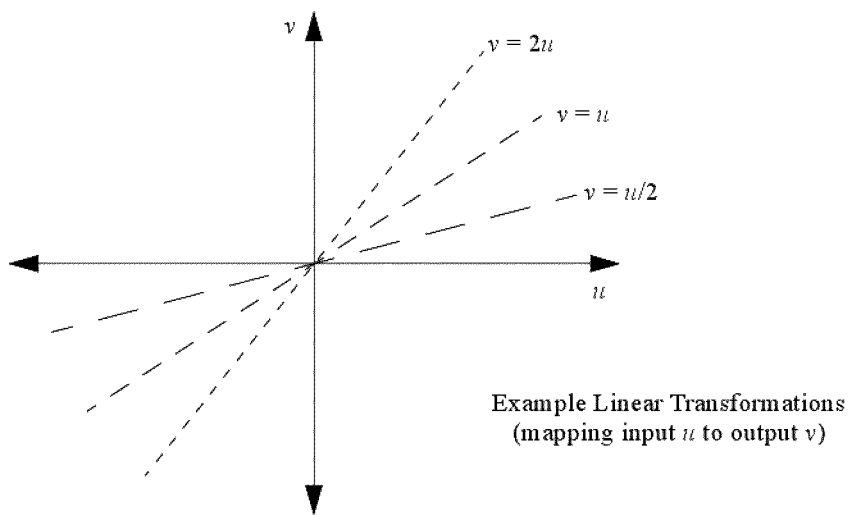
FIG. 38 depicts example single-variable linear transformations.

Linear, Affine, Piecewise-Linear, and Piecewise-Affine Operations for Use in Higher-Level Corrections of Coupling Effects Attention is now directed to the aforementioned linear, piecewise-linear, affine, and piecewise-affine functions and transformation. To begin, FIG. 38 depicts three example single-variable linear transformations. Although in general a function for a line in a plane comprises a multiplicative term ("slope") and additive term ("offset," "shift," "translation," or "intercept") with respect to a single independent variable, in multi-variable situations a linear transformation is regarded or represented as a matrix multiplication acting on a vector of independent variables. To be consistent with multi-variable contexts, then, a linear transformation comprises coefficients multiplying corresponding independent variables, and in multidimensional cases these are summed to create one or more linear combinations.

Figure 39:
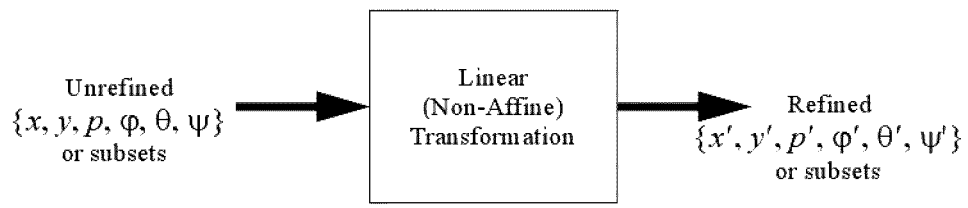
FIG. 39 depicts a multivariable-variable linear transformation applied to an input "unrefined" measurement vector {x, y, p, φ, θ, ψ} and producing a corresponding "refined" measurement vector {x', y', p', φ', θ', ψ'}.

FIG. 39 depicts a example multivariable-variable linear transformation applied to an input "unrefined" measurement vector comprising two or more of the input variables {x, y, p, ϕ, θ, ψ} and producing a corresponding output "refined" measurement vector comprising two or more of the output variables {x', y', p', ϕ', θ', ψ'}. In various embodiments, the multivariable-variable linear transformation can operate on some or all of the input variables and produce values for some or all of the output variables. If not all the variables are involved, the associated matrix can be represented as either one of a smaller size omitting one or more rows or columns, or can be full-size and comprise associated matrix entries with values of zero, or a combination of these according to the input variables and output variables involved and larger contexts (for example, combining the linear transformation with other transformations).

Figure 40:
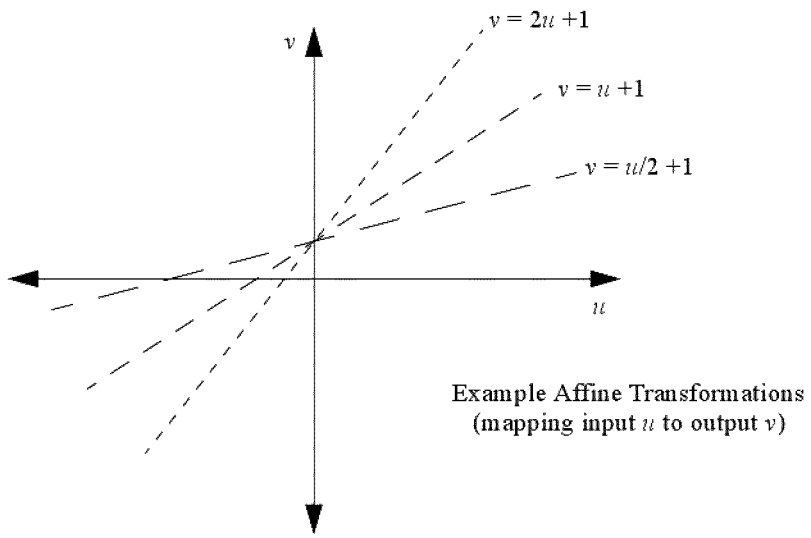
FIG. 40 depicts example single-variable affine transformations.

When including an additive term ("offset," "shift," "translation," or "intercept") with a linear transformation, the result is called an affine transformation. FIG. 40 depicts example single-variable affine transformations. Each of these use the same offset value, so all the lines shift by the same amount in the same direction to a new position in the plot. If the offsets have differing values from one another, each line will shift differently (an example of this will be seen later as part of FIG. 43).

Figure 41:
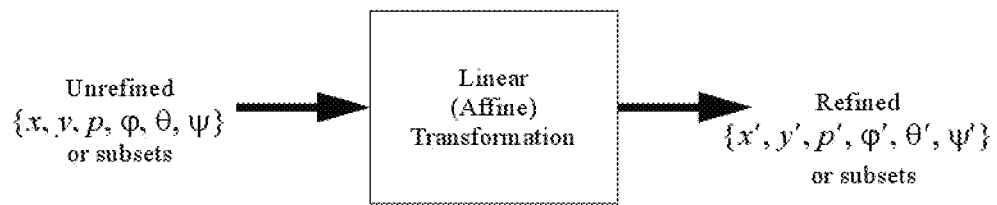
FIG. 41 depicts a multivariable-variable affine transformation applied to an input "unrefined" measurement vector {x, y, p, φ, θ, ψ} and producing a corresponding output "refined" measurement vector {x', y', p', φ', θ', ψ'}.

FIG. 41 depicts a multivariable-variable affine transformation applied to an input "unrefined" measurement vector {x, y, p, ϕ, θ, ψ} and producing a corresponding output "refined" measurement vector {x', y', p', ϕ', θ', ψ'}. In various embodiments, the multivariable-variable linear transformation can operate on some or all of the input variables and produce values for some or all of the output variables. If not all the variables are involved, the associated matrix can be represented as either one of a smaller size omitting one or more rows or columns, or can be full-size and comprise associated matrix entries with values of zero, or a combination of these according to the input variables and output variables involved and larger contexts (for example, combining the affine transformation with other transformations).

In many situations, particularly those involving computation, it can be advantageous to approximate a more complex function by a sequence of line segments. Some functions (for example the absolute value function, the unit step, the signum function, and the triangle wave function) naturally have this structure. Since the overall function comprises a collection of line segments, such a function is often termed piecewise-linear or piecewise-affine. In general the structure of a piecewise function (linear, affine, nonlinear, mixed, etc.) comprises a collection of effectively non-overlapping conditional tests and a corresponding function (linear, affine, nonlinear, etc.) that is to determine the behavior of the piecewise function when the conditions of the associated conditional test is satisfied.

Figure 42:
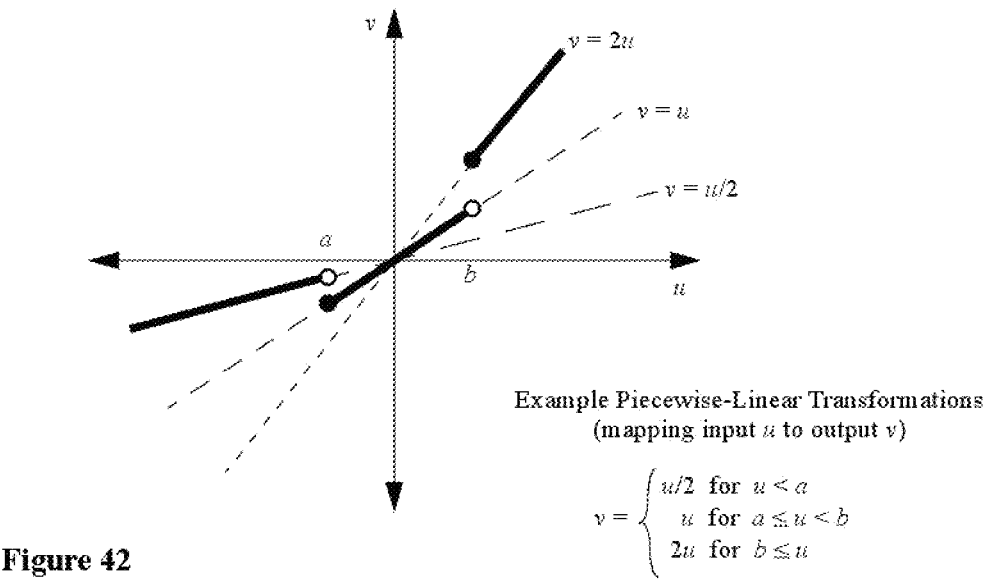
FIG. 42 depicts example single-variable piecewise-linear transformations.

FIG. 42 depicts an example single-variable piecewise-linear transformation. Since lines without offset terms only intersect at the origin, if there are non-zero values of input variables at which the piecewise linear function changes line segments, the piecewise linear function will comprise discontinuous jumps as shown in FIG. 42. Note the conditional tests and how these are used to select which line is to be used to determine the behavior of the piecewise linear function.

Figure 43:
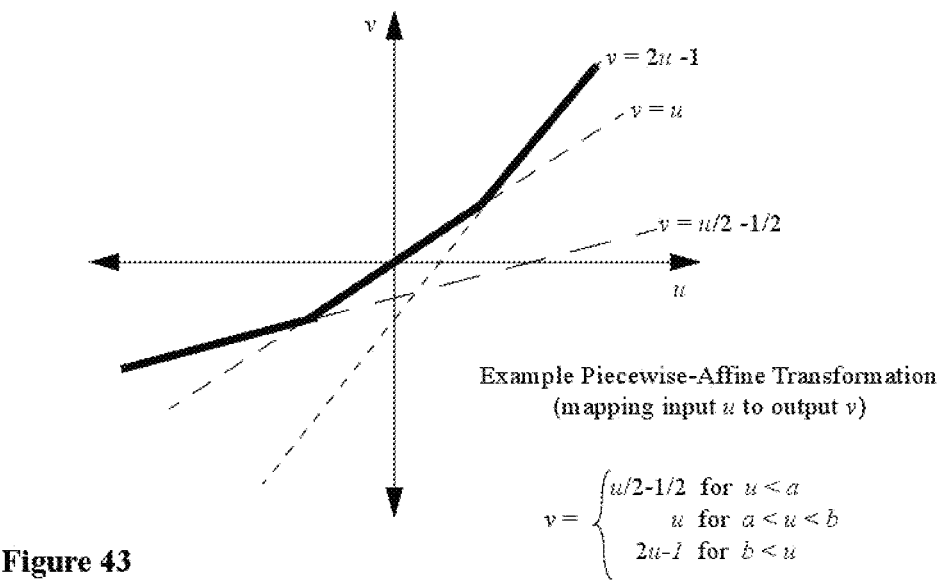
FIG. 43 depicts example single-variable piecewise-affine transformations.

FIG. 43 depicts an example single-variable piecewise-affine transformation. Here the affine aspect permits the inclusion of additive offset terms. The conditional tests determine the selection of both the multiplicative term ("slope") and additive term ("offset," "shift," "translation," or "intercept"). In the example of FIG. 43, the values of the additive offset terms have been adjusted so that the resulting function is continuously joined (albeit with discontinuous changes in line segment slope). However, in general the additive offset terms can be set to arbitrary values as needed for various applications.

Figure 44:
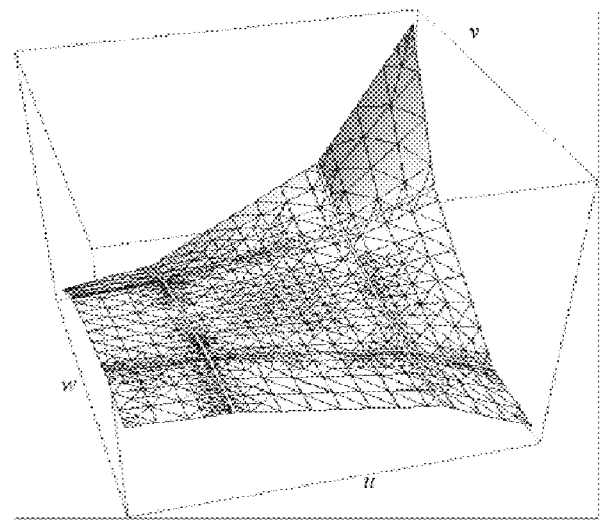
FIG. 44 depicts an example two-variable piecewise-affine transformation.

As a simple multivariable example, FIG. 44 depicts an example two-independent-variable (input) piecewise-affine function having a one output variable. In this example there are two transition values for each of the two independent-variables, and transition values for each of the two input variables is independent of the other input variable. The resulting values of the one output variable are thus defined by a piecewise-joined hull of nine planes. In general the transitions and geometry can be more complicated. If another two-independent-variable (input) piecewise-affine function having a another one output variable is combined with this function, the result has two input variables and two output variables and thus can formally be viewed as a piecewise-affine transformation.

Figure 45:
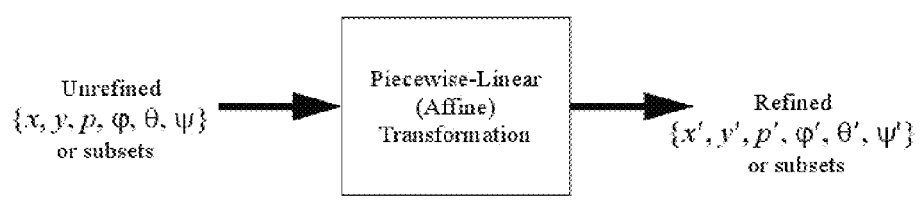
FIG. 45 depicts a multivariable-variable piecewise-affine transformation applied to an input "unrefined" measurement vector {x, y, p, φ, θ, ψ} and producing a corresponding output "refined" measurement vector {x', y', p', φ', θ', ψ'}.

Accordingly, FIG. 45 depicts a multivariable-variable piecewise-affine transformation applied to an input "unrefined" measurement vector $\{x, y, p, \phi, \theta, \psi\}$ and producing a corresponding output "refined" measurement vector $\{x', y', p', \phi', \theta', \psi'\}$. In various embodiments, the multivariable-variable linear transformation can operate on some or all of the input variables and produce values for some or all of the output variables. If not all the variables are involved, the associated matrix can be represented as either one of a smaller size omitting one or more rows or columns, or can be full-size and comprise associated matrix entries with values of zero, or a combination of these according to the input variables and output variables involved and larger contexts (for example, combining the piecewise-affine transformation with other transformations).

It is noted that if all offset terms are all always zero, the piecewise-affine transformation is in fact equivalent to a piecewise-linear transformation.

Figure 46:
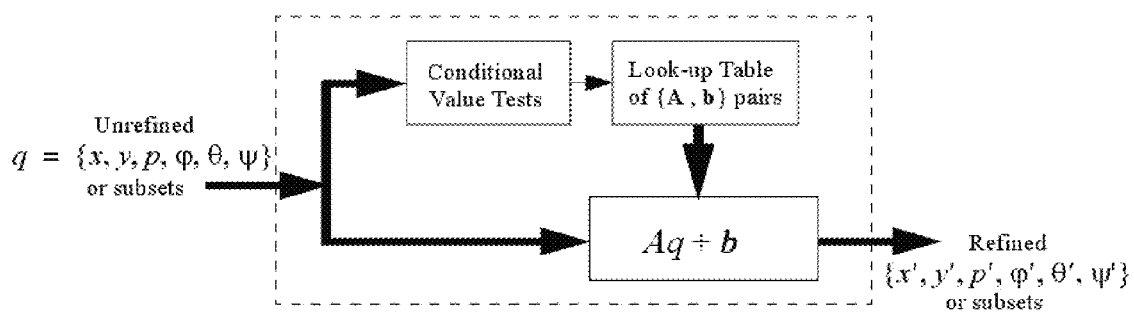
FIG. 46 depicts an example implementation of a multivariable-variable piecewise-affine transformation applied to an input "unrefined" measurement vector {x, y, p, φ, θ, ψ} and producing a corresponding output "refined" measurement vector {x', y', p', φ', θ', ψ'}.

FIG. 46 depicts an example implementation of a multivariable-variable piecewise-affine transformation applied to an input "unrefined" measurement vector (denoted in the figure as "q") comprising some or all of the input variables $\{x, y, p, \phi, \theta, \psi\}$ and producing a corresponding output "refined" measurement vector comprising some or all of the output variables $\{x', y', p', \phi', \theta', \psi'\}$. In the FIG. 46 example, conditional tests are made on the values of one or more components of the input "unrefined" measurement vector, and the outcome of the conditional test determine the multiplying matrix (denoted in the figure as "A") and offset vector (denoted in the figure as "b") to be used in the affine transformation applied to the input "unrefined" measurement vector (denoted in the figure as "q"). In the example of FIG. 46, both the multiplying matrix (denoted in the figure as "A") and the offset vector (denoted in the figure as "b") are retrieved from a look-up table in response to the outcome of the conditional test. In an alternate embodiment, one or both of the multiplying matrix (denoted in the figure as "A") and additive offset vector (denoted in the figure as "b") can be calculated from outcomes of the conditional tests (rather than being retrieved from a look-up table). Other embodiments involving components, sub-matrices, etc. will be considered shortly.

Again it is noted that if all offset terms are all always zero, the piecewise-affine transformation is in fact equivalent to a piecewise-linear transformation. Thus the aforedescribed arrangements in at least the previous paragraphs can be used to implement a piecewise-linear transformation by simply leaving out the offset term (denoted in the figure as "b") or in some way arrange so that all offset terms have numerical values of zero.

Piecewise-Linear and Piecewise-Affine Operations for Use in Corrections for Hysteresis Effects In the physical contact process between the user touch and the sensor array, the flesh of a user finger can lag behind as the finger is dragged, or can restore its shape more slowly than the execution of a gesture, or by other mechanism introduce hysteresis effects. Also, the touch sensor itself can exhibit hysteresis effects as the downward pressure is varied, the user finger is dragged, etc., due to mechanical properties of the materials making up the touch sensor.

Figure 47:
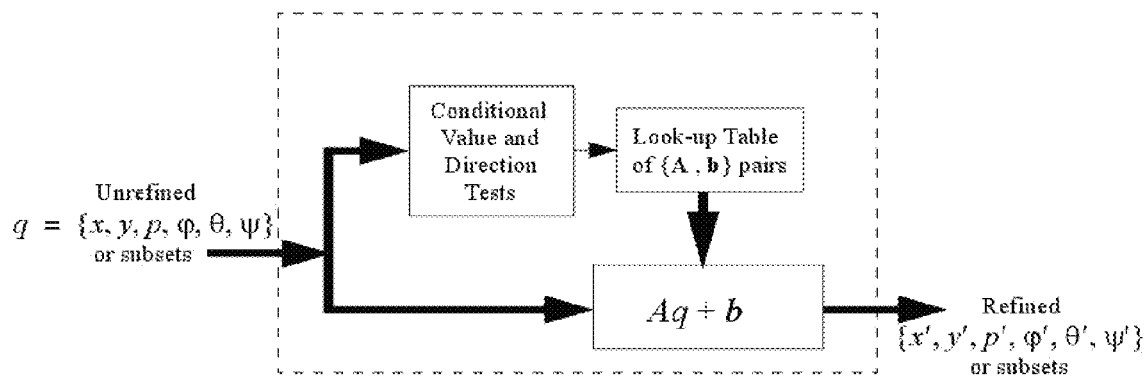
FIG. 47 depicts an example modification of the implementation of a multivariable-variable piecewise-affine transformation arrangement of FIG. 46 so as to support correction for hysteresis effects.

FIG. 47 depicts an example modification of the implementation of a multivariable-variable piecewise-affine transformation arrangement of FIG. 46 so as to support correction for hysteresis effects. Here the conditional tests additionally include tests responsive to the sign (positive or negative) of the direction of change over time of at least one numerical value comprised by the input vector. This approach can be used to provide corrections for hysteresis effects within the physical contact process between the user touch and the sensor array or other processes for at least one measurement of the user touch.

Use of Sub-Matrix Blocks, Sub-Vector Blocks, and Individual Components in Piecewise-Affine Matrices and Vectors In the arrangements described above for implementing piecewise-linear and piecewise-affine transformations (for example those discussed in conjunction with FIGS. 46-47), entire matrices or vectors were retrieved from look-up tables (selected according to the result of conditional tests) or calculated from the result of conditional tests. Alternatively parts of these matrices or vectors can be retrieved from look-up tables (selected according to the result of conditional tests) or calculated from the result of conditional tests. The parts can comprise sub-matrix blocks, sub-vector blocks, and individual components in piecewise-affine matrices and vectors. For example, separate components of linear or affine transformations can be stored in and retrieved from a look-up table comprising a plurality of separate component linear transformations.

As an example of the utility of such an approach, assume for example that the matrix in a piecewise-affine or piecewise-linear transformation turns out to have two breakpoints for each of the six input variables $\{x, y, p, \phi, \theta, \psi\}$. The number of 6×6 (36 entry) matrices that must be stored is then $3^6$=729, implying the need for storage of 26,244 numerical quantities. Adding the 729 offset vectors comprising 6 elements each adds another 4,374 entries, for a total of more than 30,500 numerical quantities.

Figure 48A:
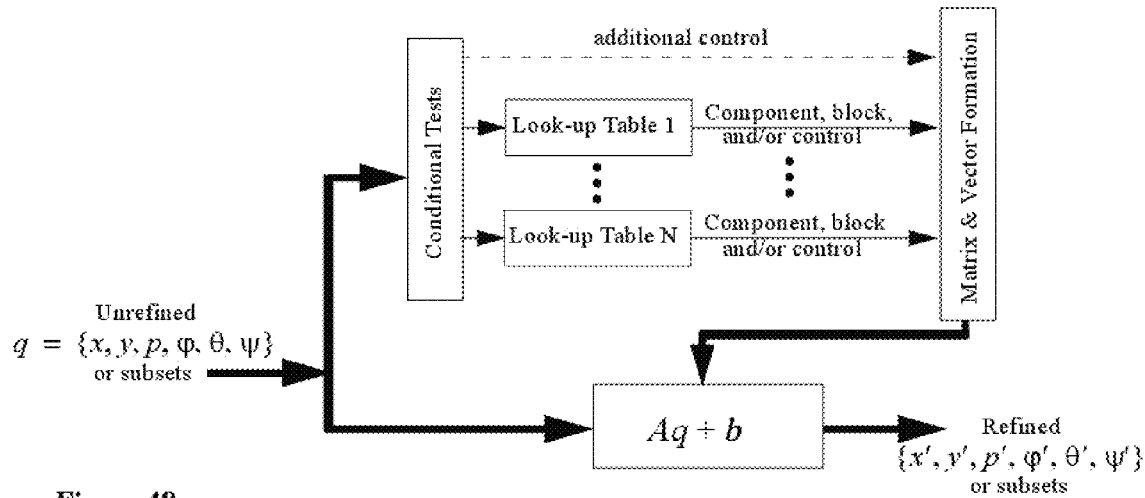
FIG. 48a depicts an example implementation of an arrangement wherein the results of conditional tests cause at least one look-up table to retrieve at least one component, block of components, and/or control information that can be used to form a matrix and/or vector to be used in a piecewise-affine or to form a matrix for a piecewise-linear transformation.

FIG. 48a depicts an example implementation of an arrangement wherein the results of conditional tests cause at least one look-up table to retrieve at least one component, block of components, and/or control information that can be used to form a matrix and/or vector to be used in a piecewise-affine or to form a matrix for a piecewise-linear transformation. A plurality of look-up tables separately operating in this way can be included (FIG. 48a depicts N look-up table operations). Optionally, the arrangement can also or alternatively provide a direct control path from the conditional tests to the matrix and vector formation operations.

Figure 48B:
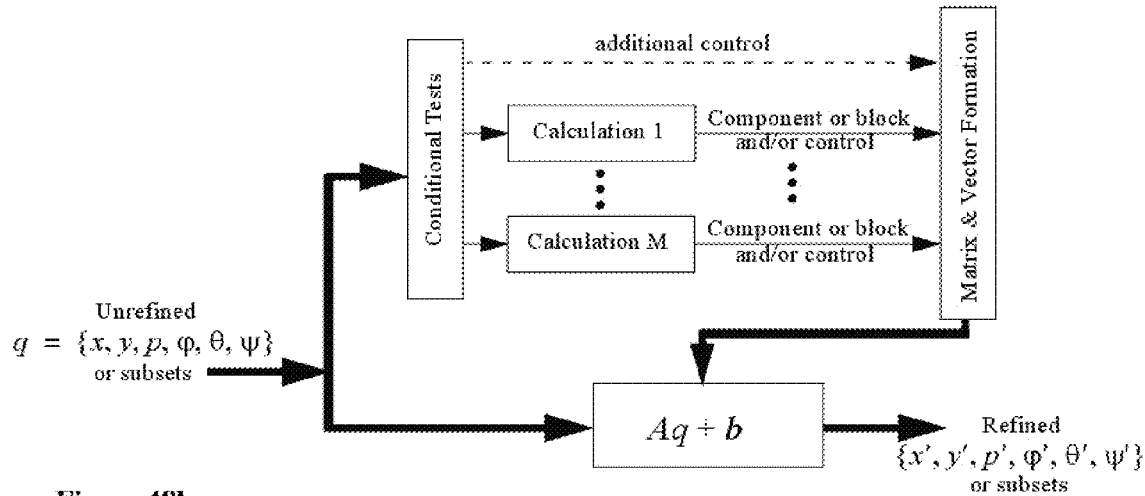
FIG. 48b depicts an example implementation of an arrangement wherein the results of conditional tests cause at least one calculation operation to calculate at least one component, block of components, and/or control information that can be used to form a matrix and/or vector to be used in a piecewise-affine or to form a matrix for a piecewise-linear transformation.

FIG. 48*b* depicts an example implementation of an arrangement wherein the results of conditional tests cause at least one calculation operation to calculate at least one component, block of components, and/or control information that can be used to form a matrix and/or vector to be used in a piecewise-affine or to form a matrix for a piecewise-linear transformation. A plurality of calculation operation separately operating in this way can be included (FIG. 48*b* depicts M calculation operations). Optionally, the arrangement can also or alternatively provide a direct control path from the conditional tests to the matrix and vector formation operations.

Figure 48C:
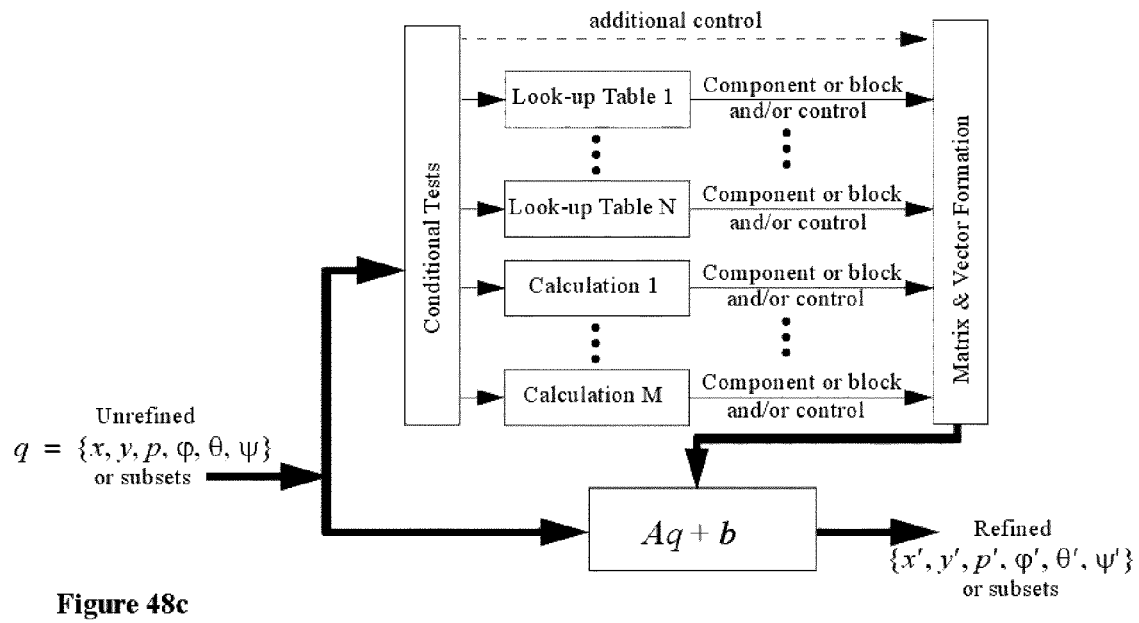
FIG. 48c depicts an example implementation of an arrangement wherein the results of conditional tests cause at least one look-up table to retrieve at least one component, block of components, and/or control information that can be used to form a matrix and/or vector to be used in a piecewise-affine or to form a matrix for a piecewise-linear transformation, and additionally cause at least one calculation operation to calculate at least one component, block of components, and/or control information that can be used to form a matrix and/or vector to be used in a piecewise-affine or to form a matrix for a piecewise-linear transformation.

FIG. 48*c* depicts an example implementation of an arrangement wherein the results of conditional tests cause at least one look-up table to retrieve at least one component, block of components, and/or control information that can be used to form a matrix and/or vector to be used in a piecewise-affine or to form a matrix for a piecewise-linear transformation, and additionally cause at least one calculation operation to calculate at least one component, block of components, and/or control information that can be used to form a matrix and/or vector to be used in a piecewise-affine or to form a matrix for a piecewise-linear transformation. A plurality of calculation operation separately operating in this way can be included (FIG. 48*c* depicts N look-up table operations and M calculation operations). Optionally, the arrangement can also or alternatively provide a direct control path from the conditional tests to the matrix and vector formation operations.

Linear Model of HDTP Parameter Coupling and Use in Determining Individual Segments of Piecewise-Linear and Piecewise-Affine Transformations In the above, linear transformation matrices are used to construct piecewise-affine and piecewise-linear transformations. Also, in general, review of measurement plots over time show that when a user varies what the user believes to a specific one or more HDTP 6D user interface parameters, the other five parameters vary somewhat as well. In order to improved decoupling and introduce other corrections via linear, piecewise-affine, or piecewise-linear transformations, one approach would be to assume the HDTP mechanics are such that, at least over a range of measurement values, a linear transformation (denoted as "L") can be used to model the cross-coupling and other effects to be corrected:

$$\begin{bmatrix} sway_{measured} \\ surge_{measured} \\ heave_{measuired} \\ roll_{measured} \\ pitch_{measured} \\ yaw_{measured} \end{bmatrix} = L \begin{bmatrix} sway_{intended} \\ surge_{intended} \\ heave_{intended} \\ roll_{intended} \\ pitch_{intended} \\ yaw_{intended} \end{bmatrix}$$

With luck such a linear transformation may be valid for a wide range of isolated (change in one parameter at a time) or simultaneous (change of two or more parameters at a time) HDTP postures and motions, and is also invertible. Assuming all such luck, the linear transformation L can be inverted and this inverse transformation can be used to obtain "user intent" from measured data:

$$\begin{bmatrix} sway_{measured} \\ surge_{measured} \\ heave_{measuired} \\ roll_{measured} \\ pitch_{measured} \\ yaw_{measured} \end{bmatrix} = L^{-1} \begin{bmatrix} sway_{intended} \\ surge_{intended} \\ heave_{intended} \\ roll_{intended} \\ pitch_{intended} \\ yaw_{intended} \end{bmatrix}$$

Even if such a model with a fixed transformation L is not valid for a wide range of parameter variations, such a model can be useful in a small confined range, and a collection $\{L_j\}$ of such transformations can be selected from depending upon the segmented range of the measured parameters. For example, the six-dimensional parameter space $\Omega$ can be partitioned into a number of pairwise-contiguous regions $\{R_j\}$ so that $$\bigcup_j R_j = \Omega$$

and a linear transformation $L_j$ is associated with each region $R_j$. The result can be used to create a piecewise-linear transformation as well as piecewise-affine transformations.

In an embodiment, pairs of linear transformations can be adjusted so that on a transition boundary between two transformations in the collection, say $L_1^{-1}$ and $L_2^{-1}$, are such that on the measured data transition boundary between bordering regions $R_1$ and $R_2$ the two linear transformations $L_1^{-1}$ and $L_2^{-1}$ agree and give the same value of 'user intent' data from the same measured data value. Such a construction results in a multi-variable piecewise-affine implementation for improving decoupling among the parameters. To find such linear transformations L and/or $L^{-1}$, one strategy will be to use multiple data points and solve for the entries in the 6×6 matrix L. To formalize, one can start over and regard the linear transformation as a distortion matrix acting upon "basis data" confined within in some region $R_j$ to give "distorted data."

$$\text{dist}^{[k]} = D \, \text{basis}^{[k]} \quad (1)$$

Distorted data is equivalent to the distorted matrix multiplied by the basis data with component number k. For basis data, it is convenient is a first consideration to use vectors $\text{basis}^{[i]}(z)$ is such that $i^{th}$ element is z and all other elements are zeros, i.e.:

$$basis^{[1]}(z) = \begin{bmatrix} z \\ 0 \\ 0 \\ 0 \\ 0 \\ 0 \end{bmatrix}, basis^{[2]}(z) = \begin{bmatrix} 0 \\ z \\ 0 \\ 0 \\ 0 \\ 0 \end{bmatrix}, \quad (2)$$

$$basis^{[3]}(z) = \begin{bmatrix} 0 \\ 0 \\ z \\ 0 \\ 0 \\ 0 \end{bmatrix}, basis^{[4]}(z) = \begin{bmatrix} 0 \\ 0 \\ 0 \\ z \\ 0 \\ 0 \end{bmatrix},$$

-continued $$basis^{[5]}(z) = \begin{bmatrix} 0 \\ 0 \\ 0 \\ 0 \\ z \\ 0 \end{bmatrix}, \quad basis^{[6]}(z) = \begin{bmatrix} 0 \\ 0 \\ 0 \\ 0 \\ 0 \\ z \end{bmatrix}.$$

The individual vector elements comprised by the distorted data vector can be represented as:

$$dist^{[k]}(z) = \begin{bmatrix} dist^{[k]}(z)[[1]] \\ dist^{[k]}(z)[[2]] \\ dist^{[k]}(z)[[3]] \\ dist^{[k]}(z)[[4]] \\ dist^{[k]}(z)[[5]] \\ dist^{[k]}(z)[[6]] \end{bmatrix}$$

where, as in Mathematica™, the notation x[[k]] signifies the $k^{th}$ component of the vector x. This notation scheme is used so that subscripts and superscripts, traditionally used for signifying the $k^{th}$ component of a vector, can be used for other purposes.

The distortion matrix D can be represented with entries $d_{jk}$ in the $j^{th}$ row and $k^{th}$ column.

$$D = \begin{bmatrix} d_{11} & d_{12} & \ldots & d_{16} \\ d_{21} & & & \ldots \\ \ldots & & & \ldots \\ d_{61} & \ldots & \ldots & d_{66} \end{bmatrix} \quad (3)$$

Referring to equation (2), the first row creates $1^{st}$ entry in $dist^{[k]}(x)$, and the last row creates $6^{th}$ entry in $dist^{[k]}(x)$.

The first column multiplies $1^{st}$ element of $basis^{[k]}(x)$, and the last column multiplies $6^{th}$ element of $basis^{[k]}(x)$. For example, $$dist^{[k]}(z) = D\, basis^{[k]}(z) \quad (5)$$

for all i=1, 2, 3, . . . , 6.

If the distortion matrix introduced no coupling between parameter valves, all off-diagonal elements would be zero, i.e. $d_{mj}=0$ where $m \neq j$.

However, the value of the approach to be constructed is one where we assume all off-diagonal are not zero-valued case and attempt to calculate the $d_{jk}$ from measured data.

The basis vectors considered thus far simplify calculations, but experimental conditions were all non-changing parameters take on and maintain a value of exactly zero are impractical to produce. In fact, experimental conditions where all non-changing parameters take on and maintain any specific constant value are difficult to produce in practice.

Thus the values of the non-changing parameters in general can be regarded at least for a time as unknowns that are more than likely non-zero.

Thus one can define another family of input vectors that are not pure-component basis vectors but rather have ambient values. For convenience, these can be called "ambient" test vectors:

$$ambient^{[1]}(z^{[1]}) = \begin{bmatrix} z^{[1]} \\ c_2^{[1]} \\ c_3^{[1]} \\ c_4^{[1]} \\ c_5^{[1]} \\ c_6^{[1]} \end{bmatrix}$$

$$\vdots$$

$$ambient^{[6]}(z^{[6]}) = \begin{bmatrix} c_1^{[6]} \\ c_2^{[6]} \\ c_3^{[6]} \\ c_4^{[6]} \\ c_5^{[6]} \\ z^{[6]} \end{bmatrix}$$

The idea of this model is that (for each k=1, 2, 3, 4, 5, 6), the intended parameter is represented by the variable $z^{[k]}$ and is assumed to vary widely under the control of the user who also intends the values $c_j[k]$ to be constant as $z[k]$ is varied over that range.

The detailed equations for each of the six HDTP parameters are now presented.

First Parameter

For an ambient test vector $ambient^{[1]}(z^{[1]})$, established for isolated variation of the first HDTP parameter $z^{[1]}$, the vector equation is:

$$dist^{[1]}(z^{[1]}) = D\, ambient^{[1]}(z^{[1]})$$

which signifies $$\begin{bmatrix} dist^{[1]}(z)[[1]] \\ dist^{[1]}(z)[[2]] \\ dist^{[1]}(z)[[3]] \\ dist^{[1]}(z)[[4]] \\ dist^{[1]}(z)[[5]] \\ dist^{[1]}(z)[[6]] \end{bmatrix} = \begin{bmatrix} d_{11} & d_{12} & d_{13} & d_{14} & d_{15} & d_{16} \\ d_{21} & d_{22} & d_{23} & d_{24} & d_{25} & d_{26} \\ d_{31} & d_{32} & d_{33} & d_{34} & d_{35} & d_{36} \\ d_{41} & d_{42} & d_{43} & d_{44} & d_{45} & d_{46} \\ d_{51} & d_{52} & d_{53} & d_{54} & d_{55} & d_{56} \\ d_{61} & d_{62} & d_{63} & d_{64} & d_{65} & d_{66} \end{bmatrix} \begin{bmatrix} z^{[1]} \\ c_2^{[1]} \\ c_3^{[1]} \\ c_4^{[1]} \\ c_5^{[1]} \\ c_6^{[1]} \end{bmatrix}$$

and which comprises the following six low level equations:

$dist^{[1]}(z^{[1]})[[1]] = d_{11}z^{[1]} + d_{12}c_2^{[1]} + d_{13}c_3^{[1]} + d_{14}c_4^{[1]} + d_{15}c_5^{[1]} + d_{16}c_6^{[1]}$ $dist^{[1]}(z^{[1]})[[2]] = d_{21}z^{[1]} + d_{22}c_2^{[1]} + d_{23}c_3^{[1]} + d_{24}c_4^{[1]} + d_{25}c_5^{[1]} + d_{26}c_6^{[1]}$ $dist^{[1]}(z^{[1]})[[3]] = d_{31}z^{[1]} + d_{32}c_2^{[1]} + d_{33}c_3^{[1]} + d_{34}c_4^{[1]} + d_{35}c_5^{[1]} + d_{36}c_6^{[1]}$ $dist^{[1]}(z^{[1]})[[4]] = d_{41}z^{[1]} + d_{42}c_2^{[1]} + d_{43}c_3^{[1]} + d_{44}c_4^{[1]} + d_{45}c_5^{[1]} + d_{46}c_6^{[1]}$ $dist^{[1]}(z^{[1]})[[5]] = d_{51}z^{[1]} + d_{52}c_2^{[1]} + d_{53}c_3^{[1]} + d_{54}c_4^{[1]} + d_{55}c_5^{[1]} + d_{56}c_6^{[1]}$ $dist^{[1]}(z^{[1]})[[6]] = d_{61}z^{[1]} + d_{62}c_2^{[1]} + d_{63}c_3^{[1]} + d_{64}c_4^{[1]} + d_{65}c_5^{[1]} + d_{66}c_6^{[1]}$ Second Parameter For an ambient test vector $ambient^{[2]}(z^{[2]})$ established for isolated variation of the second HDTP parameter $z^{[2]}$, the vector equation is:

$$dist^{[2]}(z^{[2]}) = D\, ambient^{[2]}(z^{[2]})$$

which signifies $$\begin{bmatrix} dist^{[2]}(z)[[1]] \\ dist^{[2]}(z)[[2]] \\ dist^{[2]}(z)[[3]] \\ dist^{[2]}(z)[[4]] \\ dist^{[2]}(z)[[5]] \\ dist^{[2]}(z)[[6]] \end{bmatrix} = \begin{bmatrix} d_{11} & d_{12} & d_{13} & d_{14} & d_{15} & d_{16} \\ d_{21} & d_{22} & d_{23} & d_{24} & d_{25} & d_{26} \\ d_{31} & d_{32} & d_{33} & d_{34} & d_{35} & d_{36} \\ d_{41} & d_{42} & d_{43} & d_{44} & d_{45} & d_{46} \\ d_{51} & d_{52} & d_{53} & d_{54} & d_{55} & d_{56} \\ d_{61} & d_{62} & d_{63} & d_{64} & d_{65} & d_{66} \end{bmatrix} \begin{bmatrix} c_1^{[2]} \\ z^{[2]} \\ c_3^{[2]} \\ c_4^{[2]} \\ c_5^{[2]} \\ c_6^{[2]} \end{bmatrix}$$

and which comprises the following six low level equations:

$dist^{[2]}(z^{[2]})[[1]] = d_{11}z^{[2]} + d_{12}c_2^{[2]} + d_{13}c_3^{[2]} + d_{14}c_4^{[2]} + d_{15}c_5^{[2]} + d_{16}c_6^{[2]}$ $dist^{[2]}(z^{[2]})[[2]] = d_{21}z^{[2]} + d_{22}c_2^{[2]} + d_{23}c_3^{[2]} + d_{24}c_4^{[2]} + d_{25}c_5^{[2]} + d_{26}c_6^{[2]}$ $dist^{[2]}(z^{[2]})[[3]] = d_{31}z^{[2]} + d_{32}c_2^{[2]} + d_{33}c_3^{[2]} + d_{34}c_4^{[2]} + d_{35}c_5^{[2]} + d_{36}c_6^{[2]}$ $dist^{[2]}(z^{[2]})[[4]] = d_{41}z^{[2]} + d_{42}c_2^{[2]} + d_{43}c_3^{[2]} + d_{44}c_4^{[2]} + d_{45}c_5^{[2]} + d_{46}c_6^{[2]}$ $dist^{[2]}(z^{[2]})[[5]] = d_{51}z^{[2]} + d_{52}c_2^{[2]} + d_{53}c_3^{[2]} + d_{54}c_4^{[2]} + d_{55}c_5^{[2]} + d_{56}c_6^{[2]}$ $dist^{[2]}(z^{[2]})[[6]] = d_{61}z^{[2]} + d_{62}c_2^{[2]} + d_{63}c_3^{[2]} + d_{64}c_4^{[2]} + d_{65}c_5^{[2]} + d_{66}c_6^{[2]}$ Third Parameter For an ambient test vector ambient$^{[3]}(z^{[3]})$, established for isolated variation of the third HDTP parameter $z^{[3]}$, the vector equation is:

$dist^{[3]}(z^{[3]}) = D\,ambient^{[3]}(Z^{[3]})$ which signifies $$\begin{bmatrix} dist^{[3]}(z)[[1]] \\ dist^{[3]}(z)[[2]] \\ dist^{[3]}(z)[[3]] \\ dist^{[3]}(z)[[4]] \\ dist^{[3]}(z)[[5]] \\ dist^{[3]}(z)[[6]] \end{bmatrix} = \begin{bmatrix} d_{11} & d_{12} & d_{13} & d_{14} & d_{15} & d_{16} \\ d_{21} & d_{22} & d_{23} & d_{24} & d_{25} & d_{26} \\ d_{31} & d_{32} & d_{33} & d_{34} & d_{35} & d_{36} \\ d_{41} & d_{42} & d_{43} & d_{44} & d_{45} & d_{46} \\ d_{51} & d_{52} & d_{53} & d_{54} & d_{55} & d_{56} \\ d_{61} & d_{62} & d_{63} & d_{64} & d_{65} & d_{66} \end{bmatrix} \begin{bmatrix} c_1^{[3]} \\ c_2^{[3]} \\ z^{[3]} \\ c_4^{[3]} \\ c_5^{[3]} \\ c_6^{[3]} \end{bmatrix}$$

and which comprises the following six low level equations:

$dist^{[3]}(z^{[3]})[[1]] = d_{11}z^{[3]} + d_{12}c_2^{[3]} + d_{13}c_3^{[3]} + d_{14}c_4^{[3]} + d_{15}c_5^{[3]} + d_{16}c_6^{[3]}$ $dist^{[3]}(z^{[3]})[[2]] = d_{21}z^{[3]} + d_{22}c_2^{[3]} + d_{23}c_3^{[3]} + d_{24}c_4^{[3]} + d_{25}c_5^{[3]} + d_{26}c_6^{[3]}$ $dist^{[3]}(z^{[3]})[[3]] = d_{31}z^{[3]} + d_{32}c_2^{[3]} + d_{33}c_3^{[3]} + d_{34}c_4^{[3]} + d_{35}c_5^{[3]} + d_{36}c_6^{[3]}$ $dist^{[3]}(z^{[3]})[[4]] = d_{41}z^{[3]} + d_{42}c_2^{[3]} + d_{43}c_3^{[3]} + d_{44}c_4^{[3]} + d_{45}c_5^{[3]} + d_{46}c_6^{[3]}$ $dist^{[3]}(z^{[3]})[[5]] = d_{51}z^{[3]} + d_{52}c_2^{[3]} + d_{53}c_3^{[3]} + d_{54}c_4^{[3]} + d_{55}c_5^{[3]} + d_{56}c_6^{[3]}$ $dist^{[3]}(z^{[3]})[[6]] = d_{61}z^{[3]} + d_{62}c_2^{[3]} + d_{63}c_3^{[3]} + d_{64}c_4^{[3]} + d_{65}c_5^{[3]} + d_{66}c_6^{[3]}$ Fourth Parameter For an ambient test vector ambient$^{[4]}(z^{[4]})$, established for isolated variation of the fourth HDTP parameter $z^{[4]}$, the vector equation is:

$dist^{[4]}(z^{[4]}) = D\,ambient^{[4]}(z^{[4]})$ which signifies $$\begin{bmatrix} dist^{[4]}(z)[[1]] \\ dist^{[4]}(z)[[2]] \\ dist^{[4]}(z)[[3]] \\ dist^{[4]}(z)[[4]] \\ dist^{[4]}(z)[[5]] \\ dist^{[4]}(z)[[6]] \end{bmatrix} = \begin{bmatrix} d_{11} & d_{12} & d_{13} & d_{14} & d_{15} & d_{16} \\ d_{21} & d_{22} & d_{23} & d_{24} & d_{25} & d_{26} \\ d_{31} & d_{32} & d_{33} & d_{34} & d_{35} & d_{36} \\ d_{41} & d_{42} & d_{43} & d_{44} & d_{45} & d_{46} \\ d_{51} & d_{52} & d_{53} & d_{54} & d_{55} & d_{56} \\ d_{61} & d_{62} & d_{63} & d_{64} & d_{65} & d_{66} \end{bmatrix} \begin{bmatrix} c_1^{[4]} \\ c_2^{[4]} \\ c_3^{[4]} \\ z^{[4]} \\ c_5^{[4]} \\ c_6^{[4]} \end{bmatrix}$$

and which comprises the following six low level equations:

$dist^{[4]}(z^{[4]})[[1]] = d_{11}z^{[4]} + d_{12}c_2^{[4]} + d_{13}c_3^{[4]} + d_{14}c_4^{[4]} + d_{15}c_5^{[4]} + d_{16}c_6^{[4]}$ $dist^{[4]}(z^{[4]})[[2]] = d_{21}z^{[4]} + d_{22}c_2^{[4]} + d_{23}c_3^{[4]} + d_{24}c_4^{[4]} + d_{25}c_5^{[4]} + d_{26}c_6^{[4]}$ $dist^{[4]}(z^{[4]})[[3]] = d_{31}z^{[4]} + d_{32}c_2^{[4]} + d_{33}c_3^{[4]} + d_{34}c_4^{[4]} + d_{35}c_5^{[4]} + d_{36}c_6^{[4]}$ $dist^{[4]}(z^{[4]})[[4]] = d_{41}z^{[4]} + d_{42}c_2^{[4]} + d_{43}c_3^{[4]} + d_{44}c_4^{[4]} + d_{45}c_5^{[4]} + d_{46}c_6^{[4]}$ $dist^{[4]}(z^{[4]})[[5]] = d_{51}z^{[4]} + d_{52}c_2^{[4]} + d_{53}c_3^{[4]} + d_{54}c_4^{[4]} + d_{55}c_5^{[4]} + d_{56}c_6^{[4]}$ $dist^{[4]}(z^{[4]})[[6]] = d_{61}z^{[4]} + d_{62}c_2^{[4]} + d_{63}c_3^{[4]} + d_{64}c_4^{[4]} + d_{65}c_5^{[4]} + d_{66}c_6^{[4]}$ Fifth Parameter For an ambient test vector ambient$^{[5]}(z^{[5]})$, established for isolated variation of the fifth HDTP parameter $z^{[5]}$, the vector equation is:

$dist^{[5]}(z^{[5]}) = D\,ambient^{[5]}(z^{[5]})$ which signifies $$\begin{bmatrix} dist^{[5]}(z)[[1]] \\ dist^{[5]}(z)[[2]] \\ dist^{[5]}(z)[[3]] \\ dist^{[5]}(z)[[4]] \\ dist^{[5]}(z)[[5]] \\ dist^{[5]}(z)[[6]] \end{bmatrix} = \begin{bmatrix} d_{11} & d_{12} & d_{13} & d_{14} & d_{15} & d_{16} \\ d_{21} & d_{22} & d_{23} & d_{24} & d_{25} & d_{26} \\ d_{31} & d_{32} & d_{33} & d_{34} & d_{35} & d_{36} \\ d_{41} & d_{42} & d_{43} & d_{44} & d_{45} & d_{46} \\ d_{51} & d_{52} & d_{53} & d_{54} & d_{55} & d_{56} \\ d_{61} & d_{62} & d_{63} & d_{64} & d_{65} & d_{66} \end{bmatrix} \begin{bmatrix} c_1^{[5]} \\ c_2^{[5]} \\ c_3^{[5]} \\ c_4^{[5]} \\ z^{[5]} \\ c_6^{[5]} \end{bmatrix}$$

and which comprises the following six low level equations:

$dist^{[5]}(z^{[5]})[[1]] = d_{11}z^{[5]} + d_{12}c_2^{[5]} + d_{13}c_3^{[5]} + d_{14}c_4^{[5]} + d_{15}c_5^{[5]} + d_{16}c_6^{[5]}$ $dist^{[5]}(z^{[5]})[[2]] = d_{21}z^{[5]} + d_{22}c_2^{[5]} + d_{23}c_3^{[5]} + d_{24}c_4^{[5]} + d_{25}c_5^{[5]} + d_{26}c_6^{[5]}$ $dist^{[5]}(z^{[5]})[[3]] = d_{31}z^{[5]} + d_{32}c_2^{[5]} + d_{33}c_3^{[5]} + d_{34}c_4^{[5]} + d_{35}c_5^{[5]} + d_{36}c_6^{[5]}$ $dist^{[5]}(z^{[5]})[[4]] = d_{41}z^{[5]} + d_{42}c_2^{[5]} + d_{43}c_3^{[5]} + d_{44}c_4^{[5]} + d_{45}c_5^{[5]} + d_{46}c_6^{[5]}$ $\text{dist}^{[5]}(z^{[5]})[[5]] = d_{51}z^{[5]} + d_{52}c_2^{[5]} + d_{53}c_3^{[5]} + d_{54}c_4^{[5]} + d_{55}c_5^{[5]} + d_{56}c_6^{[5]}$ $\text{dist}^{[5]}(z^{[5]})[[6]] = d_{61}z^{[5]} + d_{62}c_2^{[5]} + d_{63}c_3^{[5]} + d_{64}c_4^{[5]} + d_{65}c_5^{[5]} + d_{66}c_6^{[5]}$ Sixth Parameter For an ambient test vector ambient$^{[6]}(z^{[6]})$, established for isolated variation of the sixth HDTP parameter $z^{[6]}$, the vector equation is:

$$\text{dist}^{[6]}(z^{[6]}) = D\,\text{ambient}^{[6]}(z^{[6]})$$

or $$\begin{bmatrix} \text{dist}^{[6]}(z)[[1]] \\ \text{dist}^{[6]}(z)[[2]] \\ \text{dist}^{[6]}(z)[[3]] \\ \text{dist}^{[6]}(z)[[4]] \\ \text{dist}^{[6]}(z)[[5]] \\ \text{dist}^{[6]}(z)[[6]] \end{bmatrix} = \begin{bmatrix} d_{11} & d_{12} & d_{13} & d_{14} & d_{15} & d_{16} \\ d_{21} & d_{22} & d_{23} & d_{24} & d_{25} & d_{26} \\ d_{31} & d_{32} & d_{33} & d_{34} & d_{35} & d_{36} \\ d_{41} & d_{42} & d_{43} & d_{44} & d_{45} & d_{46} \\ d_{51} & d_{52} & d_{53} & d_{54} & d_{55} & d_{56} \\ d_{61} & d_{62} & d_{63} & d_{64} & d_{65} & d_{66} \end{bmatrix} \begin{bmatrix} c_1^{[6]} \\ c_2^{[6]} \\ c_3^{[6]} \\ c_4^{[6]} \\ c_5^{[6]} \\ z^{[6]} \end{bmatrix}$$

which comprises the following six low level equations:

$\text{dist}^{[6]}(z^{[6]})[[1]] = d_{11}z^{[6]} + d_{12}c_2^{[6]} + d_{13}c_3^{[6]} + d_{14}c_4^{[6]} + d_{15}c_5^{[6]} + d_{16}c_6^{[6]}$ $\text{dist}^{[6]}(z^{[6]})[[2]] = d_{21}z^{[6]} + d_{22}c_2^{[6]} + d_{23}c_3^{[6]} + d_{24}c_4^{[6]} + d_{25}c_5^{[6]} + d_{26}c_6^{[6]}$ $\text{dist}^{[6]}(z^{[6]})[[3]] = d_{31}z^{[6]} + d_{32}c_2^{[6]} + d_{33}c_3^{[6]} + d_{34}c_4^{[6]} + d_{35}c_5^{[6]} + d_{36}c_6^{[6]}$ $\text{dist}^{[6]}(z^{[6]})[[4]] = d_{41}z^{[6]} + d_{42}c_2^{[6]} + d_{43}c_3^{[6]} + d_{44}c_4^{[6]} + d_{45}c_5^{[6]} + d_{46}c_6^{[6]}$ $\text{dist}^{[6]}(z^{[6]})[[5]] = d_{51}z^{[6]} + d_{52}c_2^{[6]} + d_{53}c_3^{[6]} + d_{54}c_4^{[6]} + d_{55}c_5^{[6]} + d_{56}c_6^{[6]}$ $\text{dist}^{[6]}(z^{[6]})[[6]] = d_{61}z^{[6]} + d_{62}c_2^{[6]} + d_{63}c_3^{[6]} + d_{64}c_4^{[6]} + d_{65}c_5^{[6]} + d_{66}c_6^{[6]}$ Reorganization of Equations to Solve for the Components of the Distortion Matrix In the previous construction, in principle, one could gather a large collection of data points and solve for all of the unknowns that includes 36 unknown elements (d variables) in the D matrix and 30 unknown elements (c variables) over the six classes of ambient vectors. However those equations are not linear because there are cross products between unknown variables in the matrix D (d variables) and unknown c variables in the six classes of ambient vectors.

In an embodiment, a simplifying approximation is employed wherein the distorted vector data chosen can be of a within a limited region R of variation of the ambient vector parameters represented by z, and the c values can be approximated by the average of the data for that element in the ambient vector class. This approach removes 30 unknown (c variables) elements over the six classes of ambient vectors and also makes the equations linear with respect to those 36 unknown elements.

In one approach provided for by the invention, the 36 unknown elements in the D matrix are solved for using linear methods. In an embodiment, a first step would be to sort the equations by element index.

For the first element in the distorted vector data, corresponding to the first parameter, the equations are:

$$\begin{bmatrix} \text{dist}^{[1]}(z^{[1]})[[1]] \\ \text{dist}^{[2]}(z^{[2]})[[1]] \\ \text{dist}^{[3]}(z^{[3]})[[1]] \\ \text{dist}^{[4]}(z^{[4]})[[1]] \\ \text{dist}^{[5]}(z^{[5]})[[1]] \\ \text{dist}^{[6]}(z^{[6]})[[1]] \end{bmatrix} = \begin{bmatrix} d_{11}z^{[1]} + d_{12}c_2^{[1]} + d_{13}c_3^{[1]} + d_{14}c_4^{[1]} + d_{15}c_5^{[1]} + d_{16}c_6^{[1]} \\ d_{11}c_1^{[2]} + d_{12}z^{[2]} + d_{13}c_3^{[2]} + d_{14}c_4^{[2]} + d_{15}c_5^{[2]} + d_{16}c_6^{[2]} \\ d_{11}c_1^{[3]} + d_{12}c_2^{[3]} + d_{13}z^{[3]} + d_{14}c_4^{[3]} + d_{15}c_5^{[3]} + d_{16}c_6^{[3]} \\ d_{11}c_1^{[4]} + d_{12}c_2^{[4]} + d_{13}c_3^{[4]} + d_{14}z^{[4]} + d_{15}c_5^{[4]} + d_{16}c_6^{[4]} \\ d_{11}c_1^{[5]} + d_{12}c_2^{[5]} + d_{13}c_3^{[5]} + d_{14}c_4^{[5]} + d_{15}z^{[5]} + d_{16}c_6^{[5]} \\ d_{11}c_1^{[6]} + d_{12}c_2^{[6]} + d_{13}c_3^{[6]} + d_{14}c_4^{[6]} + d_{15}c_5^{[6]} + d_{16}z^{[6]} \end{bmatrix}$$

which can be written as a C matrix (comprising the aforementioned averages) multiplying a d vector $$\begin{bmatrix} d_{11} \\ d_{12} \\ d_{13} \\ d_{14} \\ d_{15} \\ d_{16} \end{bmatrix},$$

that is $$\begin{bmatrix} \text{dist}^{[1]}(z^{[1]})[[1]] \\ \text{dist}^{[2]}(z^{[2]})[[1]] \\ \text{dist}^{[3]}(z^{[3]})[[1]] \\ \text{dist}^{[4]}(z^{[4]})[[1]] \\ \text{dist}^{[5]}(z^{[5]})[[1]] \\ \text{dist}^{[6]}(z^{[6]})[[1]] \end{bmatrix} = \begin{bmatrix} z^{[1]} & c_2^{[1]} & c_3^{[1]} & c_4^{[1]} & c_5^{[1]} & c_6^{[1]} \\ c_1^{[2]} & z^{[2]} & c_3^{[2]} & c_4^{[2]} & c_5^{[2]} & c_6^{[2]} \\ c_1^{[3]} & c_2^{[3]} & z^{[3]} & c_4^{[3]} & c_5^{[3]} & c_6^{[3]} \\ c_1^{[4]} & c_2^{[4]} & c_3^{[4]} & z^{[4]} & c_5^{[4]} & c_6^{[4]} \\ c_1^{[5]} & c_2^{[5]} & c_3^{[5]} & c_4^{[5]} & z^{[5]} & c_6^{[5]} \\ c_1^{[6]} & c_2^{[6]} & c_3^{[6]} & c_4^{[6]} & c_5^{[6]} & z^{[6]} \end{bmatrix} \begin{bmatrix} d_{11} \\ d_{12} \\ d_{13} \\ d_{14} \\ d_{15} \\ d_{16} \end{bmatrix}$$

Similarly, for the second element in the distorted vector data, corresponding to the second parameter, the equations are:

$\text{dist}^{[1]}(z^{[1]})[[2]] = d_{21}z^{[1]} + d_{22}c_2^{[1]} + d_{23}c_3^{[1]} + d_{24}c_4^{[1]} + d_{25}c_5^{[1]} + d_{26}c_6^{[1]}$ $\text{dist}^{[2]}(z^{[2]})[[2]] = d_{21}c_1^{[2]} + d_{22}z^{[2]} + d_{23}c_3^{[2]} + d_{24}c_4^{[2]} + d_{25}c_5^{[2]} + d_{26}c_6^{[2]}$ $\text{dist}^{[3]}(z^{[3]})[[2]] = d_{21}c_1^{[3]} + d_{22}c_2^{[3]} + d_{23}z^{[3]} + d_{24}c_4^{[3]} + d_{25}c_5^{[3]} + d_{26}c_6^{[3]}$ $\text{dist}^{[4]}(z^{[4]})[[2]] = d_{21}c_1^{[4]} + d_{22}c_2^{[4]} + d_{23}c_3^{[4]} + d_{24}z^{[4]} + d_{25}c_5^{[4]} + d_{26}c_6^{[4]}$ $\text{dist}^{[5]}(z^{[5]})[[2]] = d_{21}c_1^{[5]} + d_{22}c_2^{[5]} + d_{23}c_3^{[5]} + d_{24}c_4^{[5]} + d_{25}z^{[5]} + d_{26}c_6^{[5]}$ $\text{dist}^{[6]}(z^{[6]})[[2]] = d_{21}c_1^{[6]} + d_{22}c_2^{[6]} + d_{23}c_3^{[6]} + d_{24}c_4^{[6]} + d_{25}c_5^{[6]} + d_{26}z^{[6]}$ which can be written as a C matrix (comprising the aforementioned averages) multiplying a d vector $$\begin{bmatrix} d_{21} \\ d_{22} \\ d_{23} \\ d_{24} \\ d_{25} \\ d_{26} \end{bmatrix},$$

that is $$\begin{bmatrix} dist^{[1]}(z^{[1]})[[2]] \\ dist^{[2]}(z^{[2]})[[2]] \\ dist^{[3]}(z^{[3]})[[2]] \\ dist^{[4]}(z^{[4]})[[2]] \\ dist^{[5]}(z^{[5]})[[2]] \\ dist^{[6]}(z^{[6]})[[2]] \end{bmatrix} = \begin{bmatrix} z^{[1]} & c_2^{[1]} & c_3^{[1]} & c_4^{[1]} & c_5^{[1]} & c_6^{[1]} \\ c_1^{[2]} & z^{[2]} & c_3^{[2]} & c_4^{[2]} & c_5^{[2]} & c_6^{[2]} \\ c_1^{[3]} & c_2^{[3]} & z^{[3]} & c_4^{[3]} & c_5^{[3]} & c_6^{[3]} \\ c_1^{[4]} & c_2^{[4]} & c_3^{[4]} & z^{[4]} & c_5^{[4]} & c_6^{[4]} \\ c_1^{[5]} & c_2^{[5]} & c_3^{[5]} & c_4^{[5]} & z^{[5]} & c_6^{[5]} \\ c_1^{[6]} & c_2^{[6]} & c_3^{[6]} & c_4^{[6]} & c_5^{[6]} & z^{[6]} \end{bmatrix} \begin{bmatrix} d_{21} \\ d_{22} \\ d_{23} \\ d_{24} \\ d_{25} \\ d_{26} \end{bmatrix}$$

For the third element in the distorted vector data, corresponding to the third parameter, the equations are:

$dist^{[1]}(z^{[1]})[[3]] = d_{31}z^{[1]} + d_{32}c_2^{[1]} + d_{33}c_3^{[1]} + d_{34}c_4^{[1]} + d_{35}c_5^{[1]} + d_{36}c_6^{[1]}$ $dist^{[2]}(z^{[2]})[[3]] = d_{31}c_1^{[2]} + d_{32}z^{[2]} + d_{33}c_3^{[2]} + d_{34}c_4^{[2]} + d_{35}c_5^{[2]} + d_{36}c_6^{[2]}$ $dist^{[3]}(z^{[3]})[[3]] = d_{31}c_1^{[3]} + d_{32}c_2^{[3]} + d_{33}z^{[3]} + d_{34}c_4^{[3]} + d_{35}c_5^{[3]} + d_{36}c_6^{[3]}$ $dist^{[4]}(z^{[4]})[[3]] = d_{31}c_1^{[4]} + d_{32}c_2^{[4]} + d_{33}c_3^{[4]} + d_{34}z^{[4]} + d_{35}c_5^{[4]} + d_{36}c_6^{[4]}$ $dist^{[5]}(z^{[5]})[[3]] = d_{31}c_1^{[5]} + d_{32}c_2^{[5]} + d_{33}c_3^{[5]} + d_{34}c_4^{[5]} + d_{35}z^{[5]} + d_{36}c_6^{[5]}$ $dist^{[6]}(z^{[6]})[[3]] = d_{31}c_1^{[6]} + d_{32}c_2^{[6]} + d_{33}c_3^{[6]} + d_{34}c_4^{[6]} + d_{35}c_5^{[6]} + d_{36}z^{[6]}$ which can be written as a C matrix (comprising the aforementioned averages) multiplying a d vector $$\begin{bmatrix} d_{31} \\ d_{32} \\ d_{33} \\ d_{34} \\ d_{35} \\ d_{36} \end{bmatrix},$$

that is $$\begin{bmatrix} dist^{[1]}(z^{[1]})[[3]] \\ dist^{[2]}(z^{[2]})[[3]] \\ dist^{[3]}(z^{[3]})[[3]] \\ dist^{[4]}(z^{[4]})[[3]] \\ dist^{[5]}(z^{[5]})[[3]] \\ dist^{[6]}(z^{[6]})[[3]] \end{bmatrix} = \begin{bmatrix} z^{[1]} & c_2^{[1]} & c_3^{[1]} & c_4^{[1]} & c_5^{[1]} & c_6^{[1]} \\ c_1^{[2]} & z^{[2]} & c_3^{[2]} & c_4^{[2]} & c_5^{[2]} & c_6^{[2]} \\ c_1^{[3]} & c_2^{[3]} & z^{[3]} & c_4^{[3]} & c_5^{[3]} & c_6^{[3]} \\ c_1^{[4]} & c_2^{[4]} & c_3^{[4]} & z^{[4]} & c_5^{[4]} & c_6^{[4]} \\ c_1^{[5]} & c_2^{[5]} & c_3^{[5]} & c_4^{[5]} & z^{[5]} & c_6^{[5]} \\ c_1^{[6]} & c_2^{[6]} & c_3^{[6]} & c_4^{[6]} & c_5^{[6]} & z^{[6]} \end{bmatrix} \begin{bmatrix} d_{31} \\ d_{32} \\ d_{33} \\ d_{34} \\ d_{35} \\ d_{36} \end{bmatrix}$$

For the fourth element in the distorted vector data, corresponding to the fourth parameter, the equations are:

$dist^{[1]}(z^{[1]})[[4]] = d_{41}z^{[1]} + d_{42}c_2^{[1]} + d_{43}c_3^{[1]} + d_{44}c_4^{[1]} + d_{45}c_5^{[1]} + d_{46}c_6^{[1]}$ $dist^{[2]}(z^{[2]})[[4]] = d_{41}c_1^{[2]} + d_{42}z^{[2]} + d_{43}c_3^{[2]} + d_{44}c_4^{[2]} + d_{45}c_5^{[2]} + d_{46}c_6^{[2]}$ $dist^{[3]}(z^{[3]})[[4]] = d_{41}c_1^{[3]} + d_{42}c_2^{[3]} + d_{43}z^{[3]} + d_{44}c_4^{[3]} + d_{45}c_5^{[3]} + d_{46}c_6^{[3]}$ $dist^{[4]}(z^{[4]})[[4]] = d_{41}c_1^{[4]} + d_{42}c_2^{[4]} + d_{43}c_3^{[4]} + d_{44}z^{[4]} + d_{45}c_5^{[4]} + d_{46}c_6^{[4]}$ $dist^{[5]}(z^{[5]})[[4]] = d_{41}c_1^{[5]} + d_{42}c_2^{[5]} + d_{43}c_3^{[5]} + d_{44}c_4^{[5]} + d_{45}z^{[5]} + d_{46}c_6^{[5]}$ $dist^{[6]}(z^{[6]})[[4]] = d_{41}c_1^{[6]} + d_{42}c_2^{[6]} + d_{43}c_3^{[6]} + d_{44}c_4^{[6]} + d_{45}c_5^{[6]} + d_{46}z^{[6]}$ which can be written as a C matrix (comprising the aforementioned averages) multiplying a d vector $$\begin{bmatrix} d_{41} \\ d_{42} \\ d_{43} \\ d_{44} \\ d_{45} \\ d_{46} \end{bmatrix},$$

that is $$\begin{bmatrix} dist^{[1]}(z^{[1]})[[4]] \\ dist^{[2]}(z^{[2]})[[4]] \\ dist^{[3]}(z^{[3]})[[4]] \\ dist^{[4]}(z^{[4]})[[4]] \\ dist^{[5]}(z^{[5]})[[4]] \\ dist^{[6]}(z^{[6]})[[4]] \end{bmatrix} = \begin{bmatrix} z^{[1]} & c_2^{[1]} & c_3^{[1]} & c_4^{[1]} & c_5^{[1]} & c_6^{[1]} \\ c_1^{[2]} & z^{[2]} & c_3^{[2]} & c_4^{[2]} & c_5^{[2]} & c_6^{[2]} \\ c_1^{[3]} & c_2^{[3]} & z^{[3]} & c_4^{[3]} & c_5^{[3]} & c_6^{[3]} \\ c_1^{[4]} & c_2^{[4]} & c_3^{[4]} & z^{[4]} & c_5^{[4]} & c_6^{[4]} \\ c_1^{[5]} & c_2^{[5]} & c_3^{[5]} & c_4^{[5]} & z^{[5]} & c_6^{[5]} \\ c_1^{[6]} & c_2^{[6]} & c_3^{[6]} & c_4^{[6]} & c_5^{[6]} & z^{[6]} \end{bmatrix} \begin{bmatrix} d_{41} \\ d_{42} \\ d_{43} \\ d_{44} \\ d_{45} \\ d_{46} \end{bmatrix}$$

For the fifth element in the distorted vector data, corresponding to the fifth parameter, the equations are:

$dist^{[1]}(z^{[1]})[[5]] = d_{51}z^{[1]} + d_{52}c_2^{[1]} + d_{53}c_3^{[1]} + d_{54}c_4^{[1]} + d_{55}c_5^{[1]} + d_{56}c_6^{[1]}$ $dist^{[2]}(z^{[2]})[[5]] = d_{51}c_1^{[2]} + d_{52}z^{[2]} + d_{53}c_3^{[2]} + d_{54}c_4^{[2]} + d_{55}c_5^{[2]} + d_{56}c_6^{[2]}$ $dist^{[3]}(z^{[3]})[[5]] = d_{51}c_1^{[3]} + d_{52}c_2^{[3]} + d_{53}z^{[3]} + d_{54}c_4^{[3]} + d_{55}c_5^{[3]} + d_{56}c_6^{[3]}$ $dist^{[4]}(z^{[4]})[[5]] = d_{51}c_1^{[4]} + d_{52}c_2^{[4]} + d_{53}c_3^{[4]} + d_{54}z^{[4]} + d_{55}c_5^{[4]} + d_{56}c_6^{[4]}$ $dist^{[5]}(z^{[5]})[[5]] = d_{51}c_1^{[5]} + d_{52}c_2^{[5]} + d_{53}c_3^{[5]} + d_{54}c_4^{[5]} + d_{55}z^{[5]} + d_{56}c_6^{[5]}$ $dist^{[6]}(z^{[6]})[[5]] = d_{51}c_1^{[6]} + d_{52}c_2^{[6]} + d_{53}c_3^{[6]} + d_{54}c_4^{[6]} + d_{55}c_5^{[6]} + d_{56}z^{[6]}$ which can be written as a C matrix (comprising the aforementioned averages) multiplying a d vector $$\begin{bmatrix} d_{51} \\ d_{52} \\ d_{53} \\ d_{54} \\ d_{55} \\ d_{56} \end{bmatrix},$$

that is $$\begin{bmatrix} dist^{[1]}(z^{[1]})[[5]] \\ dist^{[2]}(z^{[2]})[[5]] \\ dist^{[3]}(z^{[3]})[[5]] \\ dist^{[4]}(z^{[4]})[[5]] \\ dist^{[5]}(z^{[5]})[[5]] \\ dist^{[6]}(z^{[6]})[[5]] \end{bmatrix} = \begin{bmatrix} z^{[1]} & c_2^{[1]} & c_3^{[1]} & c_4^{[1]} & c_5^{[1]} & c_6^{[1]} \\ c_1^{[2]} & z^{[2]} & c_3^{[2]} & c_4^{[2]} & c_5^{[2]} & c_6^{[2]} \\ c_1^{[3]} & c_2^{[3]} & z^{[3]} & c_4^{[3]} & c_5^{[3]} & c_6^{[3]} \\ c_1^{[4]} & c_2^{[4]} & c_3^{[4]} & z^{[4]} & c_5^{[4]} & c_6^{[4]} \\ c_1^{[5]} & c_2^{[5]} & c_3^{[5]} & c_4^{[5]} & z^{[5]} & c_6^{[5]} \\ c_1^{[6]} & c_2^{[6]} & c_3^{[6]} & c_4^{[6]} & c_5^{[6]} & z^{[5]} \end{bmatrix} \begin{bmatrix} d_{51} \\ d_{52} \\ d_{53} \\ d_{54} \\ d_{55} \\ d_{56} \end{bmatrix}$$

For the sixth element in the distorted vector data, corresponding to the sixth parameter, the equations are:

$dist^{[1]}(z^{[1]})[[6]] = d_{61}z^{[1]} + d_{62}c_2^{[1]} + d_{63}c_3^{[1]} + d_{64}c_4^{[1]} + d_{65}c_5^{[1]} + d_{66}c_6^{[1]}$ $dist^{[2]}(z^{[2]})[[6]] = d_{61}c_1^{[2]} + d_{62}z^{[2]} + d_{63}c_3^{[2]} + d_{64}c_4^{[2]} + d_{65}c_5^{[2]} + d_{66}c_6^{[2]}$ $dist^{[3]}(z^{[3]})[[6]] = d_{61}c_1^{[3]} + d_{62}c_2^{[3]} + d_{63}z^{[3]} + d_{64}c_4^{[3]} + d_{65}c_5^{[3]} + d_{66}c_6^{[3]}$ $dist^{[4]}(z^{[4]})[[6]] = d_{61}c_1^{[4]} + d_{62}c_2^{[4]} + d_{63}c_3^{[4]} + d_{64}z^{[4]} + d_{65}c_5^{[4]} + d_{66}c_6^{[4]}$ $dist^{[5]}(z^{[5]})[[6]] = d_{61}c_1^{[5]} + d_{62}c_2^{[5]} + d_{63}c_3^{[5]} + d_{64}c_4^{[5]} + d_{65}z^{[5]} + d_{66}c_6^{[5]}$ $dist^{[6]}(z^{[6]})[[6]] = d_{61}c_1^{[6]} + d_{62}c_2^{[6]} + d_{63}c_3^{[6]} + d_{64}c_4^{[6]} + d_{65}c_5^{[6]} + d_{66}z^{[6]}$ which can be written as a C matrix (comprising the aforementioned averages) multiplying a d vector $$\begin{bmatrix} d_{61} \\ d_{62} \\ d_{63} \\ d_{64} \\ d_{65} \\ d_{66} \end{bmatrix},$$

that is $$\begin{bmatrix} dist^{[1]}(z^{[1]})[[6]] \\ dist^{[2]}(z^{[2]})[[6]] \\ dist^{[3]}(z^{[3]})[[6]] \\ dist^{[4]}(z^{[4]})[[6]] \\ dist^{[5]}(z^{[5]})[[6]] \\ dist^{[6]}(z^{[6]})[[6]] \end{bmatrix} = \begin{bmatrix} z^{[1]} & c_2^{[1]} & c_3^{[1]} & c_4^{[1]} & c_5^{[1]} & c_6^{[1]} \\ c_1^{[2]} & z^{[2]} & c_3^{[2]} & c_4^{[2]} & c_5^{[2]} & c_6^{[2]} \\ c_1^{[3]} & c_2^{[3]} & z^{[3]} & c_4^{[3]} & c_5^{[3]} & c_6^{[3]} \\ c_1^{[4]} & c_2^{[4]} & c_3^{[4]} & z^{[4]} & c_5^{[4]} & c_6^{[4]} \\ c_1^{[5]} & c_2^{[5]} & c_3^{[5]} & c_4^{[5]} & z^{[5]} & c_6^{[5]} \\ c_1^{[6]} & c_2^{[6]} & c_3^{[6]} & c_4^{[6]} & c_5^{[6]} & z^{[6]} \end{bmatrix} \begin{bmatrix} d_{61} \\ d_{62} \\ d_{63} \\ d_{64} \\ d_{65} \\ d_{66} \end{bmatrix}$$

Upon review it is seen in each of these six cases the "same" matrix—comprised of c values (derived from averages of measured data as described earlier) and z values—multiplies a vector of unknown d values to produce a corresponding vector of measured dist values.

If this matrix (comprised of c values and z values) is non-singular, it can be inverted and used to calculate each of the six vectors of d value unknowns from each of the corresponding six vectors of measured values. In this way, all 36 d values can be determined, which determines the D matrix.

If the D matrix is invertible, then its inverse $D^{-1}$ can be calculated. This $D^{-1}$ matrix can be used to introduce a region-ally-defined decoupling of the six intended HDTP parameter values from the six measured HDTP as described in the opening of this section.

In this construction, the six z values for each of the six vector equations remain free. As the transformations discussed are intended to allow each of the z values to vary within the region $R_j$, a specific associated numerical value for each of the z values can be chosen within the region $R_j$ that allows for both:

the matrix comprised of c values and z values to be non-singular the resulting D matrix thus determined to also be non-singular This $D^{-1}$ matrix can be used to introduce a regionally-defined decoupling of the six intended HDTP parameter values from the six measured HDTP as described in the opening of this section.

The aforementioned, as well as other variations, can be implemented as an algorithm on a digital computer, embedded processor, signal processor, or combination of two or more of these.

In an embodiment, the measured parameter values determine a parameter space region $R_j$ which in turn determines an associated linear or affine transformation used to improve the decoupling within that region of parameter space. As the measured parameter values change in such a way so that the cross into another parameter space region $R_k$, another associated linear transformation used to improve the decoupling within that region of parameter space.

In an embodiment, should the measured parameter values lie at a boundary shared by parameter space region $R_j$ and parameter space region $R_k$, the two aforementioned associated linear or affine transformations can be selected to that the decoupled parameter values agree no matter which of the two associated linear transformations is used. In this manner, there is no "jump" as transformations change at the condition boundary.

Other arrangements can be used to obtain smooth transitions between associated linear transformations when crossing boundaries within regions, for example, an interpolation between the linear transformations in the neighborhood surrounding the boundary between the two bordering regions.

The terms "certain embodiments", "an embodiment", "embodiment", "embodiments", "the embodiment", "the embodiments", "one or more embodiments", "some embodiments", and "one embodiment" mean one or more (but not all) embodiments unless expressly specified otherwise. The terms "including", "comprising", "having" and variations thereof mean "including but not limited to", unless expressly specified otherwise. The enumerated listing of items does not imply that any or all of the items are mutually exclusive, unless expressly specified otherwise. The terms "a", "an" and "the" mean "one or more", unless expressly specified otherwise.

While the invention has been described in detail with reference to disclosed embodiments, various modifications within the scope of the invention will be apparent to those of ordinary skill in this technological field. It is to be appreciated that features described with respect to one embodiment typically can be applied to other embodiments.

The invention can be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

Although exemplary embodiments have been provided in detail, various changes, substitutions and alternations could be made thereto without departing from spirit and scope of the disclosed subject matter as defined by the appended claims. Variations described for the embodiments may be realized in any combination desirable for each particular application. Thus particular limitations and embodiment enhancements described herein, which may have particular advantages to a particular application, need not be used for all applications. Also, not all limitations need be implemented in methods, systems, and apparatuses including one or more concepts described with relation to the provided embodiments. Therefore, the invention properly is to be construed with reference to the claims.

I claim:

1. A method for decoupling or correcting measured parameters in a touch-based user interface using at least one computational processor, the method comprising:
    receiving tactile image data responsive to data generated from a user touch to a user touch interface comprising a sensor array;
    processing the tactile image data with a series of operations to produce a first processed data vector, the series of operations comprising at least one rotation operation, the first processed data vector comprising a plurality of numerical values responsive to data generated from the user touch interface; and
    further processing the first processed data vector, the further processing comprising a piecewise-affine computational operation on the first processed data vector, the piecewise-affine operation using at least one provided linear transformation and at least one provided offset vector, the at least one provided linear transformation selected from a plurality of possible linear transformations and the at least one provided offset vector selected from a plurality of possible offset vectors;
    wherein the selection of the linear transformation from the plurality of possible linear transformations and the selection of the offset vector from the plurality of possible offset vectors is determined by conditional tests made on at least one of the numerical values comprised by the first processed data vector, and
    wherein the further processing produces a second processed data vector comprising a plurality of numerical values responsive to data generated from the user touch interface.

2. The method of claim 1 wherein the first processed data vector comprises a yaw angle numerical value responsive to a calculated yaw angle associated with the user touch and the rotation operation is responsive to the yaw angle numerical value.

3. The method of claim 1 wherein the first processed data vector comprises a pitch angle numerical value responsive to a calculated pitch angle associated with the user touch and the rotation operation is used to provide a correction for the yaw angle.

4. The method of claim 1 wherein the first processed data vector comprises a roll angle numerical value responsive to a calculated roll angle associated with the user touch and the rotation operation is used to provide a correction for the yaw angle.

5. The method of claim 1 wherein the selected linear transformation is comprised a plurality of separate component linear transformations, at least one of the component linear transformations is determined by conditional tests made on at least one of the numerical values comprised by the first processed data vector.

6. The method of claim 1 wherein the method is used to provide corrections for pitch angle effects on a measured front-back center.

7. The method of claim 1 wherein the method is used to provide corrections for roll angle effects on a measured left-right-center.

8. The method of claim 1 wherein the conditional tests further comprise tests responsive to the positive or negative direction of change over time of at least one numerical value comprised by the first processed data vector.

9. The method of claim 8 wherein the method is used to provide corrections for hysteresis effects between the user touch and the sensor array.

10. The method of claim 8 wherein the method is used to provide corrections for hysteresis effects in at least one measurement of the user touch.

11. The method of claim 1 wherein the method is used to provide corrections for downward pressure effects on measured pitch angle.

12. The method of claim 1 wherein the method is used to provide corrections for pressure effects on measured roll angle.

13. The method of claim 1 wherein the method is used to provide corrections for range-of-rotation effects.

14. The method of claim 1 wherein the method is used to provide corrections for at least a tilt effect on yaw angle.

15. The method of claim 14 wherein the tilt effect is responsive to the roll angle of user touch with respect to the sensor array.

16. The method of claim 14 wherein the tilt effect is responsive to the pitch angle of user touch with respect to the sensor array.

17. The method of claim 1 wherein the linear transformation comprises a matrix.

18. The method of claim 1 wherein the linear transformation is stored in a look-up table of linear transformations.

19. The method of claim 1 wherein the offset vector is stored in a look-up table of offset vectors.

20. The method of claim 5 wherein the separate component linear transformation is stored in a look-up table of separate component linear transformations.

* * * * *